United States Patent
Shrestha et al.

(10) Patent No.: US 11,929,831 B2
(45) Date of Patent: Mar. 12, 2024

(54) DISABLING HYBRID AUTOMATIC REPEAT REQUEST FEEDBACK

(71) Applicant: QUALCOMM Incorporated, San Diego, CA (US)

(72) Inventors: Bharat Shrestha, San Diego, CA (US); Umesh Phuyal, San Diego, CA (US); Xiao Feng Wang, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/249,675

(22) Filed: Mar. 9, 2021

(65) Prior Publication Data

US 2021/0288756 A1 Sep. 16, 2021

Related U.S. Application Data

(60) Provisional application No. 62/988,267, filed on Mar. 11, 2020.

(51) Int. Cl.
*H04L 1/1812* (2023.01)
*H04W 72/23* (2023.01)

(52) U.S. Cl.
CPC .......... *H04L 1/1812* (2013.01); *H04W 72/23* (2023.01)

(58) Field of Classification Search
CPC ... H04L 1/1812; H04L 1/1822; H04L 1/1825; H04L 1/1854; H04L 1/1887; H04L 1/1896; H04W 72/042
See application file for complete search history.

(56) References Cited

U.S. PATENT DOCUMENTS 9,374,811 B2 * 6/2016 Kim ................... H04W 72/042
9,712,286 B2 * 7/2017 Tabet ................ H04W 72/0413
(Continued)

FOREIGN PATENT DOCUMENTS

CN 107078864 B * 3/2020 ........... H04L 1/1812
CN 111404651 A * 7/2020 ........... H04L 1/1812
(Continued)

OTHER PUBLICATIONS

Yun et al., Main features of 5G New Radio for Non-Terrestrial Networks, Oct. 20, 2021, 2021 International Conference on Information and Communication Technology Convergence (ICTC), 2021, pp. 1474-1478, doi: 10.1109/ICTC52510.2021.9620941 (Year: 2021).*
(Continued)

*Primary Examiner* — Eric Nowlin
(74) *Attorney, Agent, or Firm* — Harrity & Harrity, LLP/QUALCOMM Incorporated

(57) ABSTRACT

Various aspects of the present disclosure generally relate to wireless communication. In some aspects, a user equipment (UE) may receive information indicating whether hybrid automatic repeat request (HARQ) feedback is disabled for one or more HARQ processes. The UE may receive a downlink communication. The downlink communication may include a HARQ process identifier that indicates a HARQ process to be used for the downlink communication. The UE may selectively provide HARQ feedback for the downlink communication based at least in part on the HARQ identifier and information indicating whether HARQ feedback is disabled for the HARQ process. Numerous other aspects are provided.

76 Claims, 21 Drawing Sheets

(56) References Cited

U.S. PATENT DOCUMENTS

| | | | |
|---|---|---|---|
| 11,343,022 B2* | 5/2022 | Vaidya | H04L 1/1864 |
| 11,621,803 B2* | 4/2023 | Wen | H04B 7/185 370/329 |
| 2008/0059859 A1* | 3/2008 | Marinier | H04L 1/1867 714/748 |
| 2014/0126512 A1* | 5/2014 | Kim | H04L 5/0073 370/329 |
| 2018/0287744 A1* | 10/2018 | Sundararajan | H04L 1/1816 |
| 2020/0044790 A1* | 2/2020 | Vaidya | H04W 72/23 |
| 2020/0228252 A1* | 7/2020 | Sundararajan | H04L 1/1822 |
| 2020/0313806 A1* | 10/2020 | Wang | H04L 1/1822 |
| 2021/0314092 A1* | 10/2021 | Wen | H04L 1/1812 |
| 2021/0385020 A1* | 12/2021 | Määttänen | H04L 1/1893 |
| 2021/0391952 A1* | 12/2021 | Hofström | H04L 1/1812 |
| 2022/0045803 A1* | 2/2022 | Lin | H04L 1/1822 |
| 2022/0046669 A1* | 2/2022 | Wang | H04W 72/14 |
| 2022/0158770 A1* | 5/2022 | Hong | H04L 1/1671 |
| 2022/0286235 A1* | 9/2022 | Ranta-Aho | H04L 1/1812 |
| 2022/0287011 A1* | 9/2022 | Liu | H04L 1/1825 |
| 2022/0338240 A1* | 10/2022 | Wen | H04L 1/1822 |
| 2022/0407629 A1* | 12/2022 | Wu | H04L 1/1864 |

FOREIGN PATENT DOCUMENTS

| | | | | |
|---|---|---|---|---|
| CN | 112205045 A | * | 1/2021 | H04B 7/185 |
| CN | 110463116 B | * | 3/2022 | H04L 1/14 |
| CN | 114731238 A | * | 7/2022 | |
| CN | 114747168 A | * | 7/2022 | H04L 1/1812 |
| EP | 2690815 A2 | * | 1/2014 | H04L 1/1812 |
| KR | 20220072871 A | * | 6/2022 | |
| WO | WO-2013009043 A2 | * | 1/2013 | H04L 1/1822 |
| WO | WO-2013009043 A9 | * | 5/2013 | H04L 1/1822 |
| WO | WO-2018183644 A1 | * | 10/2018 | H04L 1/14 |
| WO | WO-2019160737 A1 | * | 8/2019 | H04L 1/1835 |
| WO | WO-2019222881 A1 | | 11/2019 | |
| WO | WO-2019222881 A1 | * | 11/2019 | H04B 7/185 |
| WO | WO-2021016010 A1 | * | 1/2021 | H04L 27/2604 |
| WO | WO-2021064681 A1 | * | 4/2021 | H04L 1/1812 |
| WO | WO-2021068141 A1 | * | 4/2021 | H04L 1/08 |
| WO | WO-2021072658 A1 | * | 4/2021 | H04L 1/1812 |
| WO | WO-2021155605 A1 | * | 8/2021 | |
| WO | WO-2021168833 A1 | * | 9/2021 | |
| WO | WO-2022019833 A1 | * | 1/2022 | |
| WO | WO-2022203581 A1 | * | 9/2022 | |
| WO | WO-2022205276 A1 | * | 10/2022 | |

OTHER PUBLICATIONS

English Translation of WO2021168833A1, Translation Provided By Espacenet (Year: 2021).*

CMCC, et al., "Further Consideration on HARQ Configuration in NTN," 3GPP Draft, 3GPP TSG-RAN WG2 Meeting 107bis, R2-1914197 Further Consideration on HARQ Configuration in NTN, 3rd Generation Partnership Project (3GPP), Mobile Competence Centre; 650, Route Des Lucioles; F-06921, Sophia-Antipolis Cedex; France, vol. RAN WG2. No. Chongqing, 20191014-20191018, Oct. 18, 2019 (Oct. 18, 2019), XP051797963, 5 pages, Retrieved from the Internet: URL: https://ftp.3gpp.org/tsg_ran/WG2_RL2/TSGR2_107bis/Docs/R2-1914197.zip R2-1914197 Further consideration on HARQ configuration in NTN.docx [retrieved on Oct. 18, 2019] Section 2.

International Search Report and Written Opinion—PCT/US2021/070260—ISA/EPO—Jun. 11, 2021.

Nokia, et al., "Considerations on HARQ in NTN", 3GPP Draft, 3GPP TSG RAN WG1 Meeting #98bis, R1-1911222, 3rd Generation Partnership Project (3GPP), Mobile Competence Centre; 650, Route Des Lucioles; F-06921, Sophia-Antipolis Cedex; France, vol. RAN WG1. No. Chongqing, China, 20191014-20191020, Oct. 5, 2019 (Oct. 5, 2019), XP051789992, pp. 1-4, Retrieved from the Internet: URL: http://www.3gpp.org/ftp/tsg_ran/WG1_RL1/TSGR1_98b/Docs/R1-1911222.zip [retrieved on Oct. 5, 2019] Section 2.1, Section 2.2.

Nokia, et al., "Considerations on HARQ in NTN," 3GPP Draft, 3GPP TSG RAN WG1 Meeting #99, R1-1913019, 3rd Generation Partnership Project (3GPP), Mobile Competence Centre; 650, Route Des Lucioles; F-06921, Sophia-Antipolis Cedex; France, vol. RAN WG1. No. Reno, USA, 20191118-20191122, Nov. 9, 2019 (Nov. 9, 2019), XP051823751, pp. 1-6, Retrieved from the Internet: URL: https://ftp.3gpp.org/tsg_ran/WG1_RL1/TSGR1_99/Docs/R1-1913019.zip R1-1913019.docx [retrieved on Nov. 9, 2019] Section 2.1, Section 2.2, figure 1.

Nokia, et al., "Discussion on LCP Procedure for NTN," 3GPP Draft, 3GPP TSG-RAN WG2 Meeting #107bis, R2-1913388, Discussion on LCP Procedure for NTN, 3rd Generation Partnership Project (3GPP), Mobile Competence Centre; 650, Route Des Lucioles; F-06921, Sophia-Antipolis Cedex; France, vol. RAN WG2. No. Chongqing, China, 20191014-20191018, Oct. 4, 2019 (Oct. 4, 2019), XP051804967, 5 pages, Retrieved from the Internet: URL: https://ftp.3gpp.org/tsg_ran/WG2_RL2/TSGR2_107bis/Docs/R2-1913388.zipR2-1913388 Discussion on LCP procedure for NTN.docx [retrieved on Oct. 4, 2019] Section 2 figure 1.

Thales: "Solutions for NR to Support Non-Terrestrial Networks (NTN)", 3GPP Draft, 3GPP TSG RAN Meeting #86, RP-193234, Revision from RP-192502, 3144, 3rd Generation Partnership Project (3GPP), Mobile Competence Centre, 650, Route Des Lucioles, F-06921 Sophia-Antipolis Cedex, France, vol. TSG RAN. No. Sitges, Spain, 20191209-20191213, Dec. 12, 2019 (Dec. 12, 2019), XP051840365, 10 pages, Retrieved from the Internet: URL:https://ftp.3gpp.org/tsg_ran/TSG_RAN/TSGR_86/Docs/RP-193234.zip RP-193234_WIDNR-NTN_for Rel-17 v4.0.doc [retrieved on Dec. 12, 2019] Paragraph [4.1.2].

Huawei, et al., "Discussion on HARQ for NTN", R1-1908050, 3GPP TSG RAN WG1 Meeting #98, 3rd Generation Partnership Project (3GPP), Mobile Competence Centre, 650, Route Des Lucioles, F-06921 Sophia-Antipolis Cedex, France, vol. RAN WG1. No. Prague. Czech Republic, Aug. 26, 2019-Aug. 30, 2019, Aug. 17, 2019, 5 Pages, XP051764673, p. 1-p. 4, figure 2.

* cited by examiner

DISABLING HYBRID AUTOMATIC REPEAT REQUEST FEEDBACK

CROSS-REFERENCE TO RELATED APPLICATION

This patent application claims priority to U.S. Provisional Patent Application No. 62/988,267, filed on Mar. 11, 2020, entitled "DISABLING HYBRID AUTOMATIC REPEAT REQUEST FEEDBACK," and assigned to the assignee hereof. The disclosure of the prior application is considered part of and is incorporated by reference into this patent application.

INTRODUCTION

Aspects of the present disclosure generally relate to wireless communication and to techniques and apparatuses associated with hybrid automatic repeat request (HARQ) feedback.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment includes receiving information indicating whether HARQ feedback is disabled for a HARQ process; receiving a downlink communication, the downlink communication including a HARQ process identifier of the HARQ process, the HARQ process identifier indicating the HARQ process is to be used for the downlink communication; and selectively providing HARQ feedback for the downlink communication based at least in part on the information indicating whether HARQ feedback is disabled for the HARQ process.

In some aspects, a method of wireless communication performed by a base station includes transmitting information indicating whether HARQ feedback is disabled for a HARQ process; and transmitting a downlink communication, the downlink communication including a HARQ process identifier of the HARQ process, the HARQ process identifier indicating the HARQ process to be used for the downlink communication.

In some aspects, a method of wireless communication performed by a user equipment includes transmitting an indication of whether HARQ feedback or HARQ retransmission is to be provided for an uplink communication; receiving a grant for transmitting the uplink communication, the grant including a HARQ process identifier that indicates a HARQ process to be used for the uplink communication; and selectively monitoring for a retransmission grant, associated with the uplink communication, based at least in part on the HARQ process identifier and information indicating whether HARQ feedback or HARQ retransmission is disabled for the HARQ process.

In some aspects, a method of wireless communication performed by a base station includes receiving an indication of whether HARQ feedback or HARQ retransmission is to be provided for an uplink communication; identifying, based at least in part on the indication, a HARQ process to be used for the uplink communication; and transmitting a grant for transmitting the uplink communication, the grant including a HARQ process identifier that indicates the HARQ process to be used for the uplink communication.

In some aspects, a user equipment for wireless communication includes a memory and one or more processors, coupled to the memory, the memory and the one or more processors configured to: receive information indicating whether HARQ feedback is disabled for a HARQ process; receive a downlink communication, the downlink communication including a HARQ process identifier of the HARQ process, the HARQ process identifier indicating the HARQ process is to be used for the downlink communication; and selectively provide HARQ feedback for the downlink communication based at least in part on the information indicating whether HARQ feedback is disabled for the HARQ process.

In some aspects, a base station for wireless communication includes a memory and one or more processors, coupled to the memory, the memory and the one or more processors configured to: transmit information indicating whether HARQ feedback is disabled for a HARQ process; and transmit a downlink communication, the downlink communication including a HARQ process identifier of the HARQ process, the HARQ process identifier indicating the HARQ process to be used for the downlink communication.

In some aspects, a user equipment for wireless communication includes a memory and one or more processors, coupled to the memory, the memory and the one or more processors configured to: transmit an indication of whether HARQ feedback or HARQ retransmission is to be provided for an uplink communication; receive a grant for transmitting the uplink communication, the grant including a HARQ process identifier that indicates a HARQ process to be used for the uplink communication; and selectively monitor for a retransmission grant, associated with the uplink communication, based at least in part on the HARQ process identifier and information indicating whether HARQ feedback or HARQ retransmission is disabled for the HARQ process.

In some aspects, a base station for wireless communication includes a memory and one or more processors, coupled to the memory, the memory and the one or more processors configured to: receive an indication of whether HARQ feedback or HARQ retransmission is to be provided for an uplink communication; identify, based at least in part on the indication, a HARQ process to be used for the uplink communication; and transmit a grant for transmitting the uplink communication, the grant including a HARQ process identifier that indicates the HARQ process to be used for the uplink communication.

In some aspects, a non-transitory computer-readable medium storing a set of instructions for wireless communication includes one or more instructions that, when executed by one or more processors of a user equipment, cause the user equipment to: receive information indicating whether HARQ feedback is disabled for a HARQ process; receive a downlink communication, the downlink communication including a HARQ process identifier of the HARQ process, the HARQ process identifier indicating the HARQ process is to be used for the downlink communication; and selectively provide HARQ feedback for the downlink communication based at least in part on the information indicating whether HARQ feedback is disabled for the HARQ process.

In some aspects, a non-transitory computer-readable medium storing a set of instructions for wireless communication includes one or more instructions that, when executed by one or more processors of a base station, cause the base station to: transmit information indicating whether HARQ feedback is disabled for a HARQ process; and transmit a downlink communication, the downlink communication including a HARQ process identifier of the HARQ process, the HARQ process identifier indicating the HARQ process to be used for the downlink communication.

In some aspects, a non-transitory computer-readable medium storing a set of instructions for wireless communication includes one or more instructions that, when executed by one or more processors of a user equipment, cause the user equipment to: transmit an indication of whether HARQ feedback or HARQ retransmission is to be provided for an uplink communication; receive a grant for transmitting the uplink communication, the grant including a HARQ process identifier that indicates a HARQ process to be used for the uplink communication; and selectively monitor for a retransmission grant, associated with the uplink communication, based at least in part on the HARQ process identifier and information indicating whether HARQ feedback or HARQ retransmission is disabled for the HARQ process.

In some aspects, a non-transitory computer-readable medium storing a set of instructions for wireless communication includes one or more instructions that, when executed by one or more processors of a base station, cause the base station to: receive an indication of whether HARQ feedback or HARQ retransmission is to be provided for an uplink communication; identify, based at least in part on the indication, a HARQ process to be used for the uplink communication; and transmit a grant for transmitting the uplink communication, the grant including a HARQ process identifier that indicates the HARQ process to be used for the uplink communication.

In some aspects, an apparatus for wireless communication includes means for receiving information indicating whether HARQ feedback is disabled for a HARQ process; means for receiving a downlink communication, the downlink communication including a HARQ process identifier of the HARQ process, the HARQ process identifier indicating the HARQ process is to be used for the downlink communication; and means for selectively providing HARQ feedback for the downlink communication based at least in part on the information indicating whether HARQ feedback is disabled for the HARQ process.

In some aspects, an apparatus for wireless communication includes means for transmitting information indicating whether HARQ feedback is disabled for a HARQ process; and means for transmitting a downlink communication, the downlink communication including a HARQ process identifier of the HARQ process, the HARQ process identifier indicating the HARQ process to be used for the downlink communication.

In some aspects, an apparatus for wireless communication includes means for transmitting an indication of whether HARQ feedback or HARQ retransmission is to be provided for an uplink communication; means for receiving a grant for transmitting the uplink communication, the grant including a HARQ process identifier that indicates a HARQ process to be used for the uplink communication; and means for selectively monitoring for a retransmission grant, associated with the uplink communication, based at least in part on the HARQ process identifier and information indicating whether HARQ feedback or HARQ retransmission is disabled for the HARQ process.

In some aspects, an apparatus for wireless communication includes means for receiving an indication of whether HARQ feedback or HARQ retransmission is to be provided for an uplink communication; means for identifying, based at least in part on the indication, a HARQ process to be used for the uplink communication; and means for transmitting a grant for transmitting the uplink communication, the grant including a HARQ process identifier that indicates the HARQ process to be used for the uplink communication.

In some aspects, a method of wireless communication, performed by a UE, may include receiving a downlink communication, the downlink communication including a HARQ process identifier that indicates a HARQ process to be used for the downlink communication; and selectively providing HARQ feedback for the downlink communication based at least in part on the HARQ identifier and information indicating whether HARQ feedback is disabled for the HARQ process.

In some aspects, a method of wireless communication, performed by a base station, may include determining whether HARQ feedback is to be provided for a downlink communication; identifying a HARQ process to be used for the downlink communication based at least in part on whether HARQ feedback is to be provided for the downlink communication; and transmitting the downlink communication, the downlink communication including a HARQ process identifier that indicates the HARQ process to be used for the downlink communication.

In some aspects, a method of wireless communication, performed by a UE, may include transmitting an indication of whether HARQ feedback is to be provided for an uplink communication; receiving a grant associated with the uplink communication, the grant including a HARQ process identifier that indicates a HARQ process to be used for the uplink communication; and selectively monitoring for a retransmission grant, associated with the uplink communication, based at least in part on the HARQ process identifier and information indicating whether HARQ feedback is disabled for the HARQ process.

In some aspects, a method of wireless communication, performed by a base station, may include receiving an indication of whether HARQ feedback is to be provided for an uplink communication; identifying, based at least in part on the indication, a HARQ process to be used for the uplink communication; and transmitting a grant associated with the uplink communication, the grant including a HARQ process identifier that indicates the HARQ process to be used for the uplink communication.

In some aspects, a UE for wireless communication may include a memory and one or more processors coupled to the memory. The memory and the one or more processors may be configured to receive a downlink communication, the downlink communication including a HARQ process identifier that indicates a HARQ process to be used for the downlink communication; and selectively provide HARQ feedback for the downlink communication based at least in part on the HARQ identifier and information indicating whether HARQ feedback is disabled for the HARQ process.

In some aspects, a base station for wireless communication may include a memory and one or more processors coupled to the memory. The memory and the one or more processors may be configured to determine whether HARQ feedback is to be provided for a downlink communication; identify a HARQ process to be used for the downlink communication based at least in part on whether HARQ feedback is to be provided for the downlink communication; and transmit the downlink communication, the downlink communication including a HARQ process identifier that indicates the HARQ process to be used for the downlink communication.

In some aspects, a UE for wireless communication may include a memory and one or more processors coupled to the memory. The memory and the one or more processors may be configured to transmit an indication of whether HARQ feedback is to be provided for an uplink communication; receive a grant associated with the uplink communication, the grant including a HARQ process identifier that indicates a HARQ process to be used for the uplink communication; and selectively monitor for a retransmission grant, associated with the uplink communication, based at least in part on the HARQ process identifier and information indicating whether HARQ feedback is disabled for the HARQ process.

In some aspects, a base station for wireless communication may include a memory and one or more processors coupled to the memory. The memory and the one or more processors may be configured to receive an indication of whether HARQ feedback is to be provided for an uplink communication; identify, based at least in part on the indication, a HARQ process to be used for the uplink communication; and transmit a grant associated with the uplink communication, the grant including a HARQ process identifier that indicates the HARQ process to be used for the uplink communication.

In some aspects, a non-transitory computer-readable medium may store one or more instructions for wireless communication. The one or more instructions, when executed by one or more processors of a UE, may cause the one or more processors to receive a downlink communication, the downlink communication including a HARQ process identifier that indicates a HARQ process to be used for the downlink communication; and selectively provide HARQ feedback for the downlink communication based at least in part on the HARQ identifier and information indicating whether HARQ feedback is disabled for the HARQ process.

In some aspects, a non-transitory computer-readable medium may store one or more instructions for wireless communication. The one or more instructions, when executed by one or more processors of a base station, may cause the one or more processors to determine whether HARQ feedback is to be provided for a downlink communication; identify a HARQ process to be used for the downlink communication based at least in part on whether HARQ feedback is to be provided for the downlink communication; and transmit the downlink communication, the downlink communication including a HARQ process identifier that indicates the HARQ process to be used for the downlink communication.

In some aspects, a non-transitory computer-readable medium may store one or more instructions for wireless communication. The one or more instructions, when executed by one or more processors of a UE, may cause the one or more processors to transmit an indication of whether HARQ feedback is to be provided for an uplink communication; receive a grant associated with the uplink communication, the grant including a HARQ process identifier that indicates a HARQ process to be used for the uplink communication; and selectively monitor for a retransmission grant, associated with the uplink communication, based at least in part on the HARQ process identifier and information indicating whether HARQ feedback is disabled for the HARQ process.

In some aspects, a non-transitory computer-readable medium may store one or more instructions for wireless communication. The one or more instructions, when executed by one or more processors of a base station, may cause the one or more processors to receive an indication of whether HARQ feedback is to be provided for an uplink communication; identify, based at least in part on the indication, a HARQ process to be used for the uplink communication; and transmit a grant associated with the uplink communication, the grant including a HARQ process identifier that indicates the HARQ process to be used for the uplink communication.

In some aspects, an apparatus for wireless communication may include means for receiving a downlink communication, the downlink communication including a HARQ process identifier that indicates a HARQ process to be used for the downlink communication; and means for selectively providing HARQ feedback for the downlink communication based at least in part on the HARQ identifier and information indicating whether HARQ feedback is disabled for the HARQ process.

In some aspects, an apparatus for wireless communication may include means for determining whether HARQ feedback is to be provided for a downlink communication; means for identifying a HARQ process to be used for the downlink communication based at least in part on whether HARQ feedback is to be provided for the downlink communication; and means for transmitting the downlink communication, the downlink communication including a HARQ process identifier that indicates the HARQ process to be used for the downlink communication.

In some aspects, an apparatus for wireless communication may include means for transmitting an indication of whether HARQ feedback is to be provided for an uplink communication; means for receiving a grant associated with the uplink communication, the grant including a HARQ process identifier that indicates a HARQ process to be used for the uplink communication; and means for selectively monitoring for a retransmission grant, associated with the uplink communication, based at least in part on the HARQ process identifier and information indicating whether HARQ feedback is disabled for the HARQ process.

In some aspects, an apparatus for wireless communication may include means for receiving an indication of whether HARQ feedback is to be provided for an uplink communication; means for identifying, based at least in part on the indication, a HARQ process to be used for the uplink communication; and means for transmitting a grant associated with the uplink communication, the grant including a HARQ process identifier that indicates the HARQ process to be used for the uplink communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
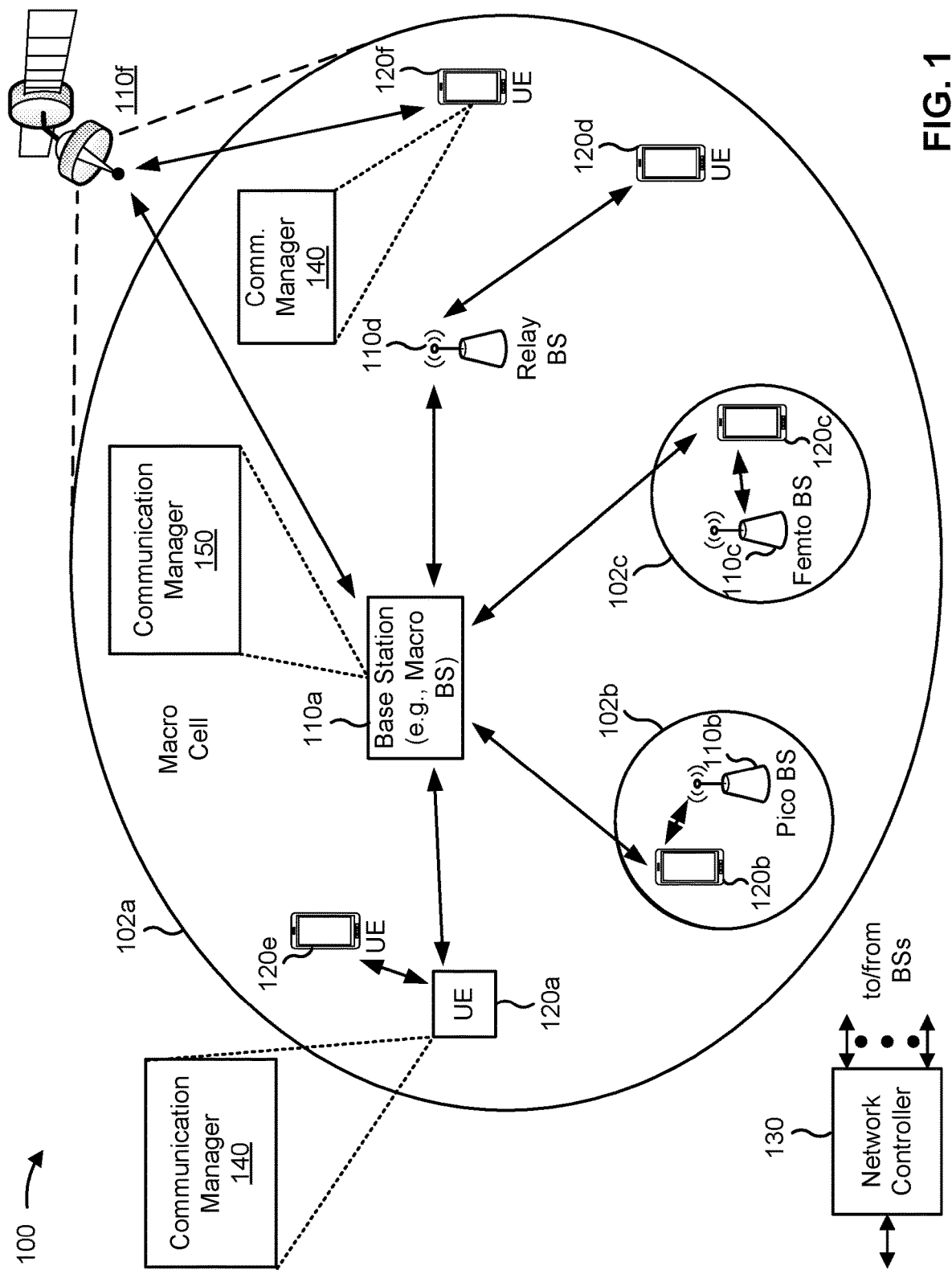
FIG. 1 is a diagram illustrating an example of a wireless network, in accordance with the present disclosure.

As described below, a non-terrestrial network (NTN) may utilize non-terrestrial base stations for providing or assisting UEs with access to a core network. A non-terrestrial base station may be located on a platform, which may be, for example, a satellite (e.g., a low earth orbit (LEO) satellite, a medium earth orbit (MEO) satellite, a geostationary earth orbit (GEO) satellite, or the like), a balloon, a dirigible, an airplane, an unmanned aerial vehicle (UAV), a drone, or the like. In an NTN system, propagation delay may be significant, due to a relatively large distance between a UE and a non-terrestrial base station and/or a relatively large distance between a terrestrial base station and the non-terrestrial base station. In some cases, due to the significant propagation delay in an NTN system, it may be desirable to disable HARQ feedback so as to avoid stalling of the HARQ process. As a result, some HARQ processes may need to be configured to have HARQ feedback disabled. In one or more examples, such a configuration may be performed by an upper layer (e.g., a radio link control (RLC) layer, also referred to as an L3 layer), while HARQ feedback is sent by a lower layer (e.g., a physical (PHY) layer, also referred to as an L1 layer).

Some aspects described herein provide techniques and apparatuses for disabling HARQ feedback. For example, techniques and apparatuses described herein enable configuration and use of a HARQ process (e.g., a downlink HARQ process or an uplink HARQ process) with HARQ feedback disabled at the physical layer. In some aspects, the techniques and apparatuses described herein may be used for disabling HARQ feedback to reduce a likelihood of stalling a HARQ process in, for example, an NTN network or another scenario in which stalling of a HARQ process may occur.

In the case of a downlink HARQ process, a base station may identify a HARQ process to be used for the downlink communication based at least in part on whether HARQ feedback is to be provided for the downlink communication. In one or more examples, when HARQ feedback is to be provided, the base station may identify a HARQ process for which HARQ feedback is enabled. Conversely, when HARQ feedback is not to be provided, the base station may identify a HARQ process for which HARQ feedback is disabled. The base station may then transmit the downlink communication including a HARQ process identifier that indicates the HARQ process to be used for the downlink communication. The base station may selectively monitor for HARQ feedback associated with the downlink communication based at least in part on whether HARQ feedback is to be provided for the downlink communication. A UE may receive the downlink communication, and may selectively provide HARQ feedback for the downlink communication based at least in part on the HARQ identifier and information indicating whether HARQ feedback is enabled or disabled for the HARQ process (e.g., a configuration, a dynamic indication, or the like).

In the case of an uplink HARQ process, a UE may transmit, to a base station, an indication of whether HARQ feedback is to be provided for an uplink communication. The base station may receive the indication, and identify, based at least in part on the indication, a HARQ process to be used for the uplink communication. In one or more examples, when HARQ feedback is to be provided, the base station may identify a HARQ process for which HARQ feedback is enabled. Conversely, when HARQ feedback is not to be provided, the base station may identify a HARQ process for which HARQ feedback is disabled. The base station may then transmit a grant, associated with the uplink communication, that includes a HARQ process identifier that indicates the HARQ process to be used for the uplink communication. The UE may receive the grant, transmit the uplink communication according to the grant, and selectively monitor for a retransmission grant based at least in part on the HARQ process identifier and information indicating whether HARQ feedback is disabled for the HARQ process.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "g B", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

In some examples, as indicated in FIG. 1, a cell may be provided by a base station 110 of an NTN. Such a base station 110 may also referred to as a non-terrestrial base station 110 or a non-terrestrial access point. As used herein, "NTN" may refer to a network for which access is provided by or assisted by a non-terrestrial base station 110. In some NTN deployments, a non-terrestrial base station 110 may be located on an airborne platform or a platform in orbit. Examples of such platforms include a satellite (e.g., a LEO satellite, a MEO satellite, a GEO satellite, or the like), a balloon, a dirigible, an airplane, a UAV, a drone, or the like.

In some NTN deployments (e.g., sometimes referred to as a transparent architecture or a bent pipe architecture), a non-terrestrial base station 110 may act as a relay station to relay communications between a UE 120 and a terrestrial base station 110 (e.g., a base station 110 located on the ground or on a tower). In this case, the non-terrestrial base station 110 may perform, for example, frequency translation and/or radio frequency amplification for communications relayed between the UE 120 and a terrestrial base station 110. For example, the UE 120 may transmit an uplink communication to the non-terrestrial base station 110, which may relay the uplink communication to a terrestrial base station 110 (e.g., after performing frequency translation, radio frequency amplification, and/or the like). The terrestrial base station 110 may perform additional processing on the uplink communication and/or may transmit the uplink communication to a core network. As another example, the terrestrial base station 110 may transmit a downlink communication to the non-terrestrial base station 110, which may relay the downlink communication to the UE 120 (e.g., after performing frequency translation, radio frequency amplification, and/or the like). In some aspects, a UE 120 and/or the terrestrial base station 110 may be referred to as a ground station (GS).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may receive a downlink communication, the downlink communication including a HARQ process identifier that indicates a HARQ process to be used for the downlink communication; and may selectively provide HARQ feedback for the downlink communication based at least in part on the HARQ identifier and information indicating whether HARQ feedback is disabled for the HARQ process. Additionally, or alternatively, the communication manager 140 may perform one or more other operations described herein.

Similarly, the base station 110 may include a communication manager 150. As described in more detail elsewhere herein, the communication manager 150 may determine whether HARQ feedback is to be provided for a downlink communication; may identify a HARQ process to be used for the downlink communication based at least in part on whether HARQ feedback is to be provided for the downlink communication; and may transmit the downlink communication, the downlink communication including a HARQ process identifier that indicates the HARQ process to be used for the downlink communication. Additionally, or alternatively, the communication manager 150 may perform one or more other operations described herein.

As shown in FIG. 1, the UE 120 may include a communication manager 140. As described in more detail elsewhere herein, the communication manager 140 may transmit an indication of whether HARQ feedback is to be provided for an uplink communication; receive a grant associated with the uplink communication, the grant including a HARQ process identifier that indicates a HARQ process to be used for the uplink communication; and may selectively monitor for a retransmission grant, associated with the uplink communication, based at least in part on the HARQ process identifier and information indicating whether HARQ feedback is disabled for the HARQ process. Additionally, or alternatively, the communication manager 140 may perform one or more other operations described herein.

Similarly, the base station 110 may include a communication manager 150. As described in more detail elsewhere herein, the communication manager 150 may receive an indication of whether HARQ feedback is to be provided for an uplink communication; may identify, based at least in part on the indication, a HARQ process to be used for the uplink communication; and may transmit a grant associated with the uplink communication, the grant including a HARQ process identifier that indicates the HARQ process to be used for the uplink communication. Additionally, or alternatively, the communication manager 150 may perform one or more other operations described herein.

As indicated above, FIG. 1 is provided as an example. Other examples may differ from what is described with regard to FIG. 1.

Figure 2:
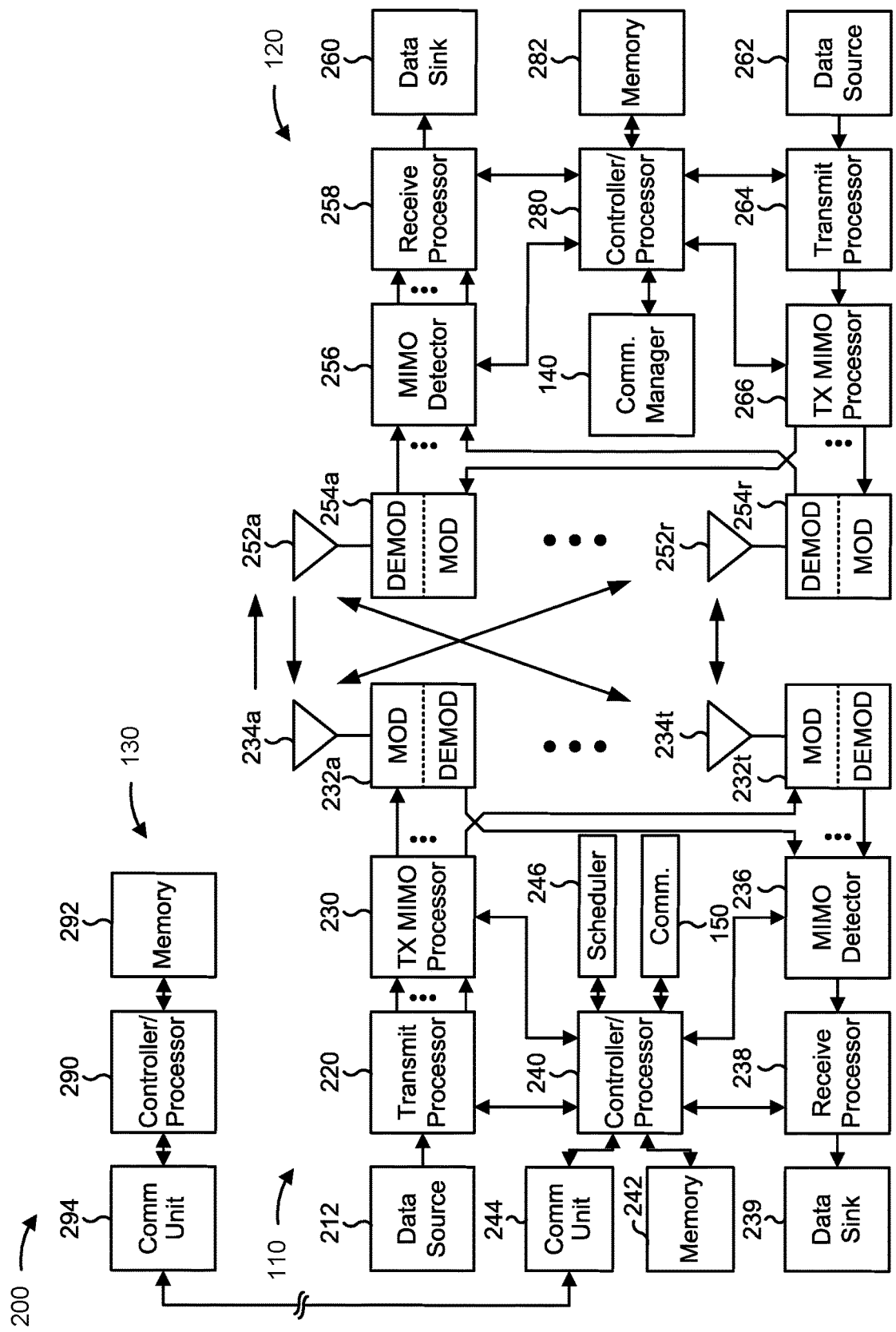
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3A-3G and 4-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3A-3G and 4-7).

Controller/processor 240 of base station 110, controller/processor 280 of UE 120, and/or any other component(s) of FIG. 2 may perform one or more techniques associated with disabling HARQ feedback, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for receiving information indicating whether HARQ feedback is disabled for a HARQ process; means for receiving a downlink communication, the downlink communication including a HARQ process identifier of the HARQ process, the HARQ process identifier indicating the HARQ process is to be used for the downlink communication; means for selectively providing HARQ feedback for the downlink communication based at least in part on the information indicating whether HARQ feedback is disabled for the HARQ process; and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, the base station 110 may include means for transmitting information indicating whether HARQ feedback is disabled for a HARQ process; means for transmitting a downlink communication, the downlink communication including a HARQ process identifier of the HARQ process, the HARQ process identifier indicating the HARQ process to be used for the downlink communication; and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

In some aspects, the UE 120 may include means for transmitting an indication of whether HARQ feedback or HARQ retransmission is to be provided for an uplink communication; means for receiving a grant for transmitting the uplink communication, the grant including a HARQ process identifier that indicates a HARQ process to be used for the uplink communication; means for selectively monitoring for a retransmission grant, associated with the uplink communication, based at least in part on the HARQ process identifier and information indicating whether HARQ feedback or HARQ retransmission is disabled for the HARQ process; and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, the base station 110 may include means for receiving an indication of whether HARQ feedback or HARQ retransmission is to be provided for an uplink communication; means for identifying, based at least in part on the indication, a HARQ process to be used for the uplink communication; means for transmitting a grant for transmitting the uplink communication, the grant including a HARQ process identifier that indicates the HARQ process to be used for the uplink communication; and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided as an example. Other examples may differ from what is described with regard to FIG. 2.

As described above, an NTN may utilize non-terrestrial base stations for providing or assisting UEs with access to a core network. A non-terrestrial base station may be located on a platform, which may be, for example, a satellite (e.g., a LEO satellite, a MEO satellite, a GEO satellite, or the like), a balloon, a dirigible, an airplane, a UAV, a drone, or the like. In an NTN system, propagation delay may be significant due to a relatively large distance between a UE and a non-terrestrial base station and/or a relatively large distance between a terrestrial base station and the non-terrestrial base station. In some cases, due to the significant propagation delay in an NTN system, it may be desirable to disable HARQ feedback so as to avoid stalling of the HARQ process. As a result, some HARQ processes may need to be configured to have HARQ feedback disabled. In general, such a configuration needs to be performed by an upper layer (e.g., an RLC layer, also referred to as an L3 layer), while HARQ feedback is sent by a lower layer (e.g., a PHY layer, also referred to as an L1 layer).

Some aspects described herein provide techniques and apparatuses for disabling HARQ feedback. For example, the techniques and apparatuses described herein enable configuration and use of a HARQ process (e.g., a downlink HARQ process or an uplink HARQ process) with HARQ feedback disabled at the physical layer. In some aspects, the techniques and apparatuses described herein may be used for disabling HARQ feedback. Disabling HARQ feedback prevents stalling of a HARQ process. For example, as described herein, propagation delay can cause HARQ process to stall, which degrades quality of service for the UE (e.g., due to a high probability of HARQ process errors), results in wasted network resources, and reduces network performance and efficiency. Therefore, by enabling disabling HARQ feedback, the techniques and apparatuses described herein reduce a likelihood of stalling a HARQ process, thereby improving quality of service for the UE (e.g., by reducing a likelihood of HARQ process errors), reducing wastage of network resources, and improving network performance and efficiency. Notably, the techniques and apparatuses described herein can be used in, for example, an NTN network or another scenario in which stalling of HARQ process may occur.

FIGS. 3A-3G are diagrams illustrating examples associated with disabling HARQ feedback, in accordance with the present disclosure.

Figure 3A:
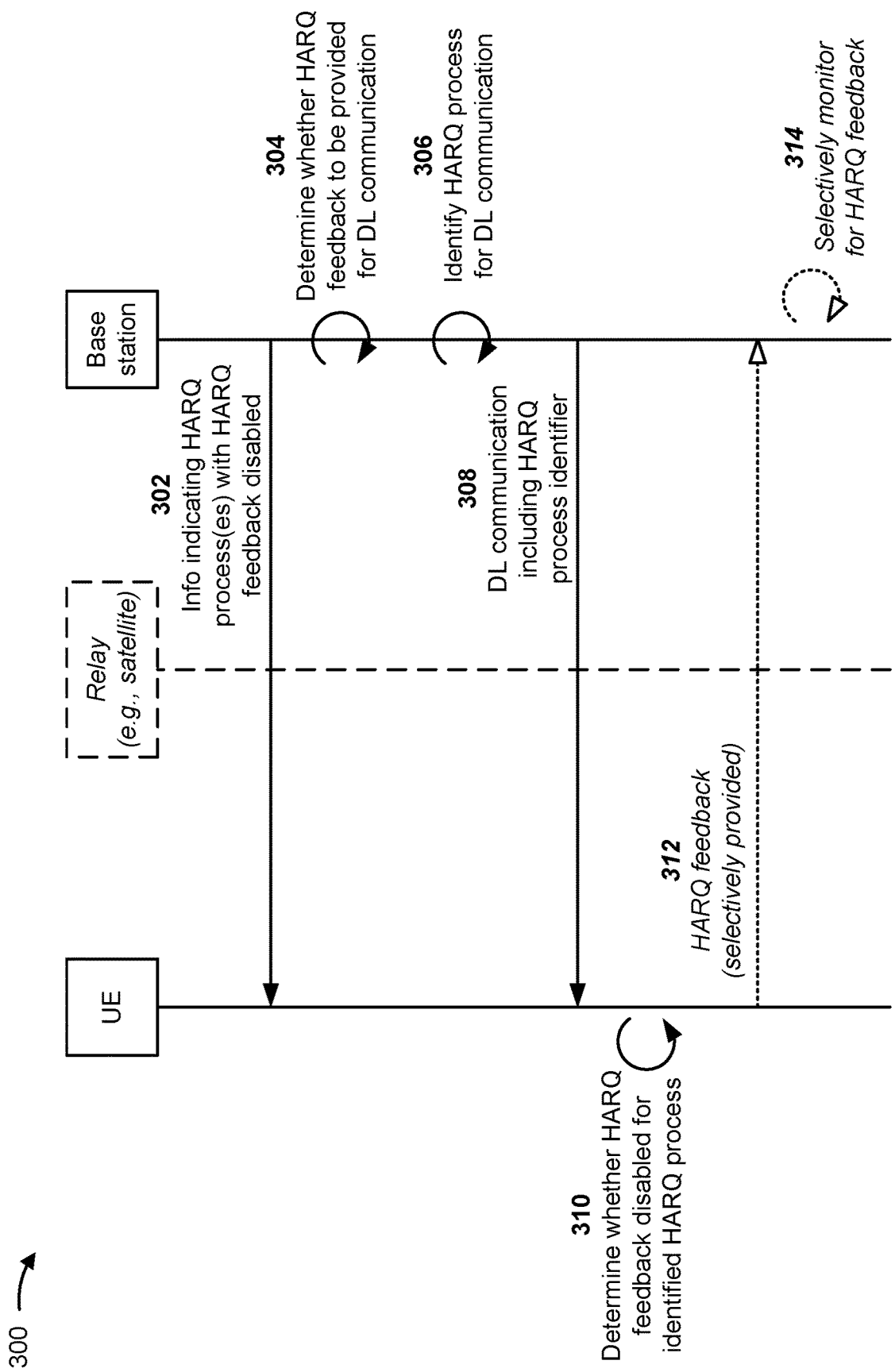
FIGS. 3A-3G are diagrams illustrating examples associated with disabling HARQ feedback, in accordance with the present disclosure.

FIG. 3A is a diagram illustrating an example 300 associated with disabling HARQ feedback associated with a downlink communication to be transmitted by a base station (e.g., a base station 110) for receipt by a UE (e.g., a UE 120). The base station may be a non-terrestrial base station (e.g., a non-terrestrial base station 110) or may be a terrestrial base station (e.g., a terrestrial base station 110 that does not utilize a non-terrestrial base station as a relay). In some cases, when the base station is a terrestrial base station (e.g., a terrestrial base station 110), a non-terrestrial base station (e.g., a non-terrestrial base station 110) acts as a relay, as indicated in FIG. 3A.

As shown in FIG. 3A by reference 302, the base station may provide, and the UE may receive, information indicating one or more HARQ processes, of a set of HARQ processes configured on the UE, for which HARQ feedback is to be disabled.

For example, the base station may transmit (e.g., via radio resource control (RRC) signaling) a configuration indicating that HARQ feedback is to be disabled for the one or more HARQ processes. In some aspects, the configuration includes a value indicating a quantity of HARQ processes for which HARQ feedback is disabled. For example, when Y (Y≥1, such as 16) HARQ processes are configured, the value may indicate that HARQ feedback is to be disabled for X (X≤Y) of the Y HARQ processes. In some aspects, the X HARQ processes for which HARQ feedback is to be disabled may be determined as HARQ process 0 to HARQ process (X−1) or as HARQ process (Y−X) to HARQ process (Y−1). In this way, the configuration can indicate a range of HARQ processes for which HARQ feedback is disabled. Alternatively, in some aspects, the configuration includes a bitmap indicating, for each HARQ process of the set of HARQ processes, whether HARQ feedback is disabled (e.g., where a bit 1 indicates HARQ feedback is enabled for a corresponding HARQ process and a bit 0 indicates HARQ feedback is disabled for a corresponding HARQ process). In some aspects, the configuration indicates that HARQ feedback is disabled for retransmissions, for one or more of the one or more HARQ processes (e.g., that HARQ feedback is disabled for retransmissions, but not for initial transmissions). Additionally, or alternatively, the configuration may indicate that HARQ feedback is disabled for initial transmissions for one or more of the one or more HARQ processes (e.g., that HARQ feedback is disabled for initial transmissions, but not for retransmissions).

As another example, the base station may transmit a dynamic indication including information indicating whether HARQ feedback is disabled for a HARQ process associated with the downlink communication. In some aspects, the dynamic indication may be transmitted via, for example, a physical downlink control channel (PDCCH), a medium access control control element (MAC-CE), or the like. Thus, in some aspects, the base station can dynamically toggle (e.g., bit 0=not toggled, bit 1=toggled) HARQ feedback for a given HARQ process via, for example, PDCCH or MAC-CE. In some aspects, the dynamic indication may further indicate that HARQ feedback is disabled for retransmissions for the HARQ process (e.g., that HARQ feedback is disabled for retransmissions, but not for initial transmissions). Additionally, or alternatively, the configuration may indicate that HARQ feedback is disabled for initial transmissions for the HARQ processes (e.g., that HARQ feedback is disabled for initial transmissions, but not for retransmissions). In some aspects, the dynamic indication may override a configuration indicating whether HARQ feedback is disabled for the HARQ process (e.g., a configuration previously provided to the UE by the base station).

As shown by reference 304, the base station may determine whether HARQ feedback is to be provided for a downlink communication that is to be transmitted to the UE. In some aspects, the base station determines whether HARQ feedback is to be provided for the downlink communication based at least in part on one or more mapping rules for a logical channel associated with the downlink communication. A mapping rule for a logical channel may be associated with, for example, a quality of service (QoS) flow. For example, the mapping rule may indicate that HARQ feedback is to be provided for the QoS flow, or may indicate that HARQ feedback is not to be provided for the QoS flow. As another example, the mapping rule for the logical channel may be associated with a logical channel configuration (e.g., a configuration indicating whether the logical channel is permitted to use a particular subcarrier spacing (SCS), a particular numerology, or the like). Here, the mapping rule may indicate that HARQ feedback is to be provided when, for example, the logical channel is permitted to use a particular SCS and a particular numerology, or may indicate that HARQ feedback is not to be provided when, for example, the logical channel is not permitted to use the particular SCS and the particular numerology. As another example, the mapping rule for the logical channel may be associated with an amount of data pending for the logical channel. For example, the mapping rule may indicate that no HARQ feedback is to be provided when an amount of data that needs to be transmitted for the logical channel satisfies a threshold. In some aspects, the base station may be configured with one or more of the one or more mapping rules. Additionally, or alternatively, the base station may receive one or more of the one or more mapping rules from the UE.

In some aspects, the base station determines whether HARQ feedback is to be provided for the downlink communication based at least in part on UE capability information associated with disabling HARQ feedback. The capability information may include an indication of, for example, whether the UE supports disabling HARQ feedback for any of the set of HARQ processes. As another example, the capability information may include an indication of a particular quantity of HARQ processes for which the UE supports disabling HARQ feedback. As another example, the capability information may include an indication of whether the UE supports disabling HARQ feedback for the HARQ process (e.g., the HARQ process associated with the downlink communication). In some aspects, the UE may provide, and the base station may receive, the capability information associated with the UE. In some aspects, the capability information may include a bitmap indicating, for each HARQ process of the set of HARQ processes, whether HARQ feedback disabling is supported.

In some aspects, the capability information may include a preference for disabling HARQ feedback. That is, in some aspects, the UE can indicate a preference for disabling HARQ feedback associated with the HARQ process dynamically (e.g., when the UE is in connected mode). In some aspects, the UE may provide, and the base station may receive, the preference via, for example, an RRC message, a MAC-CE, or the like.

As shown by reference 306, the base station may identify a HARQ process to be used for the downlink communication based at least in part on whether HARQ feedback is to be provided for the downlink communication. For example, the base station may determine that HARQ feedback is to be provided for the downlink communication, and may identify an available HARQ process with HARQ feedback enabled as the HARQ process to be used for the downlink communication. As another example, the base station may determine that HARQ feedback is not to be provided for the downlink communication, and may identify an available HARQ process with HARQ feedback disabled as the HARQ process to be used for the downlink communication. As another example, the base station may determine that HARQ feedback is not to be provided for the downlink communication, and may determine that no HARQ processes with HARQ feedback disabled are available. In this example, the base station may identify an available HARQ process with HARQ feedback enabled as the HARQ process to be used for the downlink communication, and may provide a dynamic indication to the UE to cause HARQ feedback to be disabled for the HARQ process.

In some aspects, the base station may determine whether HARQ feedback is to provided for a given HARQ process. In some aspects, the base station may determine whether HARQ feedback should be provided for the given HARQ process based at least in part on HARQ feedback received (e.g., from a UE) in a MAC-CE or an uplink RRC message. In some aspects, the base station may transmit a configuration indicating a change in whether HARQ feedback is to be provided for the given HARQ process or a change to a mapping rule for a logical channel based at least in part on determining whether HARQ feedback should be provided for the given HARQ process.

As a general example (applicable to both downlink communications and uplink communications), when data for a communication arrives in a logical channel, an indication of whether the communication requires HARQ feedback is indicated by an upper layer (e.g., an RLC layer) to a lower layer (e.g., a MAC layer). Here, a MAC entity may form a MAC protocol data unit (PDU) and provide the MAC PDU to the physical layer. In some aspects, the MAC entity may prioritize data from a logical channel that requires HARQ feedback over a logical channel that does not require HARQ feedback. In some aspects, the MAC PDU includes data from one or more logical channels that require HARQ feedback or includes data from one or more logical channels that do not require HARQ feedback. Here, the indication of whether HARQ feedback is required is provided to the physical layer (along with the MAC PDU). As described herein, the higher layer can generate the indication (i.e., can determine whether HARQ feedback is to be provided for the communication) based at least in part on a QoS flow of the logical channel, a logical channel configuration of the logical channel, an amount of data pending for the logical channel, or the like. Based on the indication, the physical layer can then identify an available HARQ process (e.g., a HARQ process for which HARQ feedback is enabled or a HARQ process for which HARQ feedback is disabled, depending on the indication) to be used for the communication. In some aspects, if at least one MAC service data unit (SDU) requires HARQ feedback in a given MAC PDU, then a HARQ process with HARQ feedback enabled is identified to be used for the communication. Notably, in some aspects, if no HARQ process that satisfies the indication is available, then the physical layer may override a configuration of a HARQ process. For example, the indication may indicate that HARQ feedback is to be provided for a downlink communication, but the physical layer may determine that there are no available HARQ processes with HARQ feedback enabled. Here, the physical layer may select a HARQ process with HARQ feedback disabled, and provide, to the UE, a dynamic indication indicating that HARQ feedback is enabled for the selected HARQ process (e.g., as described above).

As shown by reference 308, the base station may transmit the downlink communication. Here, the downlink communication may include a HARQ process identifier that indicates the HARQ process to be used for the downlink communication. That is, the downlink communication may include a HARQ process identifier that identifies the HARQ process identified by the base station as the HARQ process to be used for the downlink communication. As shown, the UE may receive the downlink communication including the HARQ process identifier that indicates a HARQ process to be used for the downlink communication.

As shown by reference 310, the UE may determine whether HARQ feedback is disabled for the HARQ process identified in the downlink communication and, as shown by reference 312, may selectively provide HARQ feedback associated with the downlink based at least in part on the determination. Here, the UE may determine whether HARQ feedback is enabled for the HARQ process identified in the downlink, and selectively provide HARQ feedback for the downlink communication based at least in part on the HARQ identifier and information indicating whether HARQ feedback is disabled for the identified HARQ process. For example, the UE may receive (e.g., in a configuration, in a dynamic indication, or the like, as described above) information indicating whether HARQ feedback is disabled for a HARQ process, as described above. Here, upon receiving a downlink communication including a HARQ process identifier associated with the HARQ process, the UE may identify the HARQ process as the HARQ process to be used for the downlink communication. The UE may therefore determine whether HARQ feedback is disabled for the HARQ process, and may selectively provide HARQ feedback accordingly (e.g., the UE may provide HARQ feedback when HARQ feedback is not disabled the HARQ process, and the UE may not provide HARQ feedback when HARQ feedback is disabled for the identified HARQ process).

As shown by reference 314, the base station may selectively monitor for HARQ feedback associated with the downlink communication based at least in part on whether HARQ feedback is to be provided for the downlink communication.

Figure 3B:
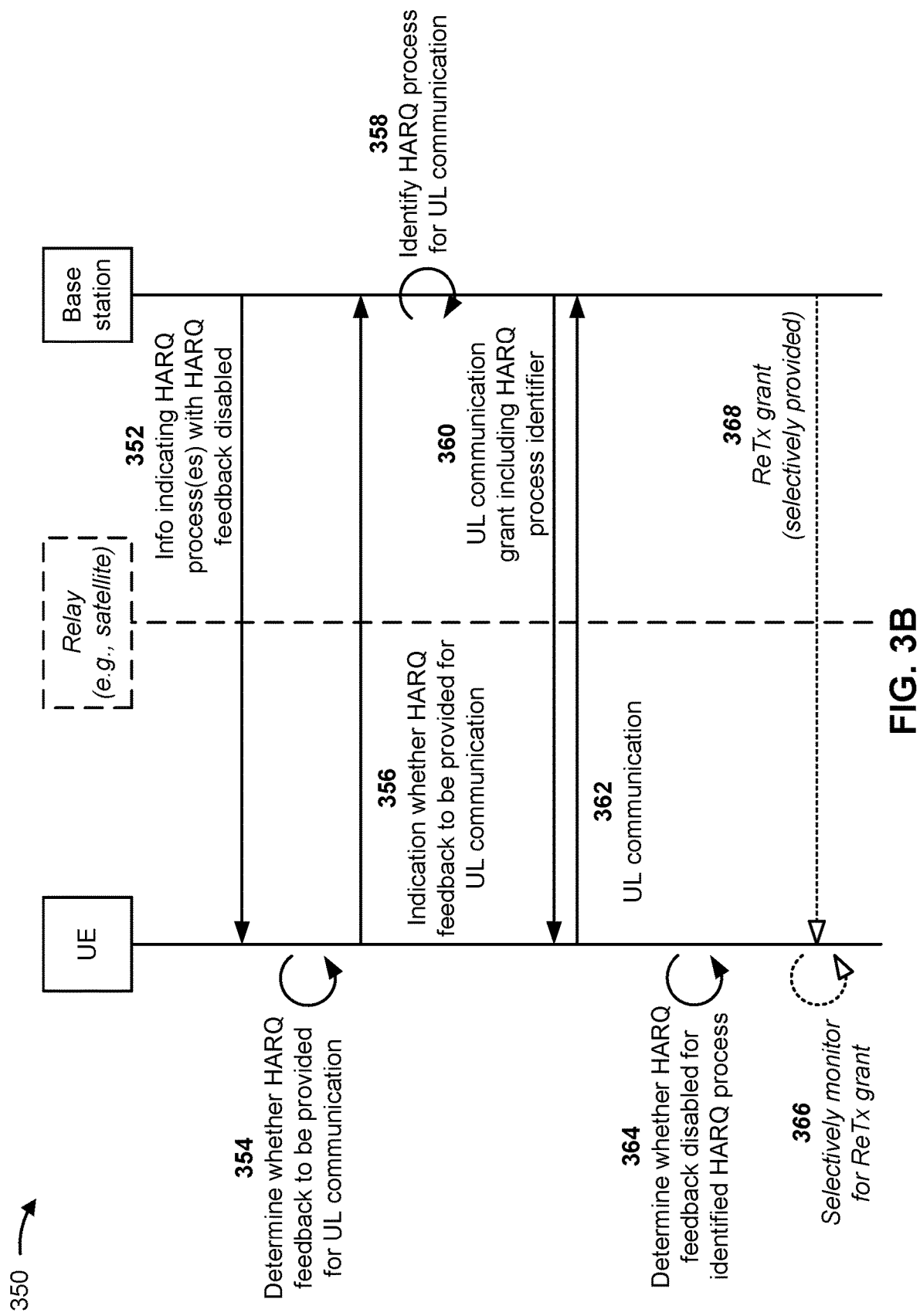

FIG. 3B is a diagram illustrating an example 350 associated with disabling HARQ feedback associated with an uplink communication to be transmitted by a UE (e.g., a UE 120) for receipt by a base station (e.g., a base station 110). The base station may be a non-terrestrial base station (e.g., a non-terrestrial base station 110) or may be a terrestrial base station (e.g., a terrestrial base station 110 that does not utilize a non-terrestrial base station as a relay). In some cases, when the base station is a terrestrial base station (e.g., a terrestrial base station 110), a non-terrestrial base station (e.g., a non-terrestrial base station 110) acts as a relay, as indicated in FIG. 3B.

As shown in FIG. 3B by reference 352, the base station may provide, and the UE may receive, information indicating one or more HARQ processes, of a set of HARQ processes configured on the UE, for which HARQ feedback is to be disabled. For example, the base station may transmit a configuration indicating that HARQ feedback is to be disabled for the one or more HARQ processes, or may transmit a dynamic indication including information indicating whether HARQ feedback is disabled for a given HARQ process, as described above in association with FIG. 3A.

As shown by reference 354, the UE may determine whether HARQ feedback is to be provided for an uplink communication that is to be transmitted by the UE.

In some aspects, the UE determines whether HARQ feedback is to be provided for the uplink communication based at least in part on one or more mapping rules for a logical channel associated with the uplink communication. A mapping rule for a logical channel may be associated with, for example, a quality QoS flow associated with the logical channel, a logical channel configuration associated with the logical channel, an amount of data pending for the logical channel, or the like, as described above. In some aspects, the UE may be configured with one or more of the one or more mapping rules. Additionally, or alternatively, the UE may receive one or more of the one or more mapping rules (e.g., from the base station).

In some aspects, the UE determines whether HARQ feedback is to be provided for the uplink communication based at least in part on UE capability information associated with disabling HARQ feedback. The capability information may include an indication of, for example, whether the UE supports disabling HARQ feedback for any of the set of HARQ processes, a particular quantity of HARQ processes for which the UE supports disabling HARQ feedback, whether the UE supports disabling HARQ feedback for a given HARQ process, or the like, as described above. In some aspects, the UE may provide, and the base station may receive, the capability information associated with the UE. In some aspects, the capability information may include a bitmap indicating, for each HARQ process of the set of HARQ processes, whether HARQ feedback disabling is supported. In some aspects, the capability information may include a preference for disabling HARQ feedback, as described above.

As shown by reference 356, the UE may transmit, and the base station may receive, an indication of whether HARQ feedback is to be provided for the uplink communication. In some aspects, the indication may include an indication of whether the UE will monitor for a retransmission uplink grant associated with the uplink communication. In some aspects, the UE may transmit the indication in a scheduling request associated with the uplink communication. In some aspects, the UE may transmit the scheduling request including the indication via, for example, uplink control information (UCI), a physical uplink control channel (PUCCH), a MAC-CE, a new physical SR configuration resource, a specific schedule request occasion, or the like. Alternatively, in some aspects, the UE may transmit the indication in a buffer status report (BSR). Here, the BSR may include a logical channel identifier of a logical channel associated with the uplink communication. In some aspects, when the indication is transmitted via a MAC-CE, the MAC-CE may include a bitmap indicating, for each logical channel of a set of logical channels, whether monitoring for retransmission grants is to be performed. In some aspects, the MAC-CE is a fixed size MAC-CE with zero length, where the indication can be transmitted using a reserved bit in a subheader.

As shown by reference 358, the base station may identify a HARQ process to be used for the uplink communication based at least in part on the indication of whether HARQ feedback is to be provided for the uplink communication (i.e., the indication of whether the UE will monitor for a retransmission uplink grant associated with the uplink communication). For example, when the indication indicates that HARQ feedback is to be provided for the uplink communication, the base station may identify an available HARQ process with HARQ feedback enabled as the HARQ process to be used for the uplink communication. As another example, when the indication indicates that HARQ feedback is not to be provided for the uplink communication, the base station may identify an available HARQ process with HARQ feedback disabled as the HARQ process to be used for the uplink communication. As another example, when the indication indicates that HARQ feedback is not to be provided for the uplink communication, the base station may determine that no HARQ processes with HARQ feedback disabled are available. In this example, the base station may identify an available HARQ process with HARQ feedback enabled as the HARQ process to be used for the uplink communication, and may provide a dynamic indication to the UE to cause HARQ feedback to be disabled for the HARQ process.

As shown by reference 360, the base station may transmit, and the UE may receive, a grant associated with the uplink communication. Here, the grant may include a HARQ process identifier that indicates the HARQ process to be used for the uplink communication. That is, the grant may include a HARQ process identifier that identifies the HARQ process identified by the base station as the HARQ process to be used for the uplink communication.

As shown by reference 362, the UE may transmit the uplink communication based at least in part on the grant, and the base station may receive the uplink communication transmitted by the UE.

As shown by reference 364, the UE may determine whether HARQ feedback is disabled for the HARQ process identified in the grant and, as shown by reference 366, may selectively monitor for a retransmission grant, associated with the uplink communication, based at least in part on the determination. Here, the UE may determine whether HARQ feedback is enabled for the identified HARQ process and selectively monitor for a retransmission grant for the uplink communication based at least in part on the HARQ identifier and information indicating whether HARQ feedback is disabled for the identified HARQ process. For example, the UE may receive (e.g., in a configuration, in a dynamic indication, or the like) information indicating whether HARQ feedback is disabled for a HARQ process, as described above. Here, upon receiving a grant including a HARQ process identifier associated with the HARQ process, the UE may identify the HARQ process as the HARQ process to be used for the uplink communication. The UE may therefore determine whether HARQ feedback is disabled for the HARQ process. Here, the UE may transmit the uplink communication according to the grant, and may selectively monitor for a retransmission grant for the uplink communication accordingly (e.g., the UE may monitor for a retransmission grant when HARQ feedback is not disabled for the HARQ process, and the UE may not monitor for a retransmission grant when HARQ feedback is disabled for the identified HARQ process).

As shown by reference 368, the base station may selectively provide a retransmission grant, associated with the uplink communication, based at least in part on whether HARQ feedback is disabled for the HARQ process. For example, when HARQ feedback is enabled for the HARQ process, the base station may provide a retransmission associated with the uplink communication, as needed. Conversely, when HARQ feedback is disabled for the HARQ process, the base station may refrain from providing a retransmission associated with the uplink communication.

Figure 3C:
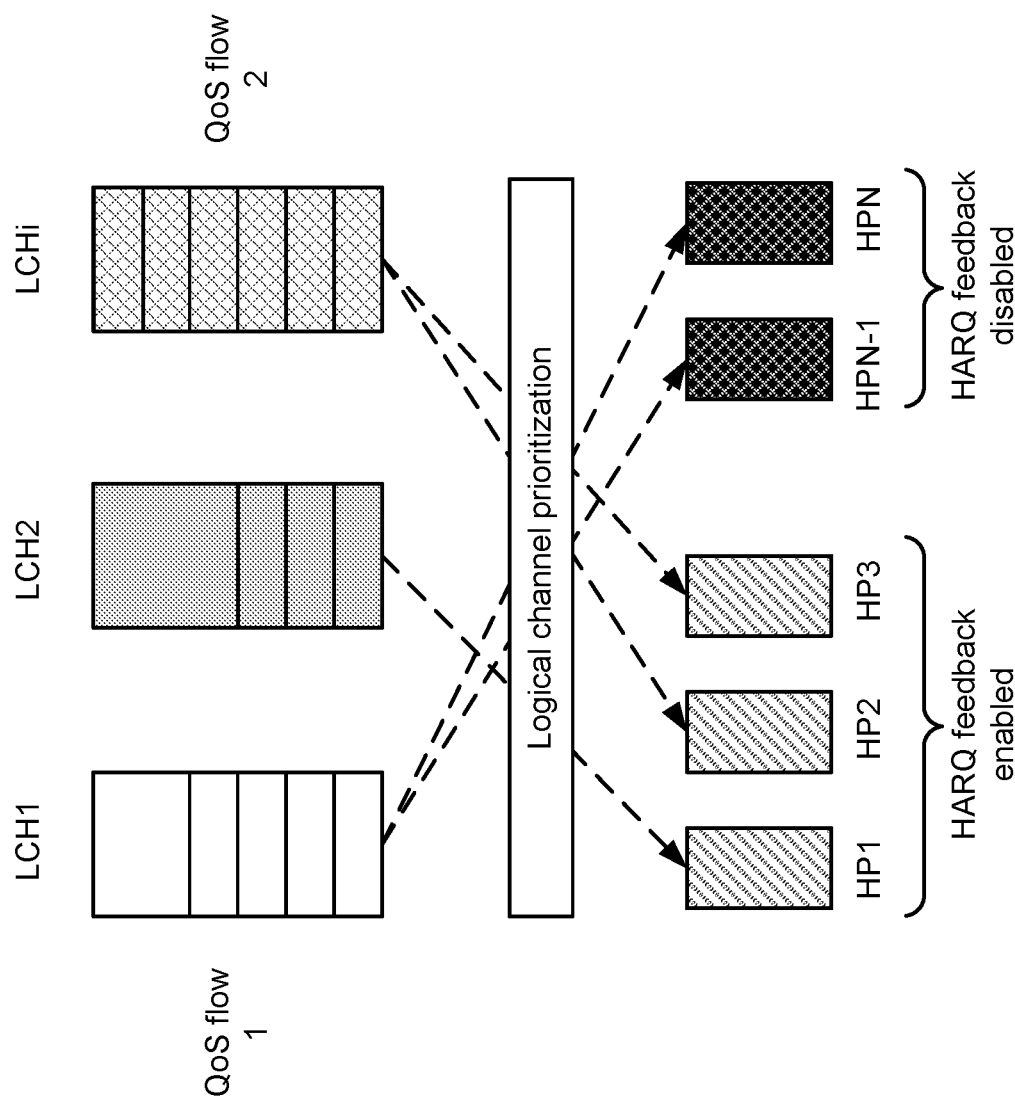

FIG. 3C is a diagram illustrating an example of identifying HARQ processes for different logical channels, as described herein. The operations described in association with FIG. 3C can be performed by a wireless communication device such as a base station (e.g., a base station 110), a UE (e.g., UE 120), or the like. In FIG. 3C, the wireless communication device may determine that communications for a first logical channel (LCH1) do not require HARQ feedback. The wireless communication device may make this determination, for example, based at least in part on a mapping rule indicating that HARQ feedback is not needed for a QoS flow associated with the first logical channel (identified in FIG. 3C as QoS flow 1). In this example, the wireless communication device may identify HARQ processes HPN−1 and HPN as HARQ processes to be used for the first logical channel.

As further shown, the wireless communication device may determine that communications for a second logical channel (LCH2) require HARQ feedback. The wireless communication device may make this determination, for example, based at least in part on a logical channel configuration associated with the second logical channel (e.g., based at least in part on a mapping rule that indicates that HARQ feedback is required). In this example, the wireless communication device may identify HARQ process HP1 as a HARQ process to be used for the second logical channel.

As further shown, the wireless communication device may determine that communications for a third logical channel (LCHi) require HARQ feedback. The wireless communication device may make this determination, for example, based at least in part on a mapping rule indicating that HARQ feedback is needed for a QoS flow associated with the third logical channel (identified in FIG. 3C as QoS flow 2). In this example, the wireless communication device may identify HARQ processes HP2 and HP3 as HARQ processes to be used for the third logical channel.

FIGS. 3D-3G are diagrams illustrating examples of the processes shown in FIGS. 3A and 3B in the context of the example HARQ processes shown in FIG. 3C. Reference numbers in FIGS. 3D-3G correspond the reference numbers described above in association with FIGS. 3A-3C.

Figure 3D:
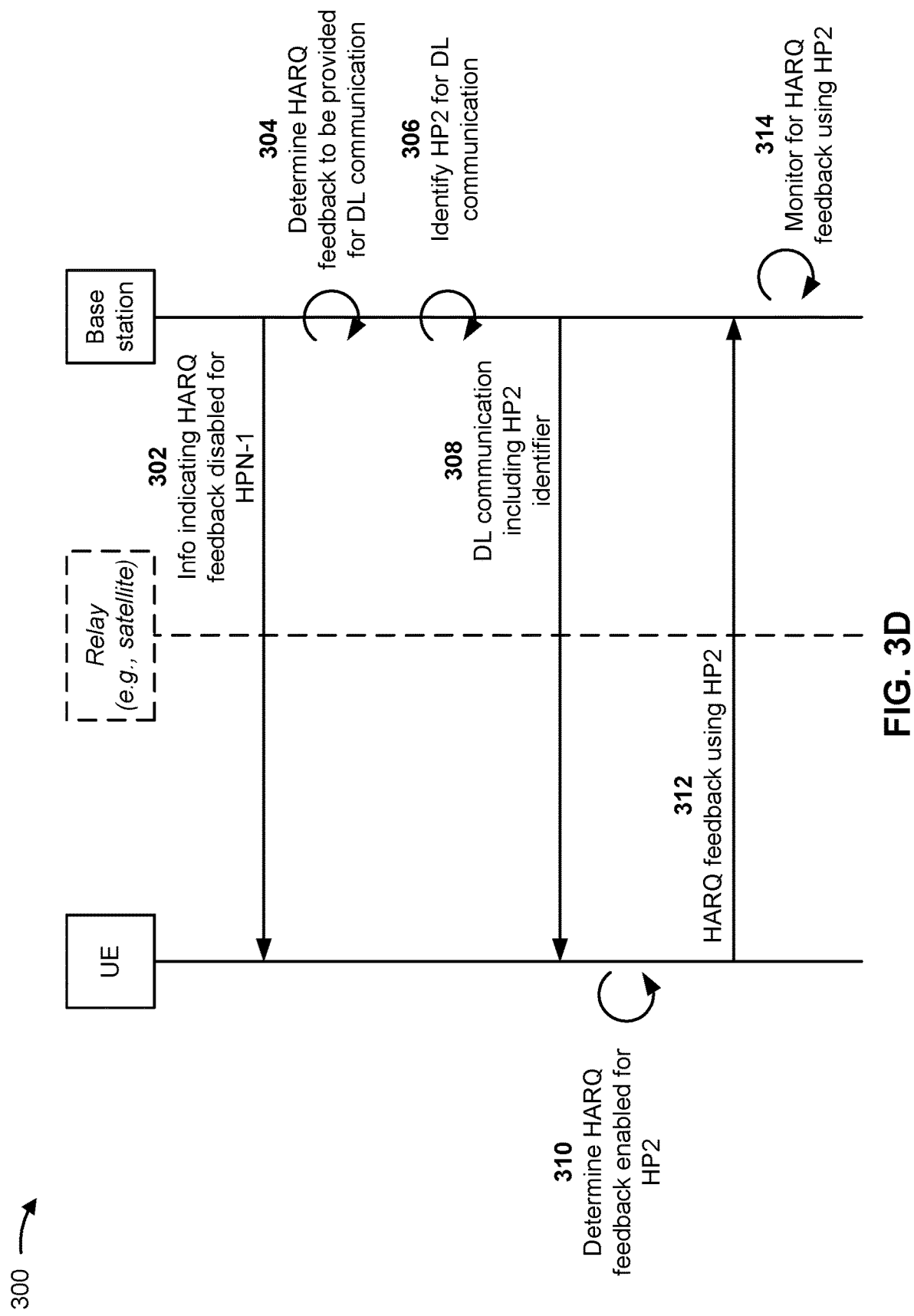
Figure 3E:
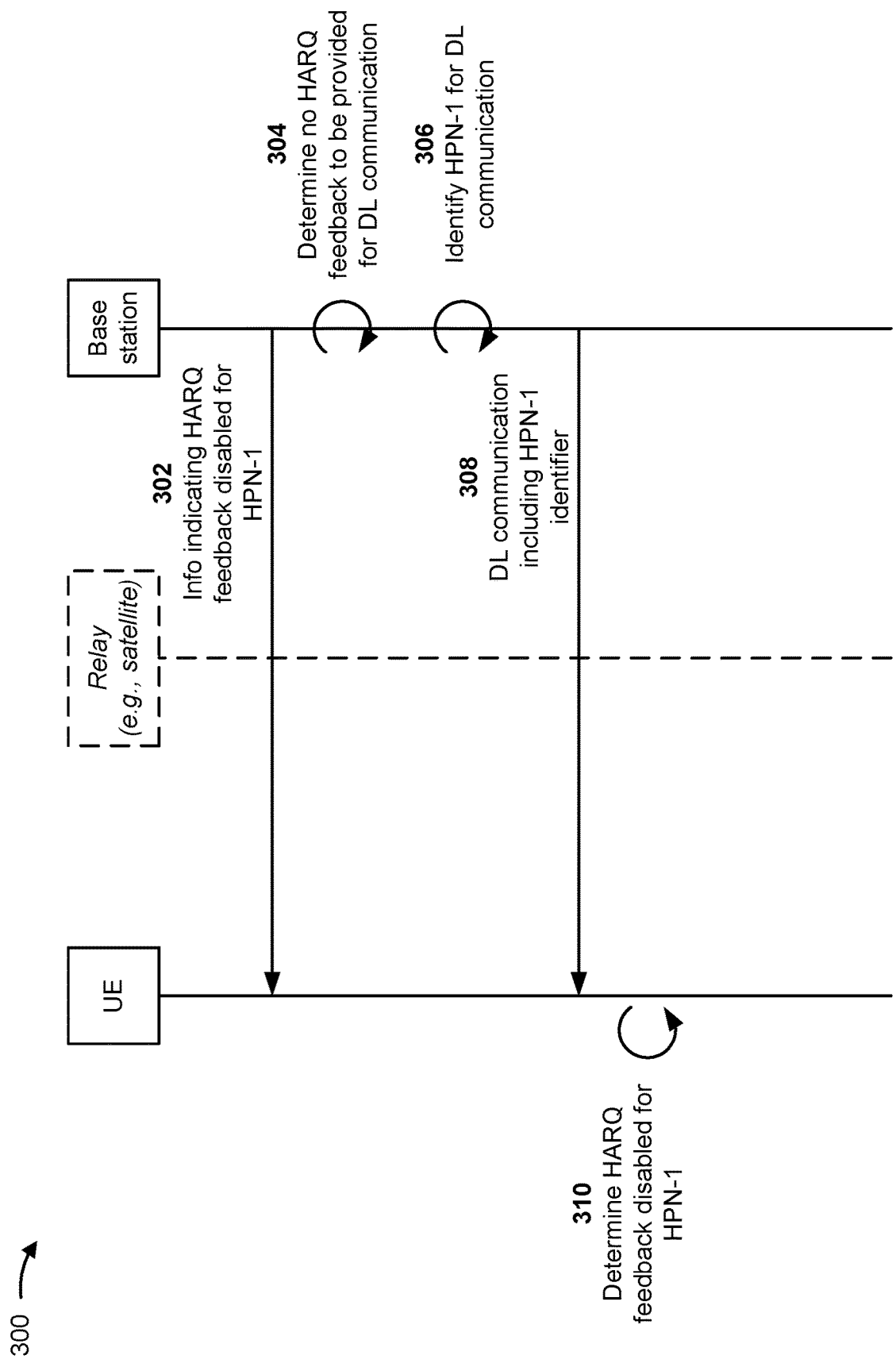

FIGS. 3D and 3E illustrate examples associated with disabling HARQ feedback in a downlink scenario.

In FIG. 3D, as shown by reference 302, the base station transmits, and the UE receives, information indicating that HARQ feedback is disabled for HARQ process HPN−1 (i.e., that HARQ feedback is not disabled for HARQ processes other than HARQ process HPN−1). As shown by reference 304, the base station determines (e.g., based on performing logical channel prioritization as shown in FIG. 3C) that HARQ feedback is to be provided for a downlink communication to be transmitted to the UE, and, shown by reference 306, identifies HARQ process HP2 (e.g., HARQ process HP2 being a HARQ process for which HARQ feedback is not disabled) as the HARQ process to be used for the downlink communication. As shown by reference 308, the base station transmits, and the UE receives, the downlink communication, with the downlink communication including a HARQ process identifier of HARQ process HP2. As shown by reference 310, the UE determines, based at least in part on the HARQ process identifier of HARQ process HP2 being included in the downlink communication, that HARQ feedback is to be provided for the downlink communication. As shown by reference 312, the UE provides HARQ feedback associated with the downlink communication using the HARQ process HP2 and, as shown by reference 314, the base station monitors for the HARQ feedback using the HARQ process HP2.

In FIG. 3E, as shown by reference 302, the base station transmits, and the UE receives, information indicating that HARQ feedback is disabled for HARQ process HPN−1 (i.e., that HARQ feedback is not disabled for HARQ processes other than HARQ process HPN−1). As shown by reference 304, the base station determines (e.g., based on performing logical channel prioritization as shown in FIG. 3C) that HARQ feedback is not to be provided for a downlink communication to be transmitted to the UE, and, shown by reference 306, identifies HARQ process HPN−1 (e.g., HARQ process HPN−1 being a HARQ process for which HARQ feedback is disabled) as the HARQ process to be used for the downlink communication. As shown by reference 308, the base station transmits, and the UE receives, the downlink communication, with the downlink communication including a HARQ process identifier of HARQ process HPN−1. As shown by reference 310, the UE determines, based at least in part on the HARQ process identifier of HARQ process HPN−1 being included in the downlink communication, that HARQ feedback is not to be provided for the downlink communication.

Figure 3F:
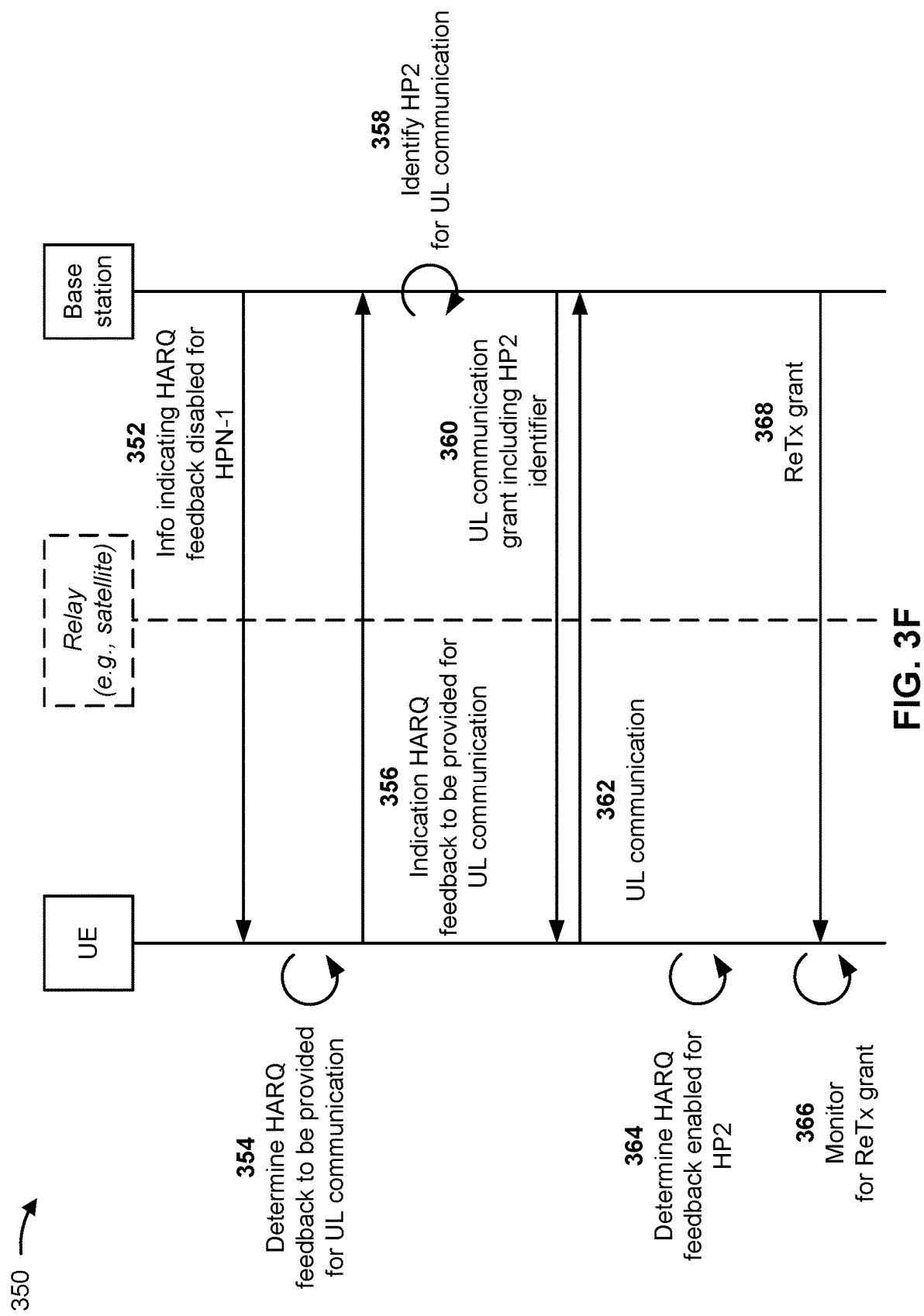
Figure 3G:
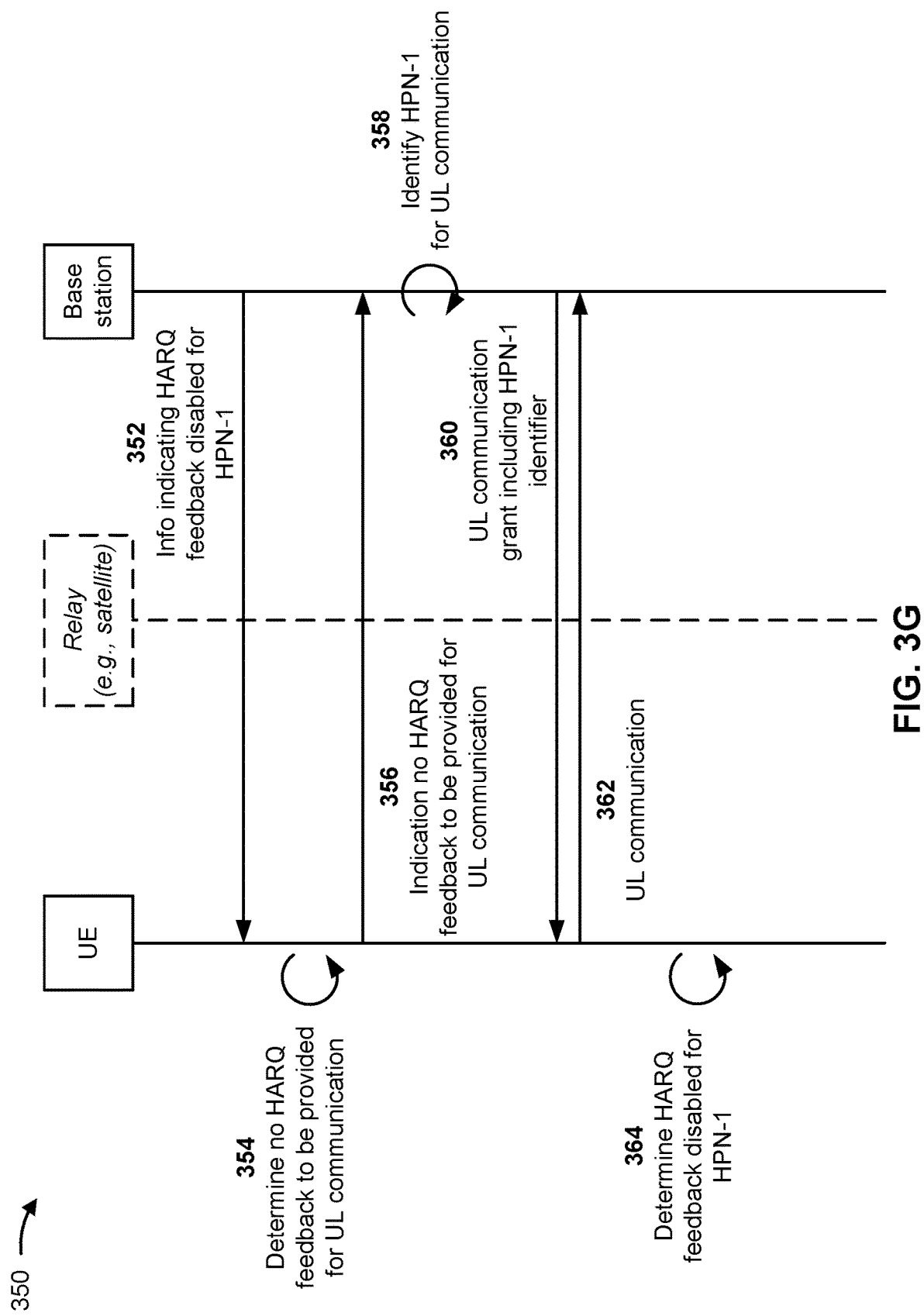

FIGS. 3F and 3G illustrate examples associated with disabling HARQ feedback in an uplink scenario.

In FIG. 3F, as shown by reference 352, the base station transmits, and the UE receives, information indicating that HARQ feedback is disabled for HARQ process HPN−1 (i.e., that HARQ feedback is not disabled for HARQ processes other than HARQ process HPN−1). As shown by reference 354, the UE determines (e.g., based on performing logical channel prioritization as shown in FIG. 3C) that HARQ feedback is to be provided for an uplink communication to be transmitted to the base station. As shown by reference 356, the UE transmits an indication that HARQ feedback is to be provided for the uplink communication. As shown by reference 358, the base station receives the indication and identifies HARQ process HP2 (e.g., HARQ process HP2 being a HARQ process for which HARQ feedback is not disabled) as the HARQ process to be used for the uplink communication. As shown by reference 360, the base station transmits, and the UE receives, an uplink grant, with the uplink grant including a HARQ process identifier of HARQ process HP2. As shown by reference 362, the UE receives the uplink grant and transmits the uplink communication according to the uplink grant. As shown by reference 364, the UE determines, based at least in part on the HARQ process identifier of HARQ process HP2 being included in the uplink grant communication, that the UE is to monitor for a retransmission grant and, as shown by reference 366, monitors for the retransmission grant.

In FIG. 3G, as shown by reference 352, the base station transmits, and the UE receives, information indicating that HARQ feedback is disabled for HARQ process HPN−1 (i.e., that HARQ feedback is not disabled for HARQ processes other than HARQ process HPN−1). As shown by reference 354, the UE determines (e.g., based on performing logical channel prioritization as shown in FIG. 3C) that no HARQ feedback is to be provided for an uplink communication to be transmitted to the base station. As shown by reference 356, the UE transmits an indication that no HARQ feedback is to be provided for the uplink communication. As shown by reference 358, the base station receives the indication and identifies HARQ process HPN-1 (e.g., HARQ process HPN-1 being a HARQ process for which HARQ feedback is disabled) as the HARQ process to be used for the uplink communication. As shown by reference 360, the base station transmits, and the UE receives, an uplink grant, with the uplink grant including a HARQ process identifier of HARQ process HPN-1. As shown by reference 362, the UE receives the uplink grant and transmits the uplink communication according to the uplink grant. As shown by reference 364, the UE determines, based at least in part on the HARQ process identifier of HARQ process HPN-1 being included in the uplink grant communication, that the UE need not monitor for a retransmission grant.

As indicated above, FIGS. 3A-3G are provided as examples. Other examples may differ from what is described with respect to FIGS. 3A-3G.

Figure 4:
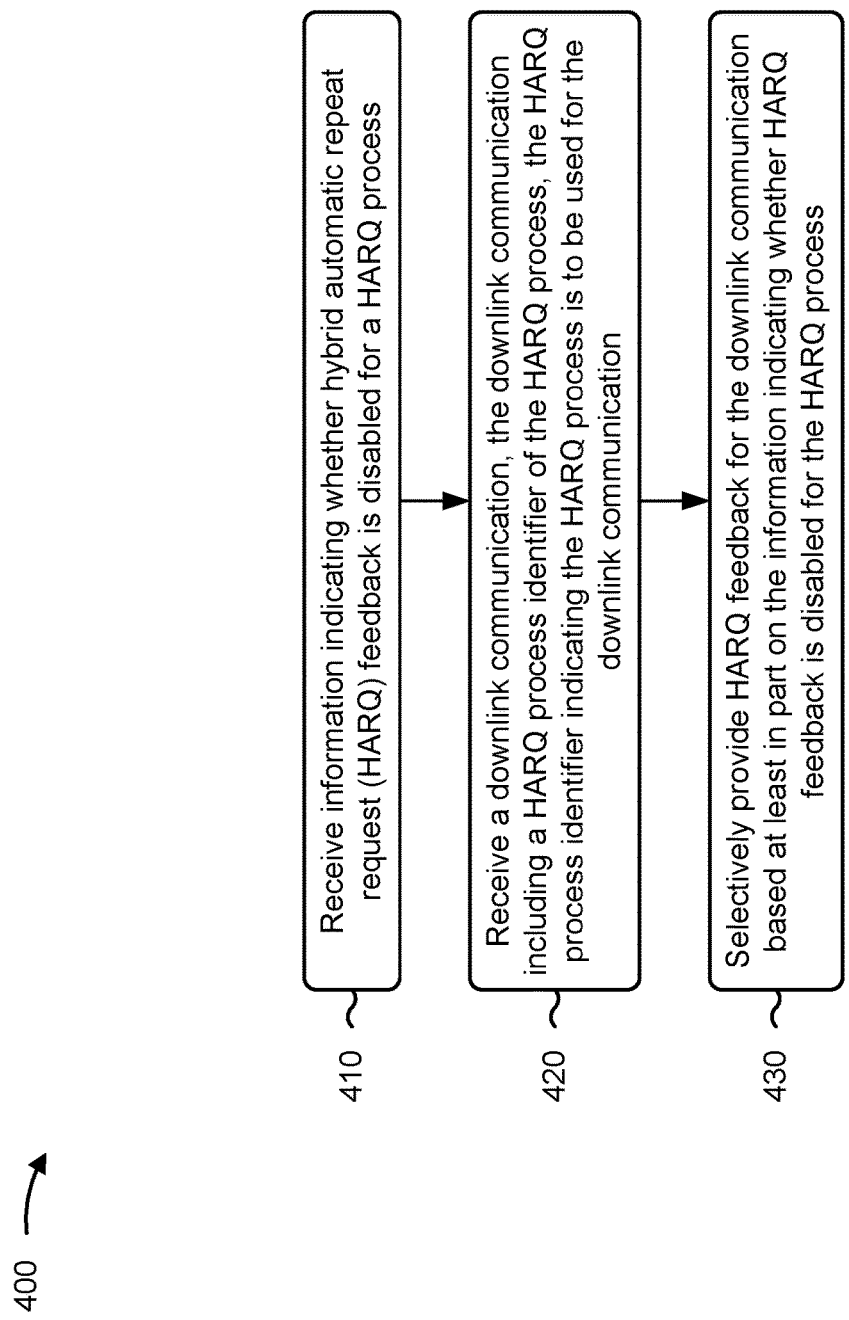
FIG. 4 is a diagram illustrating an example process performed, for example, by a user equipment, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with disabling HARQ feedback.

As shown in FIG. 4, in some aspects, process 400 may include receiving information indicating whether HARQ feedback is disabled for a HARQ process (block 410). For example, the UE (e.g., using reception component 802, depicted in FIG. 8) may receive information indicating whether HARQ feedback is disabled for a HARQ process, as described above.

As further shown in FIG. 4, in some aspects, process 400 may include receiving a downlink communication, the downlink communication including a HARQ process identifier of the HARQ process, the HARQ process identifier indicating the HARQ process is to be used for the downlink communication (block 420). For example, the UE (e.g., using reception component 802, depicted in FIG. 8) may receive a downlink communication, the downlink communication including a HARQ process identifier of the HARQ process, the HARQ process identifier indicating the HARQ process is to be used for the downlink communication, as described above.

As further shown in FIG. 4, in some aspects, process 400 may include selectively providing HARQ feedback for the downlink communication based at least in part on the information indicating whether HARQ feedback is disabled for the HARQ process (block 430). For example, the UE (e.g., using communication manager 804 or transmission component 806, depicted in FIG. 8) may selectively provide HARQ feedback for the downlink communication based at least in part on the information indicating whether HARQ feedback is disabled for the HARQ process, as described above.

Process 400 may include additional aspects, such as any single aspect or any combination of aspects described below and/or in connection with one or more other processes described elsewhere herein.

In a first aspect, process 400 includes receiving a configuration indicating that HARQ feedback is disabled for one or more HARQ processes of a set of HARQ processes, the HARQ process being included in the set of HARQ processes, wherein the configuration includes the information indicating whether HARQ feedback is disabled for the HARQ process.

In a second aspect, alone or in combination with the first aspect, the configuration is received via at least one of radio resource control signaling or downlink control information (DCI).

In a third aspect, alone or in combination with one or more of the first and second aspects, the configuration includes a value indicating a quantity of HARQ processes in the one or more HARQ processes for which HARQ feedback is disabled.

In a fourth aspect, alone or in combination with one or more of the first through third aspects, the configuration includes a bitmap indicating, for each HARQ process of the set of HARQ processes, whether HARQ feedback is disabled.

In a fifth aspect, alone or in combination with one or more of the first through fourth aspects, the configuration indicates a range of HARQ processes for which HARQ feedback is disabled.

In a sixth aspect, alone or in combination with one or more of the first through fifth aspects, the configuration indicates that HARQ feedback is disabled for retransmissions for the one or more HARQ processes.

In a seventh aspect, alone or in combination with one or more of the first through sixth aspects, the configuration indicates that HARQ feedback is disabled for initial transmissions for the one or more HARQ processes.

In an eighth aspect, alone or in combination with one or more of the first through seventh aspects, process 400 includes receiving a dynamic indication including the information indicating whether HARQ feedback is disabled for the HARQ process.

In a ninth aspect, alone or in combination with one or more of the first through eighth aspects, the dynamic indication is received via at least one of a physical downlink control channel, or a medium access control (MAC) control element.

In a tenth aspect, alone or in combination with one or more of the first through ninth aspects, the dynamic indication further indicates that HARQ feedback is disabled for retransmissions for the HARQ process.

In an eleventh aspect, alone or in combination with one or more of the first through tenth aspects, the dynamic indication further indicates that HARQ feedback is disabled for initial transmissions for the HARQ process.

In a twelfth aspect, alone or in combination with one or more of the first through eleventh aspects, the dynamic indication overrides a configuration indicating whether HARQ feedback is disabled for the HARQ process.

In a thirteenth aspect, alone or in combination with one or more of the first through twelfth aspects, process 400 includes providing capability information associated with disabling HARQ feedback.

In a fourteenth aspect, alone or in combination with one or more of the first through thirteenth aspects, the capability information includes an indication of at least one of whether disabling HARQ feedback is supported for any of a set of HARQ processes, a particular quantity of HARQ processes for which disabling HARQ feedback is supported, or whether disabling HARQ feedback is supported for the HARQ process.

In a fifteenth aspect, alone or in combination with one or more of the first through fourteenth aspects, the capability information includes a bitmap indicating, for each HARQ process of a set of HARQ processes, whether HARQ feedback disabling is supported.

In a sixteenth aspect, alone or in combination with one or more of the first through fifteenth aspects, the capability information includes a preference for disabling HARQ feedback.

In a seventeenth aspect, alone or in combination with one or more of the first through sixteenth aspects, the preference for disabling HARQ feedback is provided via at least one of a radio resource control message, or a MAC control element.

In an eighteenth aspect, alone or in combination with one or more of the first through seventeenth aspects, process 400 includes providing a mapping rule for a logical channel associated with the downlink communication.

In a nineteenth aspect, alone or in combination with one or more of the first through eighteenth aspects, the mapping rule for the logical channel is associated with at least one of a quality of service flow associated with the logical channel, a logical channel configuration associated with the logical channel, or an amount of data pending for the logical channel.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
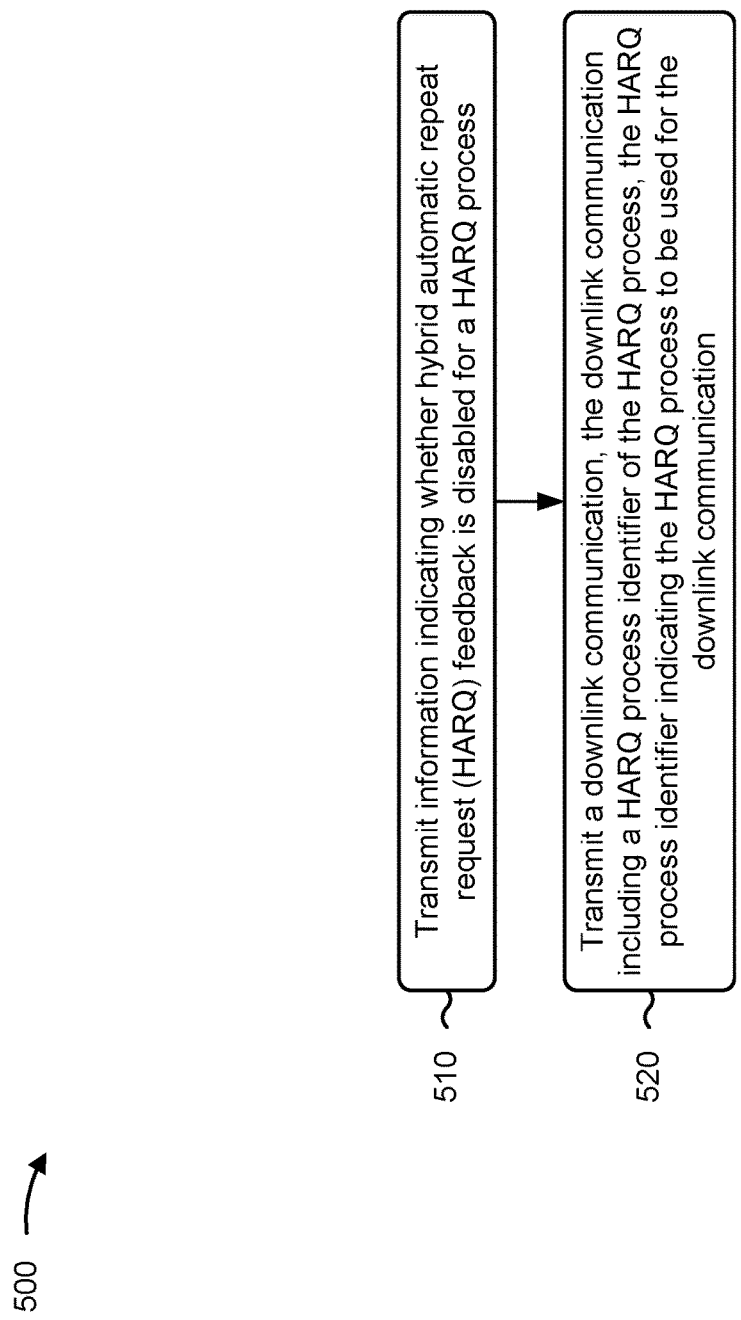
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110) performs operations associated with disabling HARQ feedback.

As shown in FIG. 5, in some aspects, process 500 may include transmitting information indicating whether HARQ feedback is disabled for a HARQ process (block 510). For example, the base station (e.g., using transmission component 1206, depicted in FIG. 12) may transmit information indicating whether HARQ feedback is disabled for a HARQ process, as described above.

As further shown in FIG. 5, in some aspects, process 500 may include transmitting a downlink communication, the downlink communication including a HARQ process identifier of the HARQ process, the HARQ process identifier indicating the HARQ process to be used for the downlink communication (block 520). For example, the base station (e.g., using transmission component 1206, depicted in FIG. 12) may transmit a downlink communication, the downlink communication including a HARQ process identifier of the HARQ process, the HARQ process identifier indicating the HARQ process to be used for the downlink communication, as described above.

Process 500 may include additional aspects, such as any single aspect or any combination of aspects described below and/or in connection with one or more other processes described elsewhere herein.

In a first aspect, process 500 includes determining whether HARQ feedback is to be provided for the downlink communication, and identifying the HARQ process to be used for the downlink communication based at least in part on the determination of whether HARQ feedback is to be provided for the downlink communication.

In a second aspect, alone or in combination with the first aspect, transmitting the information indicating whether HARQ feedback is disabled comprises transmitting a configuration indicating that HARQ feedback is disabled for one or more HARQ processes of a set of HARQ processes, the HARQ process being included in the set of HARQ processes, wherein the configuration includes the information indicating whether HARQ feedback is disabled for the HARQ process.

In a third aspect, alone or in combination with one or more of the first and second aspects, the configuration is transmitted via at least one of radio resource control signaling or DCI.

In a fourth aspect, alone or in combination with one or more of the first through third aspects, the configuration includes a value indicating a quantity of HARQ processes in the one or more HARQ processes, in the set of HARQ processes, for which HARQ feedback is disabled.

In a fifth aspect, alone or in combination with one or more of the first through fourth aspects, the configuration includes a bitmap indicating, for each HARQ process of the set of HARQ processes, whether HARQ feedback is disabled.

In a sixth aspect, alone or in combination with one or more of the first through fifth aspects, the configuration indicates a range of HARQ processes for which HARQ feedback is disabled.

In a seventh aspect, alone or in combination with one or more of the first through sixth aspects, the configuration indicates that HARQ feedback is disabled for retransmissions for the one or more HARQ processes.

In an eighth aspect, alone or in combination with one or more of the first through seventh aspects, the configuration indicates that HARQ feedback is disabled for initial transmissions for the one or more HARQ processes.

In a ninth aspect, alone or in combination with one or more of the first through eighth aspects, process 500 includes transmitting a dynamic indication including information indicating whether HARQ feedback is disabled for the HARQ process.

In a tenth aspect, alone or in combination with one or more of the first through ninth aspects, the dynamic indication is transmitted via at least one of a physical downlink control channel, or a MAC control element.

In an eleventh aspect, alone or in combination with one or more of the first through tenth aspects, the dynamic indication further indicates that HARQ feedback is disabled for retransmissions for the HARQ process.

In a twelfth aspect, alone or in combination with one or more of the first through eleventh aspects, the dynamic indication further indicates that HARQ feedback is disabled for initial transmissions for the HARQ process.

In a thirteenth aspect, alone or in combination with one or more of the first through twelfth aspects, the dynamic indication overrides a configuration indicating whether HARQ feedback is disabled for the HARQ process.

In a fourteenth aspect, alone or in combination with one or more of the first through thirteenth aspects, process 500 includes receiving capability information associated with disabling HARQ feedback.

In a fifteenth aspect, alone or in combination with one or more of the first through fourteenth aspects, the capability information includes an indication of at least one of whether disabling HARQ feedback is supported for any of a set of HARQ processes, a particular quantity of HARQ processes for which disabling HARQ feedback is supported, or whether disabling HARQ feedback is supported for the HARQ process.

In a sixteenth aspect, alone or in combination with one or more of the first through fifteenth aspects, the capability information includes a bitmap indicating, for each HARQ process of a set of HARQ processes, whether HARQ feedback disabling is supported.

In a seventeenth aspect, alone or in combination with one or more of the first through sixteenth aspects, the capability information includes a preference for disabling HARQ feedback.

In an eighteenth aspect, alone or in combination with one or more of the first through seventeenth aspects, the preference for disabling HARQ feedback is received via at least one of a radio resource control message, or a MAC control element.

In a nineteenth aspect, alone or in combination with one or more of the first through eighteenth aspects, the determining whether HARQ feedback is to be provided for the downlink communication is based at least in part on the capability information.

In a twentieth aspect, alone or in combination with one or more of the first through nineteenth aspects, whether HARQ feedback is to be provided for the HARQ process is determined based at least in part on HARQ feedback received in a MAC control element or an uplink radio resource control message.

In a twenty-first aspect, alone or in combination with one or more of the first through twentieth aspects, process 500 includes transmitting a configuration indicating a change in whether HARQ feedback is to be provided for the HARQ process or a change to a mapping rule for a logical channel.

In a twenty-second aspect, alone or in combination with one or more of the first through twenty-first aspects, the determining whether HARQ feedback is to be provided for the downlink communication is based at least in part on a mapping rule for a logical channel associated with the downlink communication.

In a twenty-third aspect, alone or in combination with one or more of the first through twenty-second aspects, the mapping rule for the logical channel is associated with at least one of a quality of service flow associated with the logical channel, a logical channel configuration associated with the logical channel, or an amount of data pending for the logical channel.

In a twenty-fourth aspect, alone or in combination with one or more of the first through twenty-third aspects, process 500 includes receiving the mapping rule for the logical channel associated with the downlink communication.

In a twenty-fifth aspect, alone or in combination with one or more of the first through twenty-fourth aspects, a prioritization for the identifying the HARQ process to be used for the downlink communication is based at least in part on whether HARQ feedback is to be provided for the downlink communication.

In a twenty-sixth aspect, alone or in combination with one or more of the first through twenty-fifth aspects, process 500 includes selectively monitoring for HARQ feedback associated with the downlink communication based at least in part on whether HARQ feedback is to be provided for the downlink communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
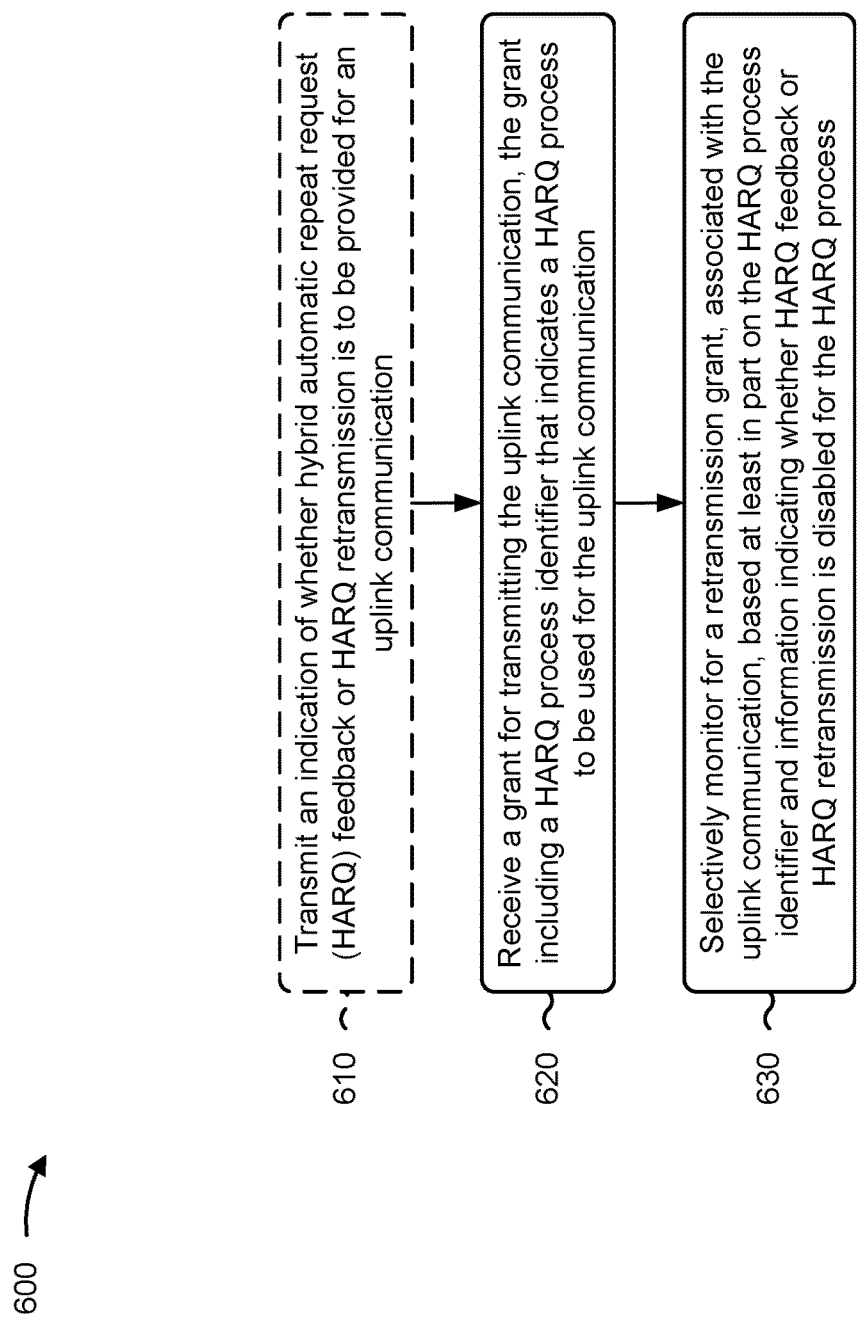
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120) performs operations associated with disabling HARQ feedback.

As shown in FIG. 6, in some aspects, process 600 may optionally include transmitting an indication of whether HARQ feedback or HARQ retransmission is to be provided for an uplink communication (block 610). For example, the UE (e.g., using transmission component 806, depicted in FIG. 8) may transmit an indication of whether HARQ feedback or HARQ retransmission is to be provided for an uplink communication, as described above.

As further shown in FIG. 6, in some aspects, process 600 may include receiving a grant for transmitting the uplink communication, the grant including a HARQ process identifier that indicates a HARQ process to be used for the uplink communication (block 620). For example, the UE (e.g., using reception component 802, depicted in FIG. 8) may receive a grant for transmitting the uplink communication, the grant including a HARQ process identifier that indicates a HARQ process to be used for the uplink communication, as described above.

As further shown in FIG. 6, in some aspects, process 600 may include selectively monitoring for a retransmission grant, associated with the uplink communication, based at least in part on the HARQ process identifier and information indicating whether HARQ feedback or HARQ retransmission is disabled for the HARQ process (block 630). For example, the UE (e.g., using reception component 802 or communication manager 804, depicted in FIG. 8) may selectively monitor for a retransmission grant, associated with the uplink communication, based at least in part on the HARQ process identifier and information indicating whether HARQ feedback or HARQ retransmission is disabled for the HARQ process, as described above.

Process 600 may include additional aspects, such as any single aspect or any combination of aspects described below and/or in connection with one or more other processes described elsewhere herein.

In a first aspect, process 600 includes transmitting the uplink communication based at least in part on the grant.

In a second aspect, alone or in combination with the first aspect, process 600 includes receiving a configuration indicating that HARQ feedback or HARQ retransmission is disabled for one or more HARQ processes of a set of HARQ processes, the HARQ process being included in the set of HARQ processes, wherein the configuration includes the information indicating whether HARQ feedback or HARQ retransmission is disabled for the HARQ process.

In a third aspect, alone or in combination with one or more of the first and second aspects, the configuration is received via at least one of radio resource control signaling or DCI.

In a fourth aspect, alone or in combination with one or more of the first through third aspects, the configuration includes a value indicating a quantity of HARQ processes in the one or more HARQ processes, in the set of HARQ processes, for which HARQ feedback or HARQ retransmission is disabled.

In a fifth aspect, alone or in combination with one or more of the first through fourth aspects, the configuration includes a bitmap indicating, for each HARQ process of the set of HARQ processes, whether HARQ feedback or HARQ retransmission is disabled.

In a sixth aspect, alone or in combination with one or more of the first through fifth aspects, the configuration indicates a range of HARQ processes for which HARQ feedback or HARQ retransmission is disabled.

In a seventh aspect, alone or in combination with one or more of the first through sixth aspects, the configuration indicates that HARQ feedback or HARQ retransmission is disabled for subsequent retransmissions after initial transmission for the one or more HARQ processes.

In an eighth aspect, alone or in combination with one or more of the first through seventh aspects, the configuration indicates that HARQ feedback or HARQ retransmission is disabled for initial transmissions for the one or more HARQ processes.

In a ninth aspect, alone or in combination with one or more of the first through eighth aspects, process 600 includes receiving a dynamic indication including the information indicating whether HARQ feedback or HARQ retransmission is disabled for the HARQ process.

In a tenth aspect, alone or in combination with one or more of the first through ninth aspects, the dynamic indication is received via at least one of a physical downlink control channel, or a MAC control element.

In an eleventh aspect, alone or in combination with one or more of the first through tenth aspects, the dynamic indication further indicates that HARQ feedback is disabled for retransmissions for the HARQ process.

In a twelfth aspect, alone or in combination with one or more of the first through eleventh aspects, the dynamic indication further indicates that HARQ feedback is disabled for initial transmissions for the HARQ process.

In a thirteenth aspect, alone or in combination with one or more of the first through twelfth aspects, the dynamic indication overrides a configuration indicating whether HARQ feedback is disabled for the HARQ process.

In a fourteenth aspect, alone or in combination with one or more of the first through thirteenth aspects, process 600 includes determining whether HARQ feedback is to be provided for the uplink communication.

In a fifteenth aspect, alone or in combination with one or more of the first through fourteenth aspects, the determining whether HARQ feedback is to be provided for the uplink communication is based at least in part on capability information.

In a sixteenth aspect, alone or in combination with one or more of the first through fifteenth aspects, the capability information includes an indication of at least one of whether disabling HARQ feedback is supported for any of a set of HARQ processes, a particular quantity of HARQ processes for which disabling HARQ feedback is supported, or whether disabling HARQ feedback is supported for the HARQ process.

In a seventeenth aspect, alone or in combination with one or more of the first through sixteenth aspects, the capability information includes a preference for disabling HARQ feedback.

In an eighteenth aspect, alone or in combination with one or more of the first through seventeenth aspects, determining whether HARQ feedback or HARQ retransmission is to be provided for the uplink communication is based at least in part on a mapping rule for transmitting the uplink communication from a logical channel using the HARQ process.

In a nineteenth aspect, alone or in combination with one or more of the first through eighteenth aspects, the mapping rule is associated with at least one of a quality of service flow associated with the logical channel, a logical channel configuration associated with the logical channel, or an amount of data pending for the logical channel.

In a twentieth aspect, alone or in combination with one or more of the first through nineteenth aspects, process 600 includes receiving the mapping rule for the logical channel determining whether the uplink communication can be transmitted in the HARQ process indicated in the uplink grant.

In a twenty-first aspect, alone or in combination with one or more of the first through twentieth aspects, the indication is transmitted in a scheduling request associated with the uplink communication.

In a twenty-second aspect, alone or in combination with one or more of the first through twenty-first aspects, the scheduling request is transmitted via at least one of uplink control information, a physical uplink control channel, or a new physical SR configuration resource, or a specific schedule request occasion.

In a twenty-third aspect, alone or in combination with one or more of the first through twenty-second aspects, the indication is transmitted in a buffer status report including a logical channel identifier of a logical channel associated with the uplink communication.

In a twenty-fourth aspect, alone or in combination with one or more of the first through twenty-third aspects, the indication is transmitted in a medium access control control element (MAC-CE).

In a twenty-fifth aspect, alone or in combination with one or more of the first through twenty-fourth aspects, the MAC-CE includes a bitmap indicating, for each logical channel of a set of logical channels, whether monitoring for retransmission grants is to be performed, wherein the uplink communication is associated with a logical channel of the set of logical channels.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
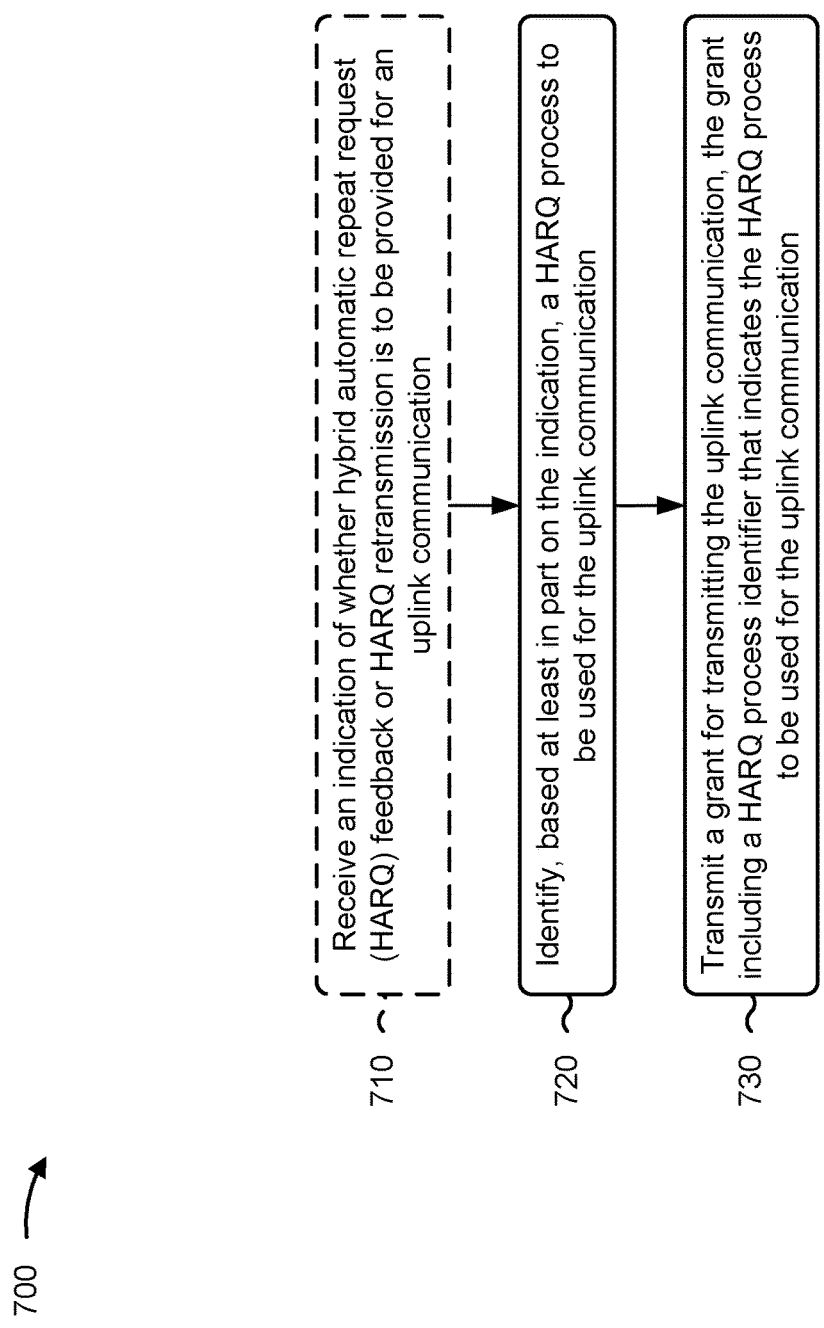
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with disabling HARQ feedback.

As shown in FIG. 7, in some aspects, process 700 may optionally include receiving an indication of whether HARQ feedback or HARQ retransmission is to be provided for an uplink communication (block 710). For example, the base station (e.g., using reception component 1202, depicted in FIG. 12) may receive an indication of whether HARQ feedback or HARQ retransmission is to be provided for an uplink communication, as described above.

As further shown in FIG. 7, in some aspects, process 700 may include identifying, based at least in part on the indication, a HARQ process to be used for the uplink communication (block 720). For example, the base station (e.g., using communication manager 1204, depicted in FIG. 12) may identify, based at least in part on the indication, a HARQ process to be used for the uplink communication, as described above.

As further shown in FIG. 7, in some aspects, process 700 may include transmitting a grant for transmitting the uplink communication, the grant including a HARQ process identifier that indicates the HARQ process to be used for the uplink communication (block 730). For example, the base station (e.g., using transmission component 1206, depicted in FIG. 12) may transmit a grant for transmitting the uplink communication, the grant including a HARQ process identifier that indicates the HARQ process to be used for the uplink communication, as described above.

Process 700 may include additional aspects, such as any single aspect or any combination of aspects described below and/or in connection with one or more other processes described elsewhere herein.

In a first aspect, process 700 includes receiving the uplink communication after transmitting the grant.

In a second aspect, alone or in combination with the first aspect, process 700 includes selectively providing a retransmission grant, associated with the uplink communication, based at least in part on whether HARQ feedback is disabled for the HARQ process.

In a third aspect, alone or in combination with one or more of the first and second aspects, process 700 includes transmitting a configuration indicating that HARQ feedback or HARQ retransmission is disabled for one or more HARQ processes of a set of HARQ processes, the HARQ process being included in the set of HARQ processes, wherein the configuration includes information indicating whether HARQ feedback or HARQ retransmission is disabled for the HARQ process.

In a fourth aspect, alone or in combination with one or more of the first through third aspects, the configuration is transmitted via at least one of radio resource control signaling or DCI.

In a fifth aspect, alone or in combination with one or more of the first through fourth aspects, the configuration includes a value indicating a quantity of HARQ processes in the one or more HARQ processes, in the set of HARQ processes, for which HARQ feedback or HARQ retransmission is disabled.

In a sixth aspect, alone or in combination with one or more of the first through fifth aspects, the configuration includes a bitmap indicating, for each HARQ process of the set of HARQ processes, whether HARQ feedback or HARQ retransmission is disabled.

In a seventh aspect, alone or in combination with one or more of the first through sixth aspects, the configuration indicates a range of HARQ processes for which HARQ feedback or HARQ retransmission is disabled.

In an eighth aspect, alone or in combination with one or more of the first through seventh aspects, the configuration indicates that HARQ feedback or HARQ retransmission is disabled for subsequent retransmissions after initial transmission for the one or more HARQ processes.

In a ninth aspect, alone or in combination with one or more of the first through eighth aspects, the configuration indicates that HARQ feedback or HARQ retransmission is disabled for initial transmissions for the one or more HARQ processes.

In a tenth aspect, alone or in combination with one or more of the first through ninth aspects, process 700 includes transmitting a dynamic indication including information indicating whether HARQ feedback or HARQ retransmission is disabled for the HARQ process.

In an eleventh aspect, alone or in combination with one or more of the first through tenth aspects, the dynamic indication is transmitted via at least one of a physical downlink control channel, or a medium access control control element.

In a twelfth aspect, alone or in combination with one or more of the first through eleventh aspects, the dynamic indication further indicates that HARQ feedback is disabled for retransmissions for the HARQ process.

In a thirteenth aspect, alone or in combination with one or more of the first through twelfth aspects, the dynamic indication further indicates that HARQ feedback is disabled for initial transmissions for the HARQ process.

In a fourteenth aspect, alone or in combination with one or more of the first through thirteenth aspects, the dynamic indication overrides a configuration indicating whether HARQ feedback is disabled for the HARQ process.

In a fifteenth aspect, alone or in combination with one or more of the first through fourteenth aspects, process 700 includes transmitting a mapping rule for a logical channel determining whether the uplink communication can be transmitted in the HARQ process indicated the grant.

In a sixteenth aspect, alone or in combination with one or more of the first through fifteenth aspects, the mapping rule is associated with at least one of a quality of service flow associated with the logical channel, a logical channel configuration associated with the logical channel, or an amount of data pending for the logical channel.

In a seventeenth aspect, alone or in combination with one or more of the first through sixteenth aspects, the indication is received in a scheduling request associated with the uplink communication.

In an eighteenth aspect, alone or in combination with one or more of the first through seventeenth aspects, the scheduling request is received via at least one of uplink control information, a physical uplink control channel, or a new physical SR configuration resource, or a specific schedule request occasion.

In a nineteenth aspect, alone or in combination with one or more of the first through eighteenth aspects, the indication is received in a buffer status report including a logical channel identifier of a logical channel associated with the uplink communication.

In a twentieth aspect, alone or in combination with one or more of the first through nineteenth aspects, the indication is received in a medium access control control element (MAC-CE).

In a twenty-first aspect, alone or in combination with one or more of the first through twentieth aspects, the MAC-CE includes a bitmap indicating, for each logical channel of a set of logical channels, whether monitoring for retransmission grants is to be performed, wherein the uplink communication is associated with a logical channel of the set of logical channels.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
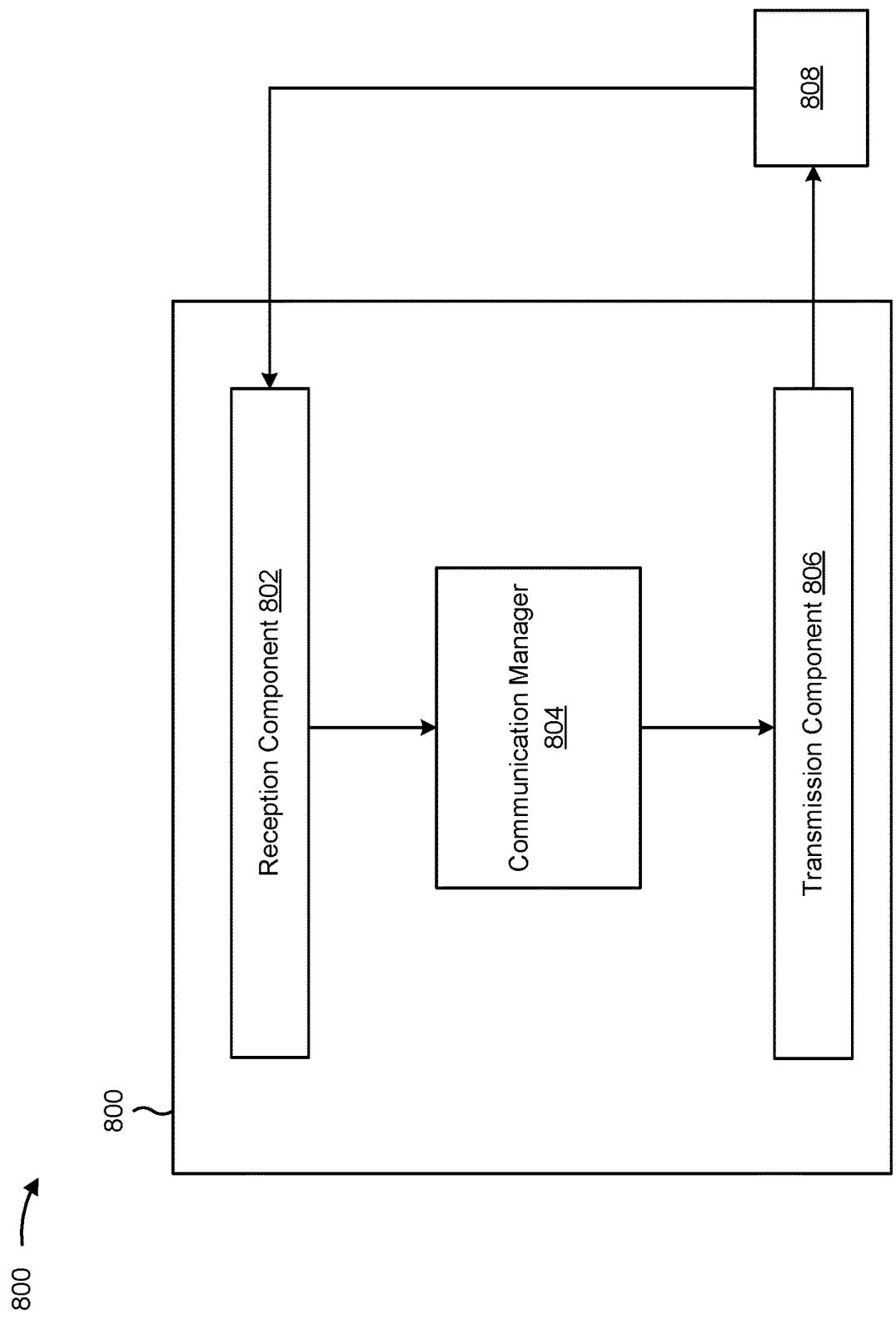
FIGS. 8-15 are block diagrams of example apparatuses for wireless communication, in accordance with the present disclosure.

FIG. 8 is a block diagram of an example apparatus 800 for wireless communication in accordance with the present disclosure. The apparatus 800 may be, be similar to, include, or be included in a UE (e.g., the UE in FIGS. 3A-3C). In some aspects, the apparatus 800 includes a reception component 802, a communication manager 804, and a transmission component 806, which may be in communication with one another (for example, via one or more buses). As shown, the apparatus 800 may communicate with another apparatus 808 (such as a client, a server, a UE, a base station, or another wireless communication device) using the reception component 802 and the transmission component 806.

In some aspects, the apparatus 800 may be configured to perform one or more operations described herein in connection with FIGS. 3A-3C. Additionally, or alternatively, the apparatus 800 may be configured to perform one or more processes described herein, such as process 400 of FIG. 4, process 600 of FIG. 6, or one or more other processes described herein. In some aspects, the apparatus 800 may include one or more components of the first UE described above in connection with FIG. 2.

The reception component 802 may provide means for receiving communications, such as reference signals, control information, data communications, or a combination thereof, from the apparatus 808. The reception component 802 may provide received communications to one or more other components of the apparatus 800, such as the communication manager 804. In some aspects, the reception component 802 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the first UE described above in connection with FIG. 2.

The transmission component 806 may provide means for transmitting communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may provide means for performing signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the first UE described above in connection with FIG. 2. In some aspects, the transmission component 806 may be co-located with the reception component 802 in a transceiver.

In some aspects, the communication manager 804 may provide means for receiving information indicating whether HARQ feedback is disabled for a HARQ process; means for receiving a downlink communication, the downlink communication including a HARQ process identifier of the HARQ process, the HARQ process identifier indicating the HARQ process is to be used for the downlink communication; and means for selectively providing HARQ feedback for the downlink communication based at least in part on the information indicating whether HARQ feedback is disabled for the HARQ process. In some aspects, the communication manager 804 may include a controller/processor, a memory, or a combination thereof, of the UE described above in connection with FIG. 2.

In some aspects, the communication manager 804 may provide means for transmitting an indication of whether HARQ feedback or HARQ retransmission is to be provided for an uplink communication; receiving a grant for transmitting the uplink communication, the grant including a HARQ process identifier that indicates a HARQ process to be used for the uplink communication; and selectively monitoring for a retransmission grant, associated with the uplink communication, based at least in part on the HARQ process identifier and information indicating whether HARQ feedback or HARQ retransmission is disabled for the HARQ process. In some aspects, the communication manager 804 may include a controller/processor, a memory, or a combination thereof, of the UE described above in connection with FIG. 2.

In some aspects, the communication manager 804 may include the reception component 802, the transmission component 806, and/or the like. In some aspects, the means provided by the communication manager 804 may include, or be included within, means provided by the reception component 802, the transmission component 806, and/or the like.

In some aspects, the communication manager 804 and/or one or more components of the communication manager 804 may include or may be implemented within hardware (e.g., one or more of the circuitry described in connection with FIG. 10). In some aspects, the communication manager 804 and/or one or more components thereof may include or may be implemented within a controller/processor, a memory, or a combination thereof, of the UE 120 described above in connection with FIG. 2.

In some aspects, the communication manager 804 and/or one or more components of the communication manager 804 may be implemented in code (e.g., as software or firmware stored in a memory), such as the code described in connection with FIGS. 10 and/or 11. For example, the communication manager 804 and/or a component (or a portion of a component) of the communication manager 804 may be implemented as instructions or code stored in a non-transitory computer-readable medium and executable by a controller or a processor to perform the functions or operations of the communication manager 804 and/or the component. If implemented in code, the functions of the communication manager 804 and/or a component may be executed by a controller/processor, a memory, a scheduler, a communication unit, or a combination thereof, of the UE 120 described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
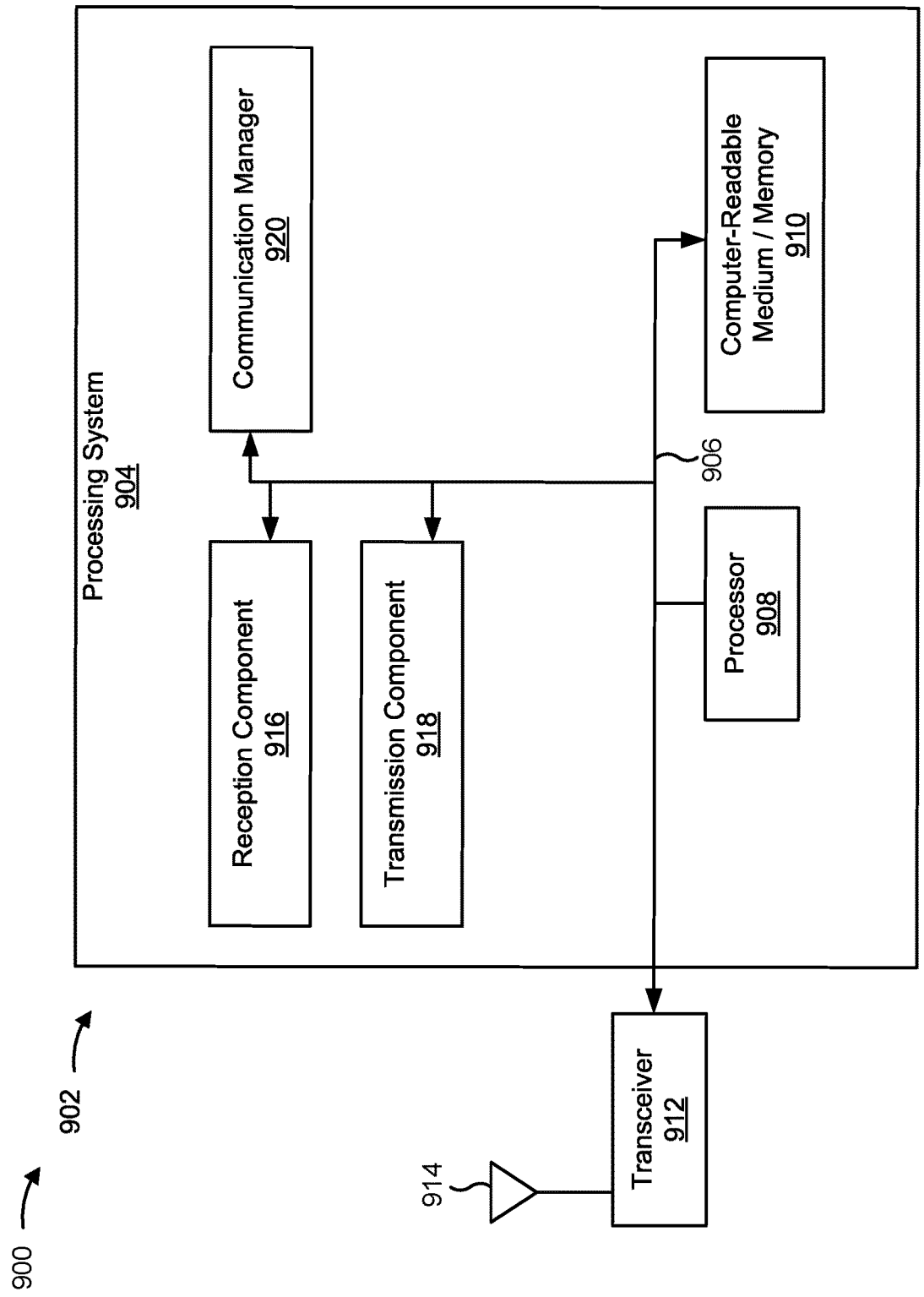

FIG. 9 is a diagram illustrating an example 900 of a hardware implementation for an apparatus 902 employing a processing system 904. The apparatus 902 may be, be similar to, include, or be included in the apparatus 800 shown in FIG. 8.

The processing system 904 may be implemented with a bus architecture, represented generally by the bus 906. The bus 906 may include any number of interconnecting buses and bridges depending on the specific application of the processing system 904 and the overall design constraints. The bus 906 links together various circuits including one or more processors and/or hardware components, represented by a processor 908, the illustrated components, and the computer-readable medium/memory 910. The bus 906 may also link various other circuits, such as timing sources, peripherals, voltage regulators, power management circuits, and/or the like.

The processing system 904 may be coupled to a transceiver 912. The transceiver 912 is coupled to one or more antennas 914. The transceiver 912 provides a means for communicating with various other apparatuses over a transmission medium. The transceiver 912 receives a signal from the one or more antennas 914, extracts information from the received signal, and provides the extracted information to the processing system 904, specifically a reception component 916. In addition, the transceiver 912 receives information from the processing system 904, specifically a transmission component 918, and generates a signal to be applied to the one or more antennas 914 based at least in part on the received information. The communication manager 920 may be component for receiving information indicating whether HARQ feedback is disabled for a HARQ process; receiving a downlink communication, the downlink communication including a HARQ process identifier of the HARQ process, the HARQ process identifier indicating the HARQ process is to be used for the downlink communication; and selectively providing HARQ feedback for the downlink communication based at least in part on the information indicating whether HARQ feedback is disabled for the HARQ process. Additionally, or alternatively, the communication manager 920 may be a component for transmitting an indication of whether HARQ feedback or HARQ retransmission is to be provided for an uplink communication; receiving a grant for transmitting the uplink communication, the grant including a HARQ process identifier that indicates a HARQ process to be used for the uplink communication; and selectively monitoring for a retransmission grant, associated with the uplink communication, based at least in part on the HARQ process identifier and information indicating whether HARQ feedback or HARQ retransmission is disabled for the HARQ process.

The processor 908 is coupled to the computer-readable medium/memory 910. The processor 908 is responsible for general processing, including the execution of software stored on the computer-readable medium/memory 910. The software, when executed by the processor 908, causes the processing system 904 to perform the various functions described herein in connection with a client. The computer-readable medium/memory 910 may also be used for storing data that is manipulated by the processor 908 when executing software. The processing system 904 may include any number of additional components not illustrated in FIG. 9. The components illustrated and/or not illustrated may be software modules running in the processor 908, resident/stored in the computer readable medium/memory 910, one or more hardware modules coupled to the processor 908, or some combination thereof.

In some aspects, the processing system 904 may be a component of the UE 120 and may include the memory 282 and/or at least one of the TX MIMO processor 266, the RX processor 258, and/or the controller/processor 280. In some aspects, the apparatus 902 for wireless communication provides means for receiving information indicating whether HARQ feedback is disabled for a HARQ process; means for receiving a downlink communication, the downlink communication including a HARQ process identifier of the HARQ process, the HARQ process identifier indicating the HARQ process is to be used for the downlink communication; and means for selectively providing HARQ feedback for the downlink communication based at least in part on the information indicating whether HARQ feedback is disabled for the HARQ process. In some aspects, the processing system 904 may be a component of the UE 120 and may include the memory 282 and/or at least one of the TX MIMO processor 266, the RX processor 258, and/or the controller/processor 280. In some aspects, the apparatus 902 for wireless communication provides means for transmitting an indication of whether HARQ feedback or HARQ retransmission is to be provided for an uplink communication; means for receiving a grant for transmitting the uplink communication, the grant including a HARQ process identifier that indicates a HARQ process to be used for the uplink communication; and means for selectively monitoring for a retransmission grant, associated with the uplink communication, based at least in part on the HARQ process identifier and information indicating whether HARQ feedback or HARQ retransmission is disabled for the HARQ process.

The aforementioned means may be one or more of the aforementioned components of the processing system 904 of the apparatus 902 configured to perform the functions recited by the aforementioned means. As described elsewhere herein, the processing system 904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
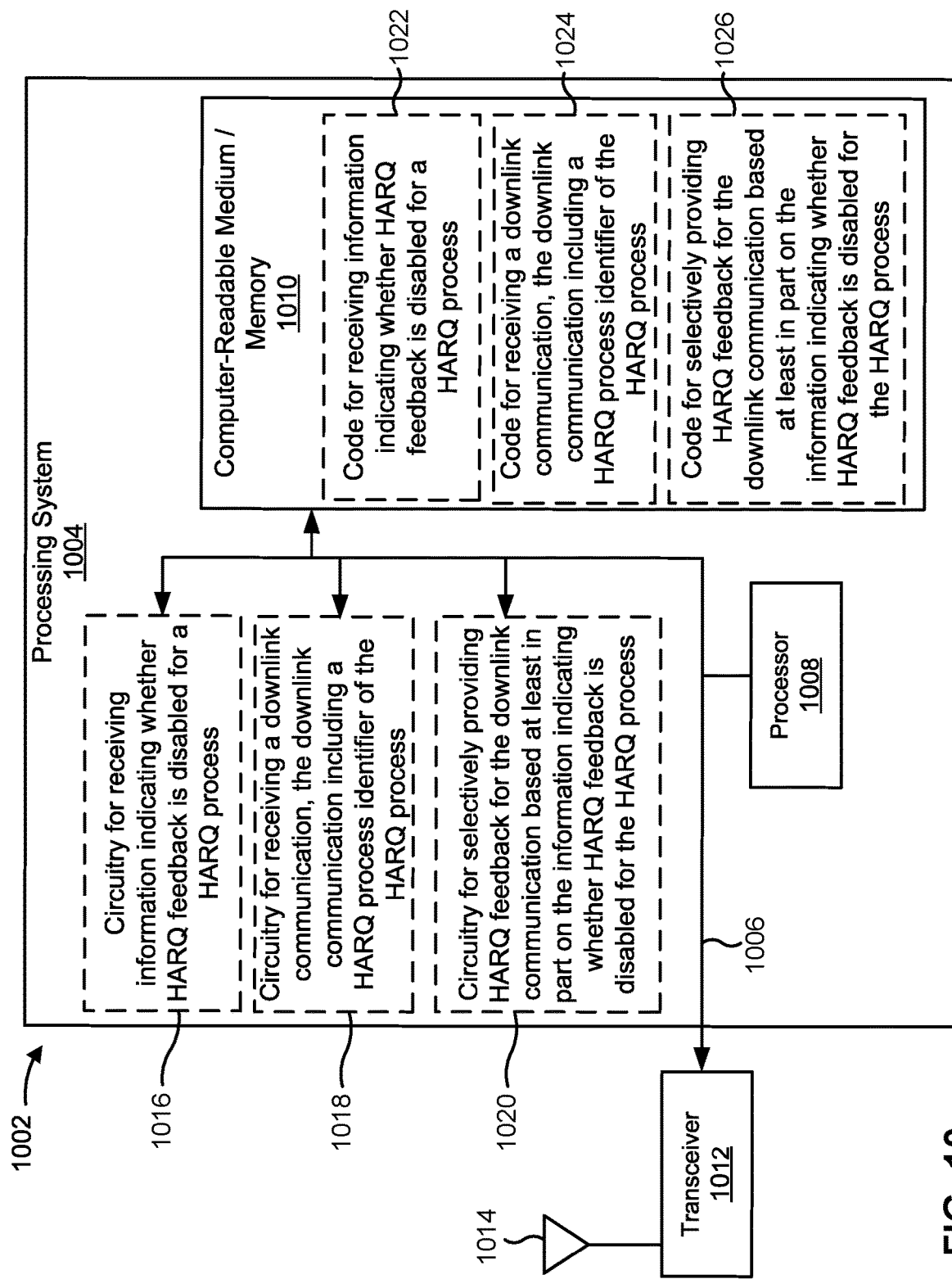

FIG. 10 is a diagram illustrating an example 1000 of an implementation of code and circuitry for an apparatus 1002 for wireless communication. The apparatus 1002 may be, be similar to, include, or be included in the apparatus 902 shown in FIG. 9 and/or the apparatus 800 shown in FIG. 8. The apparatus 1002 may include a processing system 1004, which may include a bus 1006 coupling one or more components such as, for example, a processor 1008, computer-readable medium/memory 1010, a transceiver 1012, and/or the like. As shown, the transceiver 1012 may be coupled to one or more antennas 1014.

As further shown in FIG. 10, the apparatus 1002 may include circuitry for receiving information indicating whether HARQ feedback is disabled for a HARQ process (circuitry 1016). For example, the apparatus 1002 may include circuitry 1016 to enable the apparatus 1002 to receive information indicating whether HARQ feedback is disabled for a HARQ process.

As further shown in FIG. 10, the apparatus 1002 may include circuitry for receiving a downlink communication, the downlink communication including a HARQ process identifier of the HARQ process, the HARQ process identifier indicating the HARQ process is to be used for the downlink communication (circuitry 1018). For example, the apparatus 1002 may include circuitry 1018 to enable the apparatus 1002 to receive a downlink communication, the downlink communication including a HARQ process identifier of the HARQ process, the HARQ process identifier indicating the HARQ process is to be used for the downlink communication.

As further shown in FIG. 10, the apparatus 1002 may include circuitry for selectively providing HARQ feedback for the downlink communication based at least in part on the information indicating whether HARQ feedback is disabled for the HARQ process (circuitry 1020). For example, the apparatus 1002 may include circuitry 1020 to enable the apparatus 1002 to selectively provide HARQ feedback for the downlink communication based at least in part on the information indicating whether HARQ feedback is disabled for the HARQ process.

As further shown in FIG. 10, the apparatus 1002 may include, stored in computer-readable medium 1010, code for receiving information indicating whether HARQ feedback is disabled for a HARQ process (code 1022). For example, the apparatus 1002 may include code 1022 that, when executed by the processor 1008, may cause the transceiver 1012 to receive information indicating whether HARQ feedback is disabled for a HARQ process.

As further shown in FIG. 10, the apparatus 1002 may include, stored in computer-readable medium 1010, code for receiving a downlink communication, the downlink communication including a HARQ process identifier of the HARQ process, the HARQ process identifier indicating the HARQ process is to be used for the downlink communication (code 1024). For example, the apparatus 1002 may include code 1024 that, when executed by the processor 1008, may cause the transceiver 1012 to receive a downlink communication, the downlink communication including a HARQ process identifier of the HARQ process, the HARQ process identifier indicating the HARQ process is to be used for the downlink communication.

As further shown in FIG. 10, the apparatus 1002 may include, stored in computer-readable medium 1010, code for selectively providing HARQ feedback for the downlink communication based at least in part on the information indicating whether HARQ feedback is disabled for the HARQ process (code 1026). For example, the apparatus 1002 may include code 1026 that, when executed by the processor 1008, may cause the transceiver 1012 to selectively provide HARQ feedback for the downlink communication based at least in part on the information indicating whether HARQ feedback is disabled for the HARQ process.

FIG. 10 is provided as an example. Other examples may differ from what is described in connection with FIG. 10.

Figure 11:
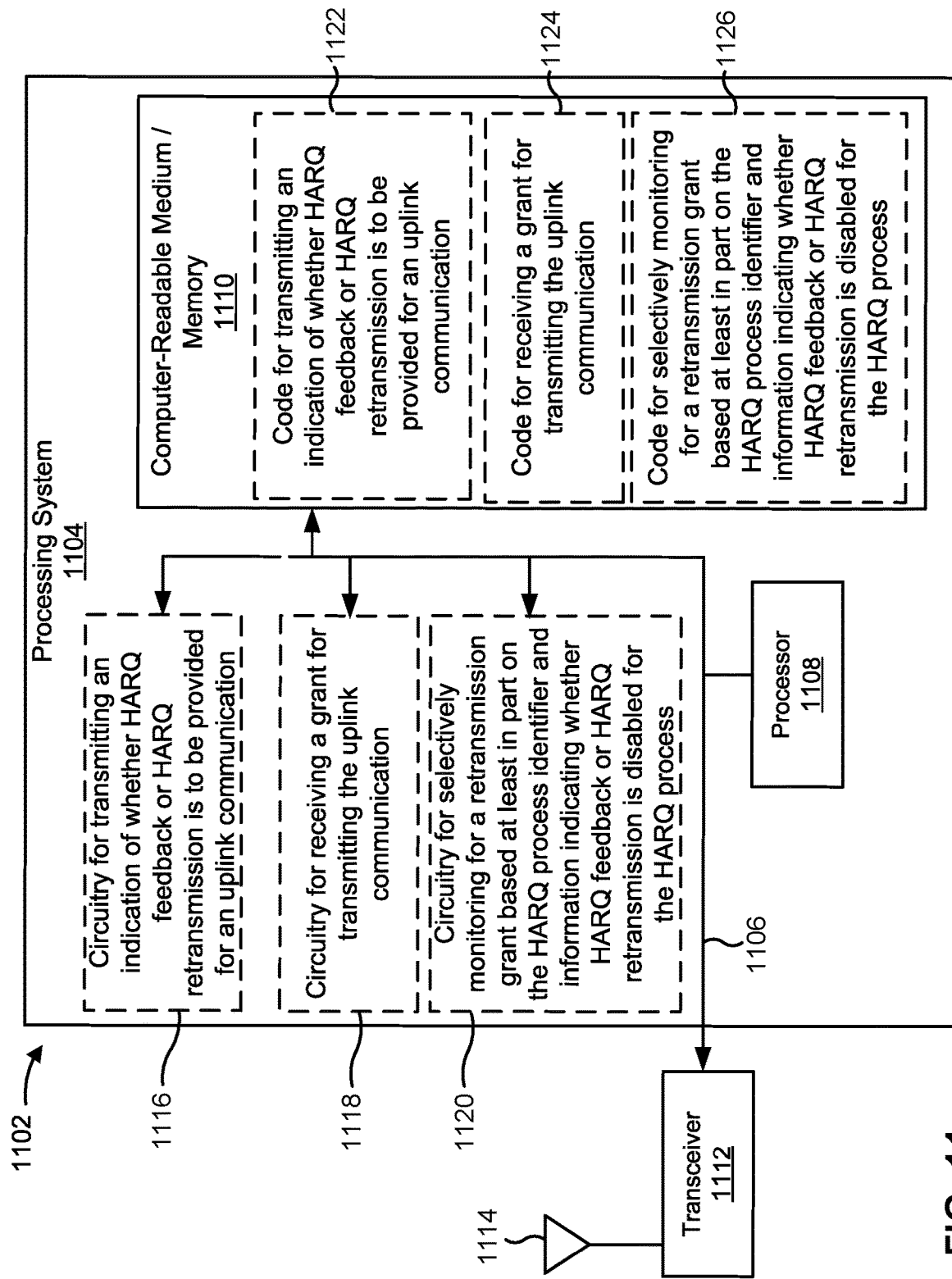

FIG. 11 is a diagram illustrating an example 1100 of an implementation of code and circuitry for an apparatus 1102 for wireless communication. The apparatus 1102 may be, be similar to, include, or be included in the apparatus 902 shown in FIG. 9 and/or the apparatus 800 shown in FIG. 8. The apparatus 1102 may include a processing system 1104, which may include a bus 1106 coupling one or more components such as, for example, a processor 1108, computer-readable medium/memory 1110, a transceiver 1112, and/or the like. As shown, the transceiver 1112 may be coupled to one or more antennas 1114.

As further shown in FIG. 11, the apparatus 1102 may include circuitry for transmitting an indication of whether HARQ feedback or HARQ retransmission is to be provided for an uplink communication (circuitry 1116). For example, the apparatus 1102 may include circuitry 1116 to enable the apparatus 1102 to transmit an indication of whether HARQ feedback or HARQ retransmission is to be provided for an uplink communication.

As further shown in FIG. 11, the apparatus 1102 may include circuitry for receive a grant for transmitting the uplink communication, the grant including a HARQ process identifier that indicates a HARQ process to be used for the uplink communication (circuitry 1118). For example, the apparatus 1102 may include circuitry 1118 to enable the apparatus 1102 to receive a grant for transmitting the uplink communication, the grant including a HARQ process identifier that indicates a HARQ process to be used for the uplink communication.

As further shown in FIG. 11, the apparatus 1102 may include circuitry for selectively monitoring for a retransmission grant, associated with the uplink communication, based at least in part on the HARQ process identifier and information indicating whether HARQ feedback or HARQ retransmission is disabled for the HARQ process (circuitry 1120). For example, the apparatus 1102 may include circuitry 1120 to enable the apparatus 1102 to selectively monitor for a retransmission grant, associated with the uplink communication, based at least in part on the HARQ process identifier and information indicating whether HARQ feedback or HARQ retransmission is disabled for the HARQ process.

As further shown in FIG. 11, the apparatus 1102 may include, stored in computer-readable medium 1110, code for transmitting an indication of whether HARQ feedback or HARQ retransmission is to be provided for an uplink communication (code 1122). For example, the apparatus 1102 may include code 1122 that, when executed by the processor 1108, may cause the transceiver 1112 to transmit an indication of whether HARQ feedback or HARQ retransmission is to be provided for an uplink communication.

As further shown in FIG. 11, the apparatus 1102 may include, stored in computer-readable medium 1110, code for receiving a grant for transmitting the uplink communication, the grant including a HARQ process identifier that indicates a HARQ process to be used for the uplink communication (code 1124). For example, the apparatus 1102 may include code 1124 that, when executed by the processor 1108, may cause the transceiver 1112 to receive a grant for transmitting the uplink communication, the grant including a HARQ process identifier that indicates a HARQ process to be used for the uplink communication.

As further shown in FIG. 11, the apparatus 1102 may include, stored in computer-readable medium 1110, code for selectively monitoring for a retransmission grant, associated with the uplink communication, based at least in part on the HARQ process identifier and information indicating whether HARQ feedback or HARQ retransmission is disabled for the HARQ process (code 1126). For example, the apparatus 1102 may include code 1126 that, when executed by the processor 1108, may cause the transceiver 1112 to selectively monitor for a retransmission grant, associated with the uplink communication, based at least in part on the HARQ process identifier and information indicating whether HARQ feedback or HARQ retransmission is disabled for the HARQ process.

FIG. 11 is provided as an example. Other examples may differ from what is described in connection with FIG. 11.

Figure 12:
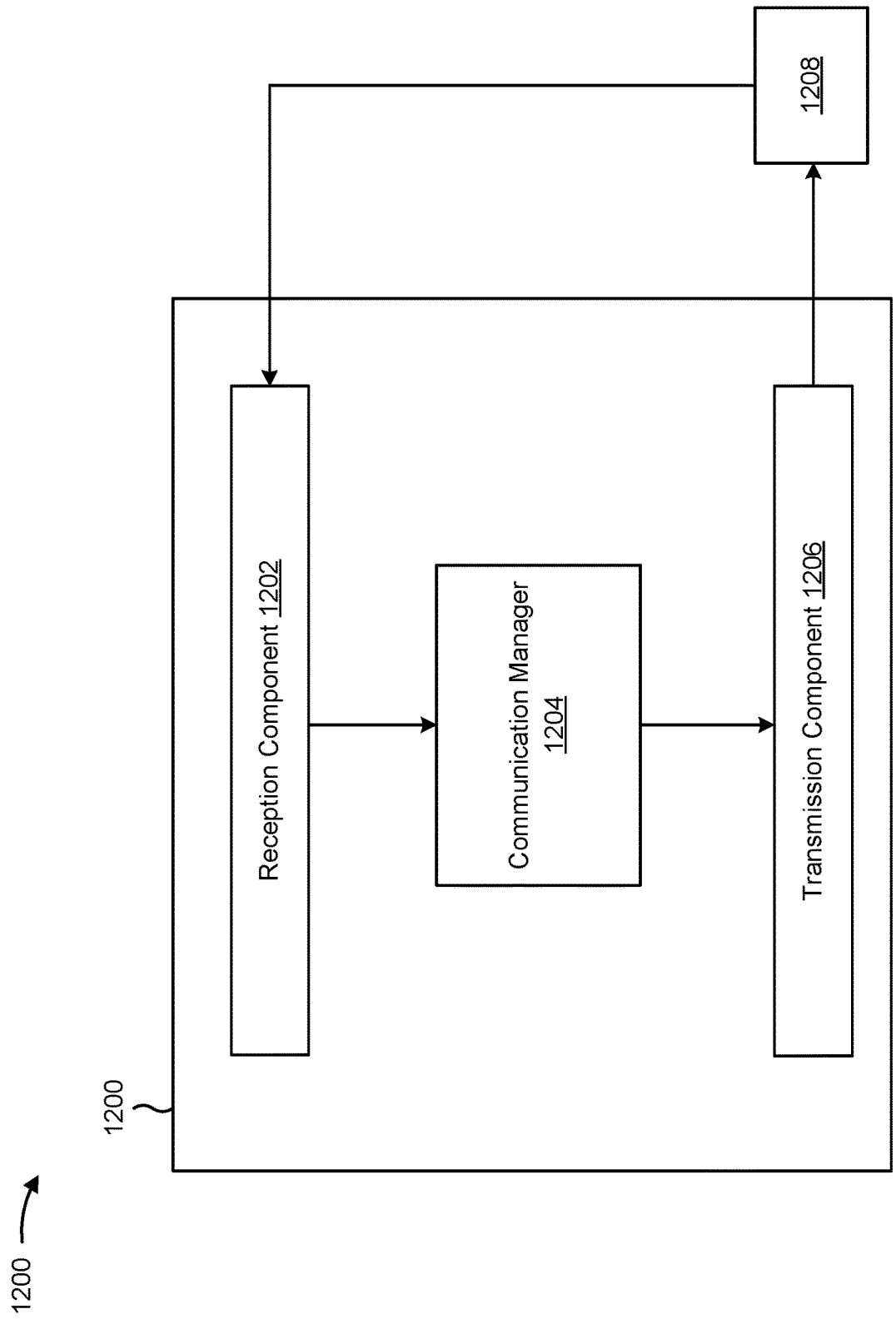

FIG. 12 is a block diagram of an example apparatus 1200 for wireless communication in accordance with the present disclosure. The apparatus 1200 may be, be similar to, include, or be included in a base station (e.g., the base station in FIGS. 3A-3C). In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a client, a server, a UE, a base station, or another wireless communication device) using the reception component 1202 and the transmission component 1206.

In some aspects, the apparatus 1200 may be configured to perform one or more operations described herein in connection with FIGS. 3A-3C. Additionally, or alternatively, the apparatus 1200 may be configured to perform one or more processes described herein, such as process 500 of FIG. 5, process 700 of FIG. 7, or one or more other processes described herein. In some aspects, the apparatus 1200 may include one or more components of the first UE described above in connection with FIG. 2.

The reception component 1202 may provide means for receiving communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the first UE described above in connection with FIG. 2.

The transmission component 1206 may provide means for transmitting communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may provide means for performing signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the first UE described above in connection with FIG. 2. In some aspects, the transmission component 1206 may be co-located with the reception component 1202 in a transceiver. In some aspects, the communication manager 1204 may provide means for transmitting information indicating whether HARQ feedback is disabled for a HARQ process; and means for transmitting a downlink communication, the downlink communication including a HARQ process identifier of the HARQ process, the HARQ process identifier indicating the HARQ process to be used for the downlink communication. In some aspects, the communication manager 1204 may include a controller/processor, a memory, or a combination thereof, of the UE described above in connection with FIG. 2.

In some aspects, the communication manager 1204 may provide means for receiving an indication of whether HARQ feedback or HARQ retransmission is to be provided for an uplink communication; means for identifying, based at least in part on the indication, a HARQ process to be used for the uplink communication; and means for transmitting a grant for transmitting the uplink communication, the grant including a HARQ process identifier that indicates the HARQ process to be used for the uplink communication. In some aspects, the communication manager 1204 may include a controller/processor, a memory, or a combination thereof, of the UE described above in connection with FIG. 2.

In some aspects, the communication manager 1204 may include the reception component 1202, the transmission component 1206, and/or the like. In some aspects, the means provided by the communication manager 1204 may include, or be included within, means provided by the reception component 1202, the transmission component 1206, and/or the like.

In some aspects, the communication manager 1204 and/or one or more components of the communication manager 1204 may include or may be implemented within hardware (e.g., one or more of the circuitry described in connection with FIGS. 14 and/or 15). In some aspects, the communication manager 1204 and/or one or more components thereof may include or may be implemented within a controller/processor, a memory, or a combination thereof, of the UE 120 described above in connection with FIG. 2.

In some aspects, the communication manager 1204 and/or one or more components of the communication manager 1204 may be implemented in code (e.g., as software or firmware stored in a memory), such as the code described in connection with FIGS. 14 and/or 15. For example, the communication manager 1204 and/or a component (or a portion of a component) of the communication manager 1204 may be implemented as instructions or code stored in a non-transitory computer-readable medium and executable by a controller or a processor to perform the functions or operations of the communication manager 1204 and/or the component. If implemented in code, the functions of the communication manager 1204 and/or a component may be executed by a controller/processor, a memory, a scheduler, a communication unit, or a combination thereof, of the UE 120 described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
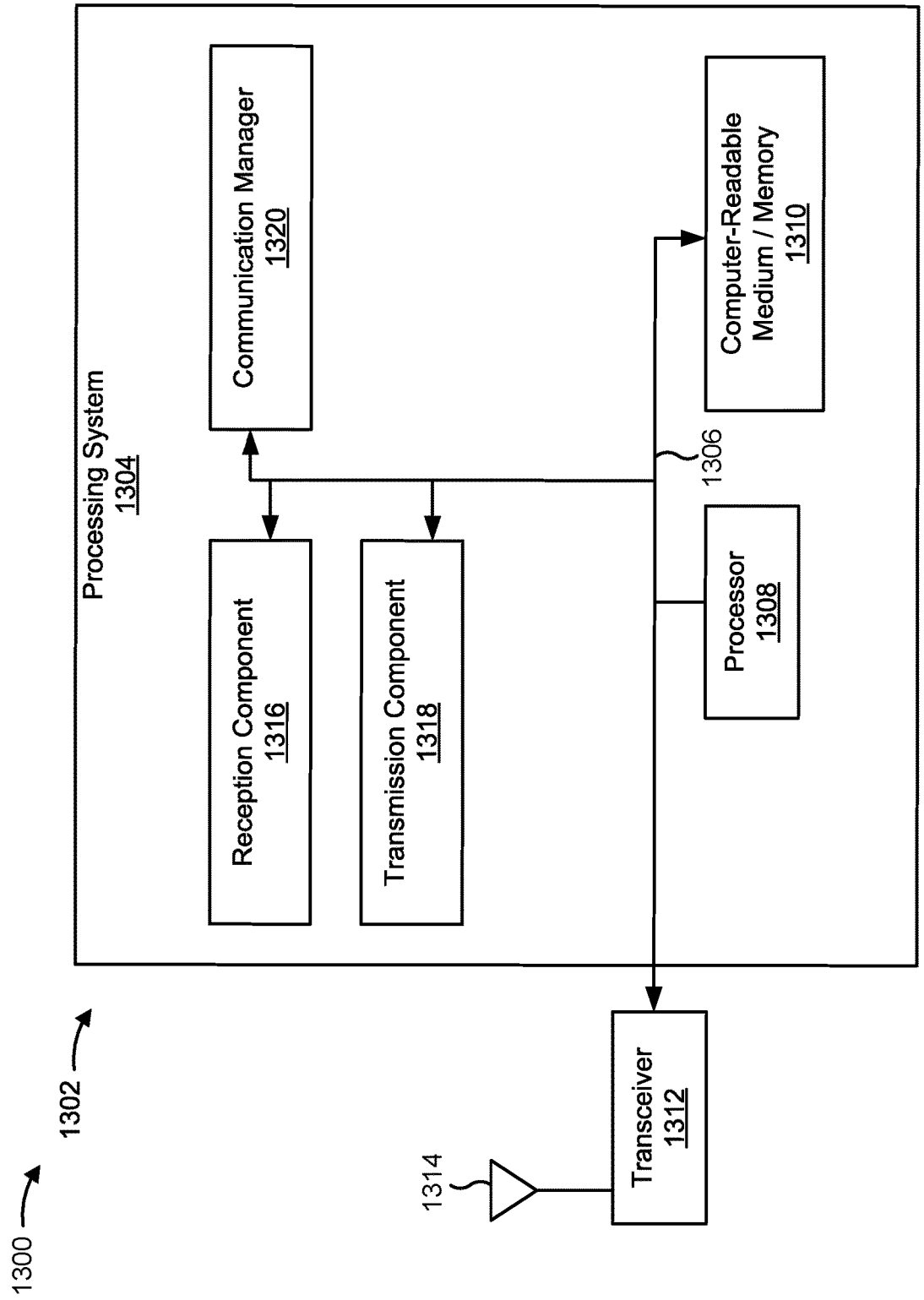

FIG. 13 is a diagram illustrating an example 1300 of a hardware implementation for an apparatus 1302 employing a processing system 1304. The apparatus 1302 may be, be similar to, include, or be included in the apparatus 1200 shown in FIG. 12.

The processing system 1304 may be implemented with a bus architecture, represented generally by the bus 1306. The bus 1306 may include any number of interconnecting buses and bridges depending on the specific application of the processing system 1304 and the overall design constraints. The bus 1306 links together various circuits including one or more processors and/or hardware components, represented by a processor 1308, the illustrated components, and the computer-readable medium/memory 1310. The bus 1306 may also link various other circuits, such as timing sources, peripherals, voltage regulators, power management circuits, and/or the like.

The processing system 1304 may be coupled to a transceiver 1312. The transceiver 1312 is coupled to one or more antennas 1314. The transceiver 1312 provides a means for communicating with various other apparatuses over a transmission medium. The transceiver 1312 receives a signal from the one or more antennas 1314, extracts information from the received signal, and provides the extracted information to the processing system 1304, specifically a reception component 1316. In addition, the transceiver 1312 receives information from the processing system 1304, specifically a transmission component 1318, and generates a signal to be applied to the one or more antennas 1314 based at least in part on the received information. The communication manager 1320 may be a component for transmitting information indicating whether HARQ feedback is disabled for a HARQ process; and transmitting a downlink communication, the downlink communication including a HARQ process identifier of the HARQ process, the HARQ process identifier indicating the HARQ process to be used for the downlink communication. Additionally, or alternatively, the communication manager 1320 may be a component for receiving an indication of whether HARQ feedback or HARQ retransmission is to be provided for an uplink communication; identifying, based at least in part on the indication, a HARQ process to be used for the uplink communication; and transmitting a grant for transmitting the uplink communication, the grant including a HARQ process identifier that indicates the HARQ process to be used for the uplink communication.

The processor 1308 is coupled to the computer-readable medium/memory 1310. The processor 1308 is responsible for general processing, including the execution of software stored on the computer-readable medium/memory 1310. The software, when executed by the processor 1308, causes the processing system 1304 to perform the various functions described herein in connection with a client. The computer-readable medium/memory 1310 may also be used for storing data that is manipulated by the processor 1308 when executing software. The processing system 1304 may include any number of additional components not illustrated in FIG. 13. The components illustrated and/or not illustrated may be software modules running in the processor 1308, resident/stored in the computer readable medium/memory 1310, one or more hardware modules coupled to the processor 1308, or some combination thereof.

In some aspects, the processing system 1304 may be a component of the base station 110 and may include the memory 242 and/or at least one of the TX MIMO processor 230, the RX processor 238, and/or the controller/processor 240. In some aspects, the apparatus 1302 for wireless communication provides means for transmitting information indicating whether HARQ feedback is disabled for a HARQ process; and means for transmitting a downlink communication, the downlink communication including a HARQ process identifier of the HARQ process, the HARQ process identifier indicating the HARQ process to be used for the downlink communication. The aforementioned means may be one or more of the aforementioned components of the processing system 1304 of the apparatus 1302 configured to perform the functions recited by the aforementioned means.

In some aspects, the processing system 1304 may be a component of the base station 110 and may include the memory 242 and/or at least one of the TX MIMO processor 230, the RX processor 238, and/or the controller/processor 240. In some aspects, the apparatus 1302 for wireless communication provides means for receiving an indication of whether HARQ feedback or HARQ retransmission is to be provided for an uplink communication; means for identifying, based at least in part on the indication, a HARQ process to be used for the uplink communication; and means for transmitting a grant for transmitting the uplink communication, the grant including a HARQ process identifier that indicates the HARQ process to be used for the uplink communication. The aforementioned means may be one or more of the aforementioned components of the processing system 1304 of the apparatus 1302 configured to perform the functions recited by the aforementioned means.

As described elsewhere herein, the processing system 1304 may include the TX MIMO processor 230, the RX processor 258, and/or the controller/processor 240. In one configuration, the aforementioned means may be the TX MIMO processor 230, the RX processor 248, and/or the controller/processor 240 configured to perform the functions and/or operations recited herein.

FIG. 13 is provided as an example. Other examples may differ from what is described in connection with FIG. 13.

Figure 14:
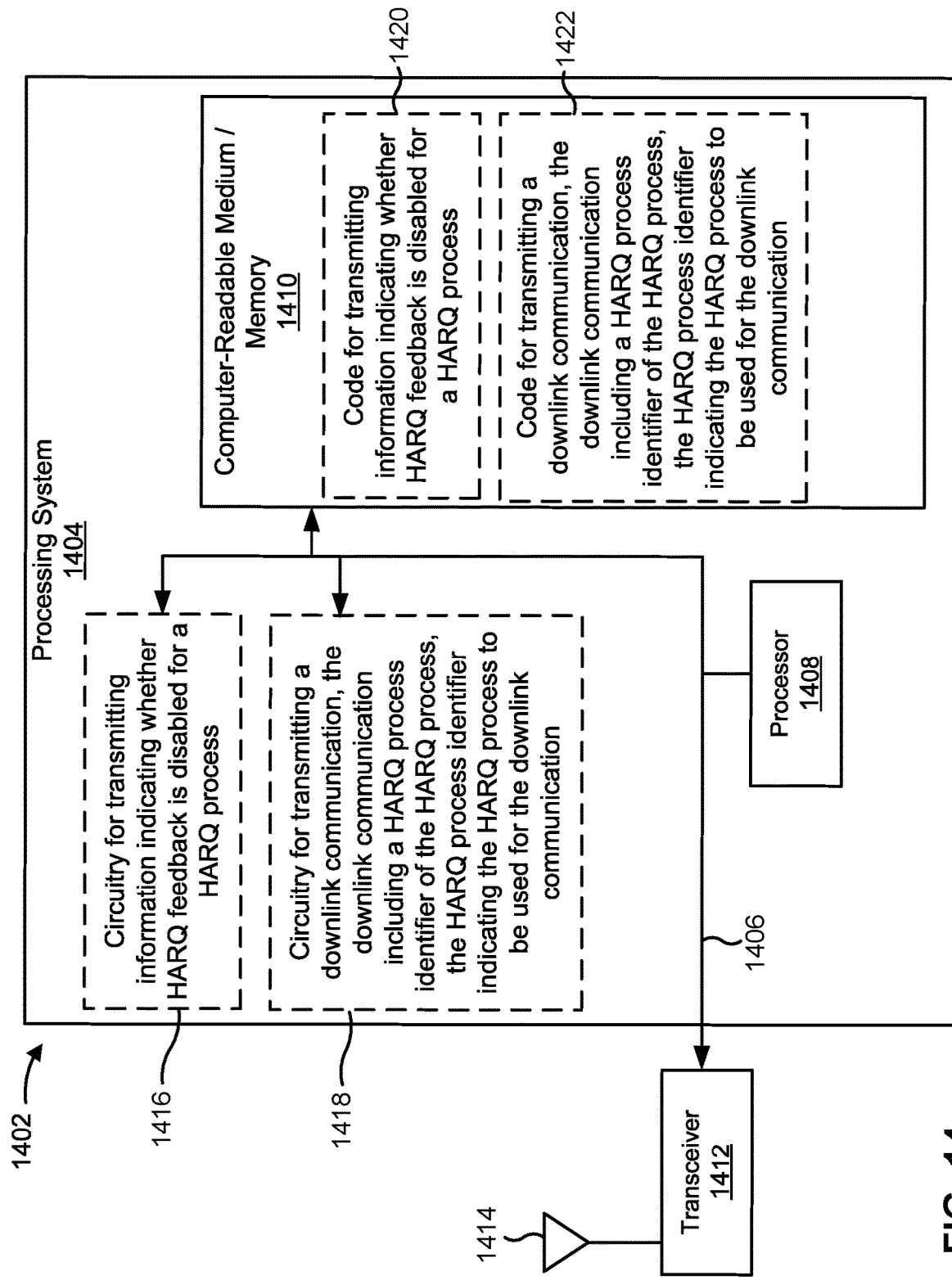

FIG. 14 is a diagram illustrating an example 1400 of an implementation of code and circuitry for an apparatus 1402 for wireless communication. The apparatus 1402 may be, be similar to, include, or be included in the apparatus 1302 shown in FIG. 13 and/or the apparatus 1200 shown in FIG. 12. The apparatus 1402 may include a processing system 1404, which may include a bus 1406 coupling one or more components such as, for example, a processor 1408, computer-readable medium/memory 1410, a transceiver 1412, and/or the like. As shown, the transceiver 1412 may be coupled to one or more antennas 1414.

As further shown in FIG. 14, the apparatus 1402 may include circuitry for transmitting information indicating whether HARQ feedback is disabled for a HARQ process (circuitry 1416). For example, the apparatus 1402 may include circuitry 1416 to enable the apparatus 1402 to transmit information indicating whether HARQ feedback is disabled for a HARQ process.

As further shown in FIG. 14, the apparatus 1402 may include circuitry for transmitting a downlink communication, the downlink communication including a HARQ process identifier of the HARQ process, the HARQ process identifier indicating the HARQ process to be used for the downlink communication (circuitry 1418). For example, the apparatus 1402 may include circuitry 1418 to enable the apparatus 1402 to transmit a downlink communication, the downlink communication including a HARQ process identifier of the HARQ process, the HARQ process identifier indicating the HARQ process to be used for the downlink communication.

As further shown in FIG. 14, the apparatus 1402 may include, stored in computer-readable medium 1410, code for transmitting information indicating whether HARQ feedback is disabled for a HARQ process (code 1420). For example, the apparatus 1402 may include code 1420 that, when executed by the processor 1408, may cause the transceiver 1412 to transmit information indicating whether HARQ feedback is disabled for a HARQ process.

As further shown in FIG. 14, the apparatus 1402 may include, stored in computer-readable medium 1410, code for transmitting a downlink communication, the downlink communication including a HARQ process identifier of the HARQ process, the HARQ process identifier indicating the HARQ process to be used for the downlink communication (code 1422). For example, the apparatus 1402 may include code 1422 that, when executed by the processor 1408, may cause the transceiver 1412 to transmit a downlink communication, the downlink communication including a HARQ process identifier of the HARQ process, the HARQ process identifier indicating the HARQ process to be used for the downlink communication.

FIG. 14 is provided as an example. Other examples may differ from what is described in connection with FIG. 14.

Figure 15:
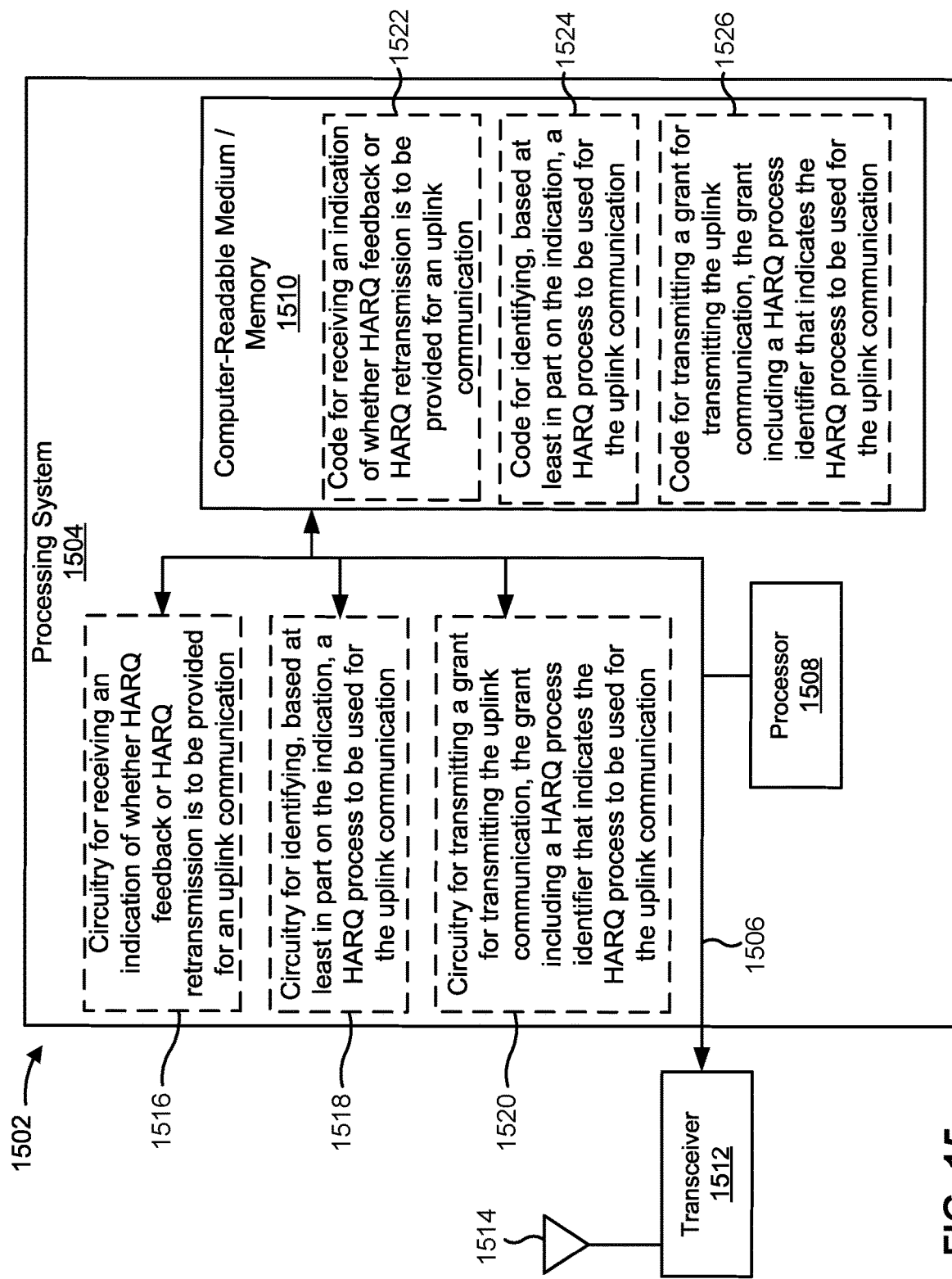

FIG. 15 is a diagram illustrating an example 1500 of an implementation of code and circuitry for an apparatus 1502 for wireless communication. The apparatus 1502 may be, be similar to, include, or be included in the apparatus 1302 shown in FIG. 13 and/or the apparatus 1200 shown in FIG. 12. The apparatus 1502 may include a processing system 1504, which may include a bus 1506 coupling one or more components such as, for example, a processor 1508, computer-readable medium/memory 1510, a transceiver 1512, and/or the like. As shown, the transceiver 1512 may be coupled to one or more antennas 1514.

As further shown in FIG. 15, the apparatus 1502 may include circuitry for receiving an indication of whether HARQ feedback or HARQ retransmission is to be provided for an uplink communication (circuitry 1516). For example, the apparatus 1502 may include circuitry 1516 to enable the apparatus 1502 to receive an indication of whether HARQ feedback or HARQ retransmission is to be provided for an uplink communication.

As further shown in FIG. 15, the apparatus 1502 may include circuitry for identifying, based at least in part on the indication, a HARQ process to be used for the uplink communication (circuitry 1518). For example, the apparatus 1502 may include circuitry 1518 to enable the apparatus 1502 to identify, based at least in part on the indication, a HARQ process to be used for the uplink communication.

As further shown in FIG. 15, the apparatus 1502 may include circuitry for transmitting a grant for transmitting the uplink communication, the grant including a HARQ process identifier that indicates the HARQ process to be used for the uplink communication (circuitry 1520). For example, the apparatus 1502 may include circuitry 1520 to enable the apparatus 1502 to transmit a grant for transmitting the uplink communication, the grant including a HARQ process identifier that indicates the HARQ process to be used for the uplink communication.

As further shown in FIG. 15, the apparatus 1502 may include, stored in computer-readable medium 1510, code for receiving an indication of whether HARQ feedback or HARQ retransmission is to be provided for an uplink communication (code 1522). For example, the apparatus 1522 may include code 1520 that, when executed by the processor 1508, may cause the transceiver 1512 to receive an indication of whether HARQ feedback or HARQ retransmission is to be provided for an uplink communication.

As further shown in FIG. 15, the apparatus 1502 may include, stored in computer-readable medium 1510, code for identifying, based at least in part on the indication, a HARQ process to be used for the uplink communication (code 1524). For example, the apparatus 1502 may include code 1524 that, when executed by the processor 1508, may cause the transceiver 1512 to identify, based at least in part on the indication, a HARQ process to be used for the uplink communication.

As further shown in FIG. 15, the apparatus 1502 may include, stored in computer-readable medium 1510, code for transmitting a grant for transmitting the uplink communication, the grant including a HARQ process identifier that indicates the HARQ process to be used for the uplink communication (code 1526). For example, the apparatus 1502 may include code 1526 that, when executed by the processor 1508, may cause the transceiver 1512 to transmit a grant for transmitting the uplink communication, the grant including a HARQ process identifier that indicates the HARQ process to be used for the uplink communication.

FIG. 15 is provided as an example. Other examples may differ from what is described in connection with FIG. 15.

The following provides an overview of some Aspects of the present disclosure:

Aspect 1: A method of wireless communication performed by a user equipment, comprising: receiving information indicating whether hybrid automatic repeat request (HARQ) feedback is disabled for a HARQ process; receiving a downlink communication, the downlink communication including a HARQ process identifier of the HARQ process, the HARQ process identifier indicating the HARQ process is to be used for the downlink communication; and selectively providing HARQ feedback for the downlink communication based at least in part on the information indicating whether HARQ feedback is disabled for the HARQ process.

Aspect 2: The method of Aspect 1, further comprising: receiving a configuration indicating that HARQ feedback is disabled for one or more HARQ processes of a set of HARQ processes, the HARQ process being included in the set of HARQ processes, wherein the configuration includes the information indicating whether HARQ feedback is disabled for the HARQ process.

Aspect 3: The method of Aspect 2, wherein the configuration is received via at least one of radio resource control signaling or downlink control information (DCI).

Aspect 4: The method of Aspect 2, wherein the configuration includes a value indicating a quantity of HARQ processes in the one or more HARQ processes for which HARQ feedback is disabled.

Aspect 5: The method of Aspect 2, wherein the configuration includes a bitmap indicating, for each HARQ process of the set of HARQ processes, whether HARQ feedback is disabled.

Aspect 6: The method of Aspect 2, wherein the configuration indicates a range of HARQ processes for which HARQ feedback is disabled.

Aspect 7: The method of Aspect 2, wherein the configuration indicates that HARQ feedback is disabled for retransmissions for the one or more HARQ processes.

Aspect 8: The method of Aspect 2, wherein the configuration indicates that HARQ feedback is disabled for initial transmissions for the one or more HARQ processes.

Aspect 9: The method of any of Aspects 1-8, further comprising: receiving a dynamic indication including the information indicating whether HARQ feedback is disabled for the HARQ process.

Aspect 10: The method of Aspect 9, wherein the dynamic indication is received via at least one of: a physical downlink control channel; or a medium access control (MAC) control element.

Aspect 11: The method of Aspect 9, wherein the dynamic indication further indicates that HARQ feedback is disabled for retransmissions for the HARQ process.

Aspect 12: The method of Aspect 9, wherein the dynamic indication further indicates that HARQ feedback is disabled for initial transmissions for the HARQ process.

Aspect 13: The method of Aspect 9, wherein the dynamic indication overrides a configuration indicating whether HARQ feedback is disabled for the HARQ process.

Aspect 14: The method of any of Aspects 1-14, further comprising: providing capability information associated with disabling HARQ feedback.

Aspect 15: The method of Aspect 14, wherein the capability information includes an indication of at least one of: whether disabling HARQ feedback is supported for any of a set of HARQ processes, a particular quantity of HARQ processes for which disabling HARQ feedback is supported, or whether disabling HARQ feedback is supported for the HARQ process.

Aspect 16: The method of Aspect 14, wherein the capability information includes a bitmap indicating, for each HARQ process of a set of HARQ processes, whether HARQ feedback disabling is supported.

Aspect 17: The method of Aspect 14, wherein the capability information includes a preference for disabling HARQ feedback.

Aspect 18: The method of Aspect 17, wherein the preference for disabling HARQ feedback is provided via at least one of: a radio resource control message, or a medium access control (MAC) control element.

Aspect 19: The method of any of Aspects 1-18, further comprising: providing a mapping rule for a logical channel associated with the downlink communication.

Aspect 20: The method of Aspect 19, wherein the mapping rule for the logical channel is associated with at least one of: a quality of service flow associated with the logical channel, a logical channel configuration associated with the logical channel, or an amount of data pending for the logical channel.

Aspect 21: A method of wireless communication performed by a base station, comprising: transmitting information indicating whether hybrid automatic repeat request (HARQ) feedback is disabled for a HARQ process; and transmitting a downlink communication, the downlink communication including a HARQ process identifier of the HARQ process, the HARQ process identifier indicating the HARQ process to be used for the downlink communication.

Aspect 22: The method of Aspect 21, further comprising: determining whether HARQ feedback is to be provided for the downlink communication; and identifying the HARQ process to be used for the downlink communication based at least in part on the determination of whether HARQ feedback is to be provided for the downlink communication.

Aspect 23: The method of any of Aspects 21-22, wherein transmitting the information indicating whether HARQ feedback is disabled comprises: transmitting a configuration indicating that HARQ feedback is disabled for one or more HARQ processes of a set of HARQ processes, the HARQ process being included in the set of HARQ processes, wherein the configuration includes the information indicating whether HARQ feedback is disabled for the HARQ process.

Aspect 24: The method of Aspect 23, wherein the configuration is transmitted via at least one of radio resource control signaling or downlink control information (DCI).

Aspect 25: The method of Aspect 23, wherein the configuration includes a value indicating a quantity of HARQ processes in the one or more HARQ processes, in the set of HARQ processes, for which HARQ feedback is disabled.

Aspect 26: The method of Aspect 23, wherein the configuration includes a bitmap indicating, for each HARQ process of the set of HARQ processes, whether HARQ feedback is disabled.

Aspect 27: The method of Aspect 23, wherein the configuration indicates a range of HARQ processes for which HARQ feedback is disabled.

Aspect 28: The method of Aspect 23, wherein the configuration indicates that HARQ feedback is disabled for retransmissions for the one or more HARQ processes.

Aspect 29: The method of Aspect 23, wherein the configuration indicates that HARQ feedback is disabled for initial transmissions for the one or more HARQ processes.

Aspect 30: The method of any of Aspects 21-29, further comprising: transmitting a dynamic indication including information indicating whether HARQ feedback is disabled for the HARQ process.

Aspect 31: The method of Aspect 30, wherein the dynamic indication is transmitted via at least one of: a physical downlink control channel; or a medium access control control element.

Aspect 32: The method of Aspect 30, wherein the dynamic indication further indicates that HARQ feedback is disabled for retransmissions for the HARQ process.

Aspect 33: The method of Aspect 30, wherein the dynamic indication further indicates that HARQ feedback is disabled for initial transmissions for the HARQ process.

Aspect 34: The method of Aspect 30, wherein the dynamic indication overrides a configuration indicating whether HARQ feedback is disabled for the HARQ process.

Aspect 35: The method of Aspect 30, further comprising: receiving capability information associated with disabling HARQ feedback.

Aspect 36: The method of Aspect 35, wherein the capability information includes an indication of at least one of: whether disabling HARQ feedback is supported for any of a set of HARQ processes, a particular quantity of HARQ processes for which disabling HARQ feedback is supported, or whether disabling HARQ feedback is supported for the HARQ process.

Aspect 37: The method of Aspect 35, wherein the capability information includes a bitmap indicating, for each HARQ process of a set of HARQ processes, whether HARQ feedback disabling is supported.

Aspect 38: The method of Aspect 35, wherein the capability information includes a preference for disabling HARQ feedback.

Aspect 39: The method of Aspect 38, wherein the preference for disabling HARQ feedback is received via at least one of: a radio resource control message, or a medium access control control element.

Aspect 40: The method of Aspect 35, wherein the determining whether HARQ feedback is to be provided for the downlink communication is based at least in part on the capability information.

Aspect 41: The method of any of Aspects 21-40, wherein whether HARQ feedback is to be provided for the HARQ process is determined based at least in part on HARQ feedback received in a medium access control (MAC) control element or an uplink radio resource control message.

Aspect 42: The method of Aspect 41, further comprising: transmitting a configuration indicating a change in whether HARQ feedback is to be provided for the HARQ process or a change to a mapping rule for a logical channel.

Aspect 43: The method of any of Aspects 21-43, wherein the determining whether HARQ feedback is to be provided for the downlink communication is based at least in part on a mapping rule for a logical channel associated with the downlink communication.

Aspect 44: The method of Aspect 43, wherein the mapping rule for the logical channel is associated with at least one of: a quality of service flow associated with the logical channel, a logical channel configuration associated with the logical channel, or an amount of data pending for the logical channel.

Aspect 45: The method of Aspect 43, further comprising: receiving the mapping rule for the logical channel associated with the downlink communication.

Aspect 46: The method of Aspect 21, wherein a prioritization for the identifying the HARQ process to be used for the downlink communication is based at least in part on whether HARQ feedback is to be provided for the downlink communication.

Aspect 47: The method of any of Aspects 21-46, further comprising: selectively monitoring for HARQ feedback associated with the downlink communication based at least in part on whether HARQ feedback is to be provided for the downlink communication.

Aspect 48: A method of wireless communication performed by a user equipment, comprising: transmitting an indication of whether hybrid automatic repeat request (HARQ) feedback or HARQ retransmission is to be provided for an uplink communication; receiving a grant for transmitting the uplink communication, the grant including a HARQ process identifier that indicates a HARQ process to be used for the uplink communication; and selectively monitoring for a retransmission grant, associated with the uplink communication, based at least in part on the HARQ process identifier and information indicating whether HARQ feedback or HARQ retransmission is disabled for the HARQ process.

Aspect 49: The method of Aspect 48, further comprising: transmitting the uplink communication based at least in part on the grant.

Aspect 50: The method of any of Aspects 48-49, further comprising: receiving a configuration indicating that HARQ feedback or HARQ retransmission is disabled for one or more HARQ processes of a set of HARQ processes, the HARQ process being included in the set of HARQ processes, wherein the configuration includes the information indicating whether HARQ feedback or HARQ retransmission is disabled for the HARQ process.

Aspect 51: The method of Aspect 50, wherein the configuration is received via at least one of radio resource control signaling or downlink control information (DCI).

Aspect 52: The method of Aspect 50, wherein the configuration includes a value indicating a quantity of HARQ processes in the one or more HARQ processes, in the set of HARQ processes, for which HARQ feedback or HARQ retransmission is disabled.

Aspect 53: The method of Aspect 50, wherein the configuration includes a bitmap indicating, for each HARQ process of the set of HARQ processes, whether HARQ feedback or HARQ retransmission is disabled.

Aspect 54: The method of Aspect 50, wherein the configuration indicates a range of HARQ processes for which HARQ feedback or HARQ retransmission is disabled.

Aspect 55: The method of Aspect 50, wherein the configuration indicates that HARQ feedback or HARQ retransmission is disabled for subsequent retransmissions after initial transmission for the one or more HARQ processes.

Aspect 56: The method of Aspect 50, wherein the configuration indicates that HARQ feedback or HARQ retransmission is disabled for initial transmissions for the one or more HARQ processes.

Aspect 57: The method of any of Aspects 48-56, further comprising: receiving a dynamic indication including the information indicating whether HARQ feedback or HARQ retransmission is disabled for the HARQ process Aspect 58: The method of Aspect 57, wherein the dynamic indication is received via at least one of: a physical downlink control channel; or a medium access control (MAC) control element.

Aspect 59: The method of Aspect 57, wherein the dynamic indication further indicates that HARQ feedback is disabled for retransmissions for the HARQ process.

Aspect 60: The method of Aspect 57, wherein the dynamic indication further indicates that HARQ feedback is disabled for initial transmissions for the HARQ process.

Aspect 61: The method of Aspect 57, wherein the dynamic indication overrides a configuration indicating whether HARQ feedback is disabled for the HARQ process.

Aspect 62: The method of any of Aspects 48-61, further comprising: determining whether HARQ feedback is to be provided for the uplink communication.

Aspect 63: The method of Aspect 62, wherein the determining whether HARQ feedback is to be provided for the uplink communication is based at least in part on capability information.

Aspect 64: The method of Aspect 63, wherein the capability information includes an indication of at least one of: whether disabling HARQ feedback is supported for any of a set of HARQ processes, a particular quantity of HARQ processes for which disabling HARQ feedback is supported, or whether disabling HARQ feedback is supported for the HARQ process.

Aspect 65: The method of Aspect 63, wherein the capability information includes a preference for disabling HARQ feedback.

Aspect 66: The method of any of Aspects 48-65, further comprising determining whether HARQ feedback or HARQ retransmission is to be provided for the uplink communication is based at least in part on a mapping rule for transmitting the uplink communication from a logical channel using the HARQ process.

Aspect 67: The method of Aspect 66, wherein the mapping rule is associated with at least one of: a quality of service flow associated with the logical channel, a logical channel configuration associated with the logical channel, or an amount of data pending for the logical channel.

Aspect 68: The method of Aspect 66, further comprising: receiving the mapping rule for the logical channel determining whether the uplink communication can be transmitted in the HARQ process indicated in the uplink grant.

Aspect 69: The method of any of Aspects 48-68, wherein the indication is transmitted in a scheduling request associated with the uplink communication.

Aspect 70: The method of Aspect 69, wherein the scheduling request is transmitted via at least one of: uplink control information, a physical uplink control channel, or a new physical SR configuration resource, or a specific schedule request occasion.

Aspect 71: The method of any of Aspects 48-70, wherein the indication is transmitted in a buffer status report including a logical channel identifier of a logical channel associated with the uplink communication.

Aspect 72: The method of any of Aspects 48-71, wherein the indication is transmitted in a medium access control control element (MAC-CE).

Aspect 73: The method of Aspect 72, wherein the MAC-CE includes a bitmap indicating, for each logical channel of a set of logical channels, whether monitoring for retransmission grants is to be performed, wherein the uplink communication is associated with a logical channel of the set of logical channels.

Aspect 74: A method of wireless communication performed by a base station, comprising: receiving an indication of whether hybrid automatic repeat request (HARQ) feedback or HARQ retransmission is to be provided for an uplink communication; identifying, based at least in part on the indication, a HARQ process to be used for the uplink communication; and transmitting a grant for transmitting the uplink communication, the grant including a HARQ process identifier that indicates the HARQ process to be used for the uplink communication.

Aspect 75: The method of Aspect 74, further comprising: receiving the uplink communication after transmitting the grant.

Aspect 76: The method of any of Aspects 74-75, further comprising: selectively providing a retransmission grant, associated with the uplink communication, based at least in part on whether HARQ feedback is disabled for the HARQ process.

Aspect 77: The method of any of Aspects 74-76, further comprising: transmitting a configuration indicating that HARQ feedback or HARQ retransmission is disabled for one or more HARQ processes of a set of HARQ processes, the HARQ process being included in the set of HARQ processes, wherein the configuration includes information indicating whether HARQ feedback or HARQ retransmission is disabled for the HARQ process.

Aspect 78: The method of Aspect 77, wherein the configuration is transmitted via at least one of radio resource control signaling or downlink control information (DCI).

Aspect 79: The method of Aspect 77, wherein the configuration includes a value indicating a quantity of HARQ processes in the one or more HARQ processes, in the set of HARQ processes, for which HARQ feedback or HARQ retransmission is disabled.

Aspect 80: The method of Aspect 77, wherein the configuration includes a bitmap indicating, for each HARQ process of the set of HARQ processes, whether HARQ feedback or HARQ retransmission is disabled.

Aspect 81: The method of Aspect 77, wherein the configuration indicates a range of HARQ processes for which HARQ feedback or HARQ retransmission is disabled.

Aspect 82: The method of Aspect 77, wherein the configuration indicates that HARQ feedback or HARQ retransmission is disabled for subsequent retransmissions after initial transmission for the one or more HARQ processes.

Aspect 83: The method of Aspect 77, wherein the configuration indicates that HARQ feedback or HARQ retransmission is disabled for initial transmissions for the one or more HARQ processes.

Aspect 84: The method of Aspect 77, further comprising: transmitting a dynamic indication including information indicating whether HARQ feedback or HARQ retransmission is disabled for the HARQ process.

Aspect 85: The method of Aspect 84, wherein the dynamic indication is transmitted via at least one of: a physical downlink control channel; or a medium access control control element.

Aspect 86: The method of Aspect 84, wherein the dynamic indication further indicates that HARQ feedback is disabled for retransmissions for the HARQ process.

Aspect 87: The method of Aspect 84, wherein the dynamic indication further indicates that HARQ feedback is disabled for initial transmissions for the HARQ process.

Aspect 88: The method of Aspect 84, wherein the dynamic indication overrides a configuration indicating whether HARQ feedback is disabled for the HARQ process.

Aspect 89: The method of any of Aspects 74-88, further comprising: transmitting a mapping rule for a logical channel determining whether the uplink communication can be transmitted in the HARQ process indicated the grant.

Aspect 90: The method of Aspect 89, wherein the mapping rule is associated with at least one of: a quality of service flow associated with the logical channel, a logical channel configuration associated with the logical channel, or an amount of data pending for the logical channel.

Aspect 91: The method of any of Aspects 74-90, wherein the indication is received in a scheduling request associated with the uplink communication.

Aspect 92: The method of Aspect 91, wherein the scheduling request is received via at least one of: uplink control information, a physical uplink control channel, or a new physical SR configuration resource, or a specific schedule request occasion.

Aspect 93: The method of any of Aspects 74-92, wherein the indication is received in a buffer status report including a logical channel identifier of a logical channel associated with the uplink communication.

Aspect 94: The method of any of Aspects 74-93, wherein the indication is received in a medium access control control element (MAC-CE).

Aspect 95: The method of Aspect 94, wherein the MAC-CE includes a bitmap indicating, for each logical channel of a set of logical channels, whether monitoring for retransmission grants is to be performed, wherein the uplink communication is associated with a logical channel of the set of logical channels.

Aspect 96: An apparatus for wireless communication at a device, comprising a processor; memory coupled with the processor; and instructions stored in the memory and executable by the processor to cause the apparatus to perform the method of one or more Aspects of Aspects 1-20.

Aspect 97: A device for wireless communication, comprising a memory and one or more processors coupled to the memory, the memory and the one or more processors configured to perform the method of one or more Aspects of Aspects 1-20.

Aspect 98: An apparatus for wireless communication, comprising at least one means for performing the method of one or more Aspects of Aspects 1-20.

Aspect 99: A non-transitory computer-readable medium storing code for wireless communication, the code comprising instructions executable by a processor to perform the method of one or more Aspects of Aspects 1-20.

Aspect 100: A non-transitory computer-readable medium storing a set of instructions for wireless communication, the set of instructions comprising one or more instructions that, when executed by one or more processors of a device, cause the device to perform the method of one or more Aspects of Aspects 1-20.

Aspect 101 An apparatus for wireless communication at a device, comprising a processor; memory coupled with the processor; and instructions stored in the memory and executable by the processor to cause the apparatus to perform the method of one or more Aspects of Aspects 21-47.

Aspect 102: A device for wireless communication, comprising a memory and one or more processors coupled to the memory, the memory and the one or more processors configured to perform the method of one or more Aspects of Aspects 21-47.

Aspect 103: An apparatus for wireless communication, comprising at least one means for performing the method of one or more Aspects of Aspects 21-47.

Aspect 104: A non-transitory computer-readable medium storing code for wireless communication, the code comprising instructions executable by a processor to perform the method of one or more Aspects of Aspects 21-47.

Aspect 105: A non-transitory computer-readable medium storing a set of instructions for wireless communication, the set of instructions comprising one or more instructions that, when executed by one or more processors of a device, cause the device to perform the method of one or more Aspects of Aspects 21-47.

Aspect 106: An apparatus for wireless communication at a device, comprising a processor; memory coupled with the processor; and instructions stored in the memory and executable by the processor to cause the apparatus to perform the method of one or more Aspects of Aspects 48-73.

Aspect 107: A device for wireless communication, comprising a memory and one or more processors coupled to the memory, the memory and the one or more processors configured to perform the method of one or more Aspects of Aspects 48-73.

Aspect 108: An apparatus for wireless communication, comprising at least one means for performing the method of one or more Aspects of Aspects 48-73.

Aspect 109: A non-transitory computer-readable medium storing code for wireless communication, the code comprising instructions executable by a processor to perform the method of one or more Aspects of Aspects 48-73.

Aspect 110: A non-transitory computer-readable medium storing a set of instructions for wireless communication, the set of instructions comprising one or more instructions that, when executed by one or more processors of a device, cause the device to perform the method of one or more Aspects of Aspects 48-73.

Aspect 111 An apparatus for wireless communication at a device, comprising a processor; memory coupled with the processor; and instructions stored in the memory and executable by the processor to cause the apparatus to perform the method of one or more Aspects of Aspects 74-94.

Aspect 112: A device for wireless communication, comprising a memory and one or more processors coupled to the memory, the memory and the one or more processors configured to perform the method of one or more Aspects of Aspects 74-94.

Aspect 113: An apparatus for wireless communication, comprising at least one means for performing the method of one or more Aspects of Aspects 74-94.

Aspect 114: A non-transitory computer-readable medium storing code for wireless communication, the code comprising instructions executable by a processor to perform the method of one or more Aspects of Aspects 74-94.

Aspect 115: A non-transitory computer-readable medium storing a set of instructions for wireless communication, the set of instructions comprising one or more instructions that, when executed by one or more processors of a device, cause the device to perform the method of one or more Aspects of Aspects 74-94.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed at a user equipment, comprising:
    receiving, via radio resource control (RRC) signaling, configuration information comprising a bitmap indicating that hybrid automatic repeat request (HARQ) feedback is one of enabled or disabled for one or more HARQ processes;
    receiving a dynamic indication indicating that HARQ feedback is one of enabled or disabled for the one or more HARQ processes, wherein the dynamic indication overrides the configuration information;
    receiving a downlink communication, the downlink communication including a HARQ process identifier of a HARQ process of the one or more HARQ processes, the HARQ process identifier indicating that the HARQ process is to be used for the downlink communication; and
    selectively providing HARQ feedback for the downlink communication based at least in part on the dynamic indication indicating that HARQ feedback is one of enabled or disabled for the HARQ process.

2. The method of claim 1, wherein the configuration information includes a value indicating a quantity of HARQ processes of the one or more HARQ processes for which HARQ feedback is disabled.

3. The method of claim 1, wherein the configuration information indicates at least one of: a range of HARQ processes for which HARQ feedback is disabled, or that HARQ feedback is disabled for one or more retransmissions of the one or more HARQ processes, or that HARQ feedback is disabled for initial transmissions of the one or more HARQ processes.

4. The method of claim 1, further comprising:
receiving the dynamic indication via a physical downlink control channel (PDCCH).

5. The method of claim 4, wherein the dynamic indication further indicates that at least one of HARQ feedback is disabled for one or more retransmissions of the HARQ process or HARQ feedback is disabled for an initial transmission of the HARQ process.

6. The method of claim 4, wherein the dynamic indication further indicates that at least one of HARQ feedback is enabled for one or more retransmissions of the HARQ process or HARQ feedback is enabled for an initial transmission of the HARQ process.

7. The method of claim 1, further comprising providing capability information associated with disabling HARQ feedback.

8. The method of claim 1, further comprising:
providing a mapping rule for a logical channel associated with the downlink communication.

9. The method of claim 1, wherein the configuration information includes a value indicating a quantity of HARQ processes of the one or more HARQ processes for which HARQ feedback is enabled.

10. The method of claim 1, wherein the configuration information indicates at least one of a range of HARQ processes for which HARQ feedback is enabled, that HARQ feedback is enabled for one or more retransmissions of the one or more HARQ processes, or that HARQ feedback is enabled for initial transmissions of the one or more HARQ processes.

11. The method of claim 1, further comprising:
receiving the dynamic indication via a medium access control (MAC) control element (MAC-CE).

12. The method of claim 1, further comprising providing capability information associated with enabling HARQ feedback.

13. A method of wireless communication performed at a network entity, comprising:
transmitting, via radio resource control (RRC) signaling, configuration information comprising a bitmap indicating that hybrid automatic repeat request (HARQ) feedback is one of enabled or disabled for one or more HARQ processes;
transmitting a dynamic indication indicating that HARQ feedback is one of enabled or disabled for the one or more HARQ processes, wherein the dynamic indication overrides the configuration information; and
transmitting a downlink communication, the downlink communication including a HARQ process identifier of a HARQ process of the one or more HARQ processes, the HARQ process identifier indicating that the HARQ process is to be used for the downlink communication.

14. The method of claim 13, further comprising:
determining that HARQ feedback is not to be provided for the downlink communication; and
identifying the HARQ process to be used for the downlink communication based at least in part on the determination that HARQ feedback is not to be provided for the downlink communication.

15. The method of claim 13, wherein the configuration information includes a value indicating a quantity of HARQ processes of the one or more HARQ processes for which HARQ feedback is disabled.

16. The method of claim 13, wherein the configuration information indicates at least one of: a range of HARQ processes for which HARQ feedback is disabled, or that HARQ feedback is disabled for one or more retransmissions of the one or more HARQ processes, or that HARQ feedback is disabled for initial transmissions of the one or more HARQ processes.

17. The method of claim 13, further comprising:
transmitting the dynamic indication via a physical downlink control channel (PDCCH).

18. The method of claim 17, wherein the dynamic indication further indicates that at least one of HARQ feedback is disabled for one or more retransmissions for the HARQ process or HARQ feedback is disabled for an initial transmission of the HARQ process.

19. The method of claim 17, wherein the dynamic indication further indicates that at least one of HARQ feedback is enabled for one or more retransmissions for the HARQ process or HARQ feedback is enabled for an initial transmission for the HARQ process.

20. The method of claim 13, further comprising:
determining that HARQ feedback is not to be provided for the HARQ process based at least in part on HARQ feedback not being received in a medium access control (MAC) control element or an uplink radio resource control message.

21. The method of claim 13, further comprising
determining that HARQ feedback is not to be provided for the downlink communication based at least in part on a mapping rule for a logical channel associated with the downlink communication.

22. The method of claim 13, further comprising:
refraining from monitoring for HARQ feedback associated with the downlink communication based at least in part on HARQ feedback being disabled for the downlink communication.

23. The method of claim 13, further comprising:
determining that HARQ feedback is to be provided for the downlink communication; and
identifying the HARQ process to be used for the downlink communication based at least in part on the determination that HARQ feedback is to be provided for the downlink communication.

24. The method of claim 13, wherein the configuration information includes a value indicating a quantity of HARQ processes of the one or more HARQ processes for which HARQ feedback is enabled.

25. The method of claim 13, wherein the configuration information indicates at least one of a range of HARQ processes for which HARQ feedback is enabled, that HARQ feedback is enabled for one or more retransmissions of the one or more HARQ processes, or that HARQ feedback is enabled for initial transmissions of the one or more HARQ processes.

26. The method of claim 13, further comprising:
transmitting Hall the dynamic indication via a medium access control (MAC) control element (MAC-CE).

27. The method of claim 13, further comprising:
determining that HARQ feedback is to be provided for the HARQ process based at least in part on HARQ feedback received in a medium access control (MAC) control element or an uplink radio resource control message.

28. The method of claim 13, further comprising:
determining that HARQ feedback is to be provided for the downlink communication based at least in part on a mapping rule for a logical channel associated with the downlink communication.

29. The method of claim 13, further comprising:
monitoring for HARQ feedback associated with the downlink communication based at least in part on HARQ feedback being enabled for the downlink communication.

30. A method of wireless communication performed at a user equipment, comprising:
receiving configuration information comprising a bitmap indicating that hybrid automatic repeat request (HARQ) feedback or HARQ retransmission is one of enabled or disabled for one or more HARQ processes;
receiving a dynamic indication indicating that HARQ feedback or HARQ retransmission is one of enabled or disabled for the one or more HARQ processes, wherein the dynamic indication overrides the configuration information;
receiving a grant for transmitting an uplink communication, the grant including a HARQ process identifier that indicates a HARQ process of the one or more HARQ processes to be used for the uplink communication; and
selectively monitoring for a retransmission grant, associated with the uplink communication, based at least in part on the HARQ process identifier and the dynamic indication indicating that HARQ feedback or HARQ retransmission is one of enabled or disabled for the HARQ process.

31. The method of claim 30, further comprising:
receiving the dynamic indication via at least one of a physical downlink control channel (PDCCH) or a medium access control (MAC) control element (MAC-CE).

32. The method of claim 30, further comprising determining whether HARQ feedback or HARQ retransmission is to be provided for the uplink communication is based at least in part on a mapping rule for transmitting the uplink communication from a logical channel using the HARQ process.

33. The method of claim 32, further comprising:
receiving an indication of the mapping rule.

34. A method of wireless communication performed at a network entity, comprising:
transmitting configuration information comprising a bitmap indicating that one of hybrid automatic repeat request (HARQ) feedback or HARQ retransmission is one of enabled or disabled for one or more HARQ processes;
transmitting a dynamic indication indicating that HARQ feedback or HARQ retransmission is one of enabled or disabled for the one or more HARQ processes, wherein the dynamic indication overrides the configuration information;
identifying, based at least in part on the dynamic indication, a HARQ process of the one or more HARQ processes to be used for an uplink communication; and
transmitting a grant for transmitting the uplink communication, the grant including a HARQ process identifier that indicates the HARQ process of the one or more HARQ processes to be used for the uplink communication.

35. The method of claim 34, further comprising:
selectively providing a retransmission grant, associated with the uplink communication, based at least in part on the HARQ feedback being one of enabled or disabled for the HARQ process.

36. An apparatus for wireless communication at a user equipment (UE) comprising:
one or more memories; and
one or more processors coupled to the one or more memories, the one or more processors configured to cause the UE to:
receive, via radio resource control (RRC) signaling, configuration information comprising a bitmap indicating that hybrid automatic repeat request (HARQ) feedback is one of enabled or disabled for one or more HARQ processes;
receive a dynamic indication indicating that HARQ feedback is one of enabled or disabled for the one or more HARQ processes, wherein the dynamic indication overrides the configuration information;
receive a downlink communication, the downlink communication including a HARQ process identifier of a HARQ process of the one or more HARQ processes, the HARQ process identifier indicating that the HARQ process is to be used for the downlink communication; and
selectively provide HARQ feedback for the downlink communication based at least in part on the dynamic indication indicating that HARQ feedback is one or enabled or disabled for the HARQ process.

37. The apparatus of claim 36, wherein the configuration information includes a value indicating a quantity of HARQ processes of the one or more HARQ processes for which HARQ feedback is disabled.

38. The apparatus of claim 36, wherein the configuration information includes a value indicating a quantity of HARQ processes of the one or more HARQ processes for which HARQ feedback is enabled.

39. The apparatus of claim 36, wherein the one or more processors are further configured to cause the UE to:
receive the dynamic indication via a physical downlink control channel (PDCCH).

40. The apparatus of claim 39, wherein the dynamic indication further indicates that at least one of HARQ feedback is disabled for one or more retransmissions of the HARQ process or HARQ feedback is disabled for an initial transmission of the HARQ process.

41. The apparatus of claim 39, wherein the dynamic indication further indicates that at least one of HARQ feedback is enabled for one or more retransmissions of the HARQ process or HARQ feedback is enabled for an initial transmission of the HARQ process.

42. An apparatus for wireless communication at a network entity for wireless communication, comprising:
one or more memories; and
one or more processors coupled to the one or more memories, the one or more processors configured to cause the network entity to:
transmit, via radio resource control (RRC) signaling, configuration information comprising a bitmap indicating that hybrid automatic repeat request (HARQ) feedback is one of enabled or disabled for one or more HARQ processes;

transmit a dynamic indication indicating that HARQ feedback is one of enabled or disabled for the one or more HARQ processes, wherein the dynamic indication overrides the configuration information; and transmit a downlink communication, the downlink communication including a HARQ process identifier of a HARQ process of the one or more HARQ processes, the HARQ process identifier indicating that the HARQ process is to be used for the downlink communication.

43. The apparatus of claim 42, wherein the configuration information includes a value indicating a quantity of HARQ processes of the one or more HARQ processes for which HARQ feedback is disabled.

44. The apparatus of claim 42, wherein the configuration information includes a value indicating a quantity of HARQ processes of the one or more HARQ processes for which HARQ feedback is enabled.

45. The apparatus of claim 42, wherein the one or more processors are further configured to cause the network entity to:

transmit the dynamic indication via a physical downlink control channel (PDCCH).

46. The apparatus of claim 45, wherein the dynamic indication further indicates that at least one of HARQ feedback is disabled for one or more retransmissions for the HARQ process or HARQ feedback is disabled for an initial transmission of the HARQ process.

47. The apparatus of claim 45, wherein the dynamic indication further indicates that at least one of HARQ feedback is enabled for one or more retransmissions for the HARQ process or HARQ feedback is enabled for an initial transmission for the HARQ process.

48. An apparatus for wireless communication at a user equipment (UE), comprising:

one or more memories; and one or more processors coupled to the one or more memories, the one or more processors configured to cause the UE to:

receive configuration information comprising a bitmap indicating that hybrid automatic repeat request (HARQ) feedback or HARQ retransmission is one of enabled or disabled for one or more HARQ processes;

receive a dynamic indication indicating that HARQ feedback or HARQ retransmission is one of enabled or disabled for the one or more HARQ processes, wherein the dynamic indication overrides the configuration information;

receive a grant to transmit an uplink communication, the grant including a HARQ process identifier that indicates a HARQ process of the one or more HARQ processes to be used for the uplink communication; and selectively monitor for a retransmission grant, associated with the uplink communication, based at least in part on the HARQ process identifier and the dynamic indication indicating that HARQ feedback or HARQ retransmission is one of enabled or disabled for the HARQ process.

49. The apparatus of claim 48, wherein the one or more processors are further configured to cause to UE to:

determine whether HARQ feedback or HARQ retransmission is to be provided for the uplink communication based at least in part on a mapping rule for transmitting the uplink communication from a logical channel using the HARQ process.

50. The apparatus of claim 49, wherein the one or more processors are further configured to cause to UE to:

receive, via a transceiver, an indication of the mapping rule.

51. An apparatus for wireless communication at a network entity, comprising:

one or more memories; and one or more processors coupled to the one or more memories, the one or more processors configured to cause the network entity to:

transmit configuration information comprising a bitmap indicating that one of hybrid automatic repeat request (HARQ) feedback or HARQ retransmission is one of enabled or disabled for one or more HARQ processes;

transmit a dynamic indication indicating that HARQ feedback or HARQ retransmission is one of enabled or disabled for the one or more HARQ processes, wherein the dynamic indication overrides the configuration information;

identify, based at least in part on the dynamic indication, a HARQ process of the one or more HARQ processes to be used for an uplink communication; and transmit a grant to transmit the uplink communication, the grant including a HARQ process identifier that indicates the HARQ process of the one or more HARQ processes to be used for the uplink communication.

52. The apparatus of claim 51, wherein the one or more processors are further configured to cause the network entity to:

transmit the dynamic indication via a physical downlink control channel (PDCCH).

53. A non-transitory computer-readable medium storing a set of instructions for wireless communication, the set of instructions comprising:

one or more instructions that, when executed by one or more processors of a user equipment, cause the user equipment to:

receive, via radio resource control (RRC) signaling, configuration information comprising a bitmap indicating that hybrid automatic repeat request (HARQ) feedback is one of enabled or disabled for one or more HARQ processes;

receive a dynamic indication indicating that HARQ feedback is one of enabled or disabled for the one or more HARQ processes, wherein the dynamic indication overrides the configuration information;

receive a downlink communication, the downlink communication including a HARQ process identifier of a HARQ process of the one or more HARQ processes, the HARQ process identifier indicating that the HARQ process is to be used for the downlink communication; and selectively provide HARQ feedback for the downlink communication based at least in part on the dynamic indication indicating that HARQ feedback is one of enabled or disabled for the HARQ process.

54. The non-transitory computer-readable medium of claim 53, wherein the configuration information includes a value indicating a quantity of HARQ processes of the one or more HARQ processes for which HARQ feedback is disabled.

55. The non-transitory computer-readable medium of claim 53, wherein the configuration information includes a value indicating a quantity of HARQ processes of the one or more HARQ processes for which HARQ feedback is enabled.

56. The non-transitory computer-readable medium of claim 53, wherein the set of instructions are further executable to cause the user equipment to:
receive the dynamic indication via a physical downlink control channel (PDCCH).

57. The non-transitory computer-readable medium of claim 56, wherein the dynamic indication further indicates that at least one of HARQ feedback is disabled for one or more retransmissions of the HARQ process or HARQ feedback is disabled for an initial transmission of the HARQ process.

58. The non-transitory computer-readable medium of claim 56, wherein the dynamic indication further indicates that at least one of HARQ feedback is enabled for one or more retransmissions of the HARQ process or HARQ feedback is enabled for an initial transmission of the HARQ process.

59. A non-transitory computer-readable medium storing a set of instructions for wireless communication, the set of instructions comprising:
one or more instructions that, when executed by one or more processors of a network entity, cause the network entity to:
transmit, via radio resource control (RRC) signaling, configuration information comprising a bitmap indicating that hybrid automatic repeat request (HARQ) feedback is one of enabled or disabled for one or more HARQ processes;
transmit a dynamic indication indicating that HARQ feedback is one of enabled or disabled for the one or more HARQ processes, wherein the dynamic indication overrides the configuration information; and
transmit a downlink communication, the downlink communication including a HARQ process identifier of a HARQ process of the one or more HARQ processes, the HARQ process identifier indicating that the HARQ process is to be used for the downlink communication.

60. The non-transitory computer-readable medium of claim 59, wherein the configuration information includes a value indicating a quantity of HARQ processes of the one or more HARQ processes for which HARQ feedback is disabled.

61. The non-transitory computer-readable medium of claim 59, wherein the configuration information includes a value indicating a quantity of HARQ processes of the one or more HARQ processes for which HARQ feedback is enabled.

62. The non-transitory computer-readable medium of claim 59, wherein the set of instructions are further executable to cause the network entity to:
transmit the dynamic indication via a physical downlink control channel (PDCCH).

63. The non-transitory computer-readable medium of claim 62, wherein the dynamic indication further indicates that at least one of HARQ feedback is disabled for one or more retransmissions for the HARQ process or HARQ feedback is disabled for an initial transmission of the HARQ process.

64. The non-transitory computer-readable medium of claim 62, wherein the dynamic indication further indicates that at least one of HARQ feedback is enabled for one or more retransmissions for the HARQ process or HARQ feedback is enabled for an initial transmission for the HARQ process.

65. An apparatus for wireless communication comprising:
means for receiving, via radio resource control (RRC) signaling, configuration information comprising a bitmap indicating that hybrid automatic repeat request (HARQ) feedback is one of enabled or disabled for one or more HARQ processes;
means for receiving a dynamic indication indicating that HARQ feedback is one of enabled or disabled for the one or more HARQ processes, wherein the dynamic indication overrides the configuration information;
means for receiving a downlink communication, the downlink communication including a HARQ process identifier of a HARQ process of the one or more HARQ processes, the HARQ process identifier indicating that the HARQ process is to be used for the downlink communication; and
means for selectively providing HARQ feedback for the downlink communication based at least in part on the dynamic indication indicating that HARQ feedback is one of enabled or disabled for the HARQ process.

66. The apparatus of claim 65, wherein the configuration information includes a value indicating a quantity of HARQ processes of the one or more HARQ processes for which HARQ feedback is disabled.

67. The apparatus of claim 65, wherein the configuration information includes a value indicating a quantity of HARQ processes of the one or more HARQ processes for which HARQ feedback is enabled.

68. The apparatus of claim 65, wherein the means for receiving the dynamic indication further comprise:
means for receiving the dynamic indication via a physical downlink control channel (PDCCH).

69. The apparatus of claim 68, wherein the dynamic indication further indicates that at least one of HARQ feedback is disabled for one or more retransmissions of the HARQ process or HARQ feedback is disabled for an initial transmission of the HARQ process.

70. The apparatus of claim 68, wherein the dynamic indication further indicates that at least one of HARQ feedback is enabled for one or more retransmissions of the HARQ process or HARQ feedback is enabled for an initial transmission of the HARQ process.

71. An apparatus for wireless communication comprising:
means for transmitting, via radio resource control (RRC) signaling, configuration information comprising a bitmap indicating that hybrid automatic repeat request (HARQ) feedback is one of enabled or disabled for one or more HARQ processes;
means for transmitting a dynamic indication indicating that HARQ feedback is one of enabled or disabled for the one or more HARQ processes, wherein the dynamic indication overrides the configuration information; and
means for transmitting a downlink communication, the downlink communication including a HARQ process identifier of a HARQ process of the one or more HARQ processes, the HARQ process identifier indicating that the HARQ process is to be used for the downlink communication.

72. The apparatus of claim 71, wherein the configuration information includes a value indicating a quantity of HARQ processes of the one or more HARQ processes for which HARQ feedback is disabled.

73. The apparatus of claim 71, wherein the configuration information includes a value indicating a quantity of HARQ processes of the one or more HARQ processes for which HARQ feedback is enabled.

74. The apparatus of claim 71, wherein the means for transmitting the dynamic indication further comprise:
   means for transmitting the dynamic indication via a physical downlink control channel (PDCCH).

75. The apparatus of claim 74, wherein the dynamic indication further indicates that at least one of HARQ feedback is disabled for one or more retransmissions for the HARQ process or HARQ feedback is disabled for an initial transmission of the HARQ process.

76. The apparatus of claim 74, wherein the dynamic indication further indicates that at least one of HARQ feedback is enabled for one or more retransmissions for the HARQ process or HARQ feedback is enabled for an initial transmission for the HARQ process.

* * * * *